United States Patent
Scholz

(10) Patent No.: US 12,296,897 B2
(45) Date of Patent: May 13, 2025

(54) DOWNFORCE SYSTEM FOR A VEHICLE

(71) Applicant: MCMURTRY AUTOMOTIVE LIMITED, Wotton-Under-Edge (GB)

(72) Inventor: George Karl Scholz, Wotton-Under-Edge (GB)

(\*) Notice: Subject to any disclaimer, the term of this patent is extended or adjusted under 35 U.S.C. 154(b) by 296 days.

(21) Appl. No.: 17/767,022

(22) PCT Filed: Oct. 16, 2020

(86) PCT No.: PCT/EP2020/079212
§ 371 (c)(1),
(2) Date: Apr. 6, 2022

(87) PCT Pub. No.: WO2021/078649
PCT Pub. Date: Apr. 29, 2021

(65) Prior Publication Data
US 2022/0363323 A1 Nov. 17, 2022

(30) Foreign Application Priority Data
Oct. 21, 2019 (GB) .................. 1915195

(51) Int. Cl.
*B62D 37/02* (2006.01)
*B62D 57/00* (2006.01)

(52) U.S. Cl.
CPC ............ *B62D 37/02* (2013.01); *B62D 57/00* (2013.01)

(58) Field of Classification Search
CPC ......... B62D 37/02; B62D 35/02; B62D 57/00
See application file for complete search history.

(56) References Cited

U.S. PATENT DOCUMENTS

| 3,556,239 A | 1/1971 | Spahn |
| 3,628,625 A | 12/1971 | Boyles, Jr. |

(Continued)

FOREIGN PATENT DOCUMENTS

| DE | 2306044 A1 | 9/1974 |
| DE | 3403636 A1 | 8/1985 |

(Continued)

OTHER PUBLICATIONS

EPO Search Report for corresponding EP22196502 dated Jan. 19, 2023.

(Continued)

*Primary Examiner* — Daniel J Colilla
(74) *Attorney, Agent, or Firm* — Egbert, McDaniel & Swartz, PLLC

(57) ABSTRACT

A downforce system for a vehicle includes: a restrictor configured to restrict a flow of air into a region that is defined at least in part by the restrictor and a ground surface, a rim disposed on the restrictor and configured to form at least a partial seal with the ground surface; a dedicated pressure source disposed outside the restrictor and connected to the restrictor via an air flow path, the pressure source being configured to generate a pressure differential across the restrictor; and a dust and debris removal system configured to prevent dust and debris from exiting the downforce system via the air flow path. By generating a pressure differential across the restrictor, a downforce which acts on the vehicle may be generated. The downforce may result in an improved grip or traction of the vehicle, which may improve handling and safety of the vehicle.

39 Claims, 23 Drawing Sheets

(56) References Cited

U.S. PATENT DOCUMENTS

| | | | |
|---|---|---|---|
| 4,810,022 A | | 3/1989 | Takagi et al. |
| 4,971,591 A | * | 11/1990 | Raviv .................... A63H 17/26 |
| | | | 180/164 |
| 6,053,266 A | | 4/2000 | Greenhill et al. |
| 6,068,328 A | * | 5/2000 | Gazdzinski ............ B62D 35/00 |
| | | | 296/180.1 |
| 6,554,241 B1 | | 4/2003 | Leshem |
| 2005/0203684 A1 | | 9/2005 | Borgesson |
| 2009/0033148 A1 | | 2/2009 | Hoff et al. |
| 2009/0230765 A1 | | 9/2009 | Gabor et al. |
| 2015/0210181 A1 | | 7/2015 | Niioka et al. |
| 2018/0339734 A1 | | 11/2018 | Williams et al. |
| 2020/0182563 A1 | * | 6/2020 | Glickman ................. F28F 1/24 |

FOREIGN PATENT DOCUMENTS

| | | | | | |
|---|---|---|---|---|---|
| DE | 102010035184 A1 | * | 3/2012 | ............ | B60K 11/06 |
| DE | 202019103417 U1 | | 7/2019 | | |
| EP | 2311695 A1 | * | 4/2011 | ................ | B60T 1/14 |
| FR | 2058669 A5 | | 5/1971 | | |
| GB | 2295799 A | * | 6/1996 | ............ | B60B 39/00 |
| JP | 2009504472 A | * | 2/2009 | ............ | B62D 35/02 |
| JP | 2009248963 A | | 10/2009 | | |
| WO | 8809737 A1 | | 12/1988 | | |
| WO | 2019123280 A1 | | 6/2019 | | |

OTHER PUBLICATIONS

GB Search Report for corresponding for corresponding GB2301221.4 dated 2023-02-08.

International Search Report for corresponding PCT/EP2020/079212, dated Jan. 11, 2021.

Written Opinion of the International Searching Authority for corresponding PCT/EP2020/079212, dated Jan. 11, 2021.

Gilles, M. "This week in 1970: Chaparral 2J unveiled", Jul. 21, 2013, Retrieved from the Internet: URL:https://www.autoweek.com/car-life/a1923381/week-1970-chaparral-2j-unveiled/.

UKIPO Examination Report for Priority Application No. GB1915195.0, dated Oct. 28, 2020.

UKIPO Combined Search and Examination Report for Priority Application No. GB1915195.0, dated Jun. 22, 2020.

UKIPO Combined Search and Examination Report for GB2103956.5 (divisional of Priority Application No. GB1915195.0), dated Apr. 26, 2021.

UKIPO Combined Search and Examination Report for GB2111699.1 (divisional of Priority Application No. GB1915195.0), dated Dec. 23, 2021.

International Preliminary Report on Patentability for PCT/EP2020/079212, dated Apr. 1, 2021.

* cited by examiner

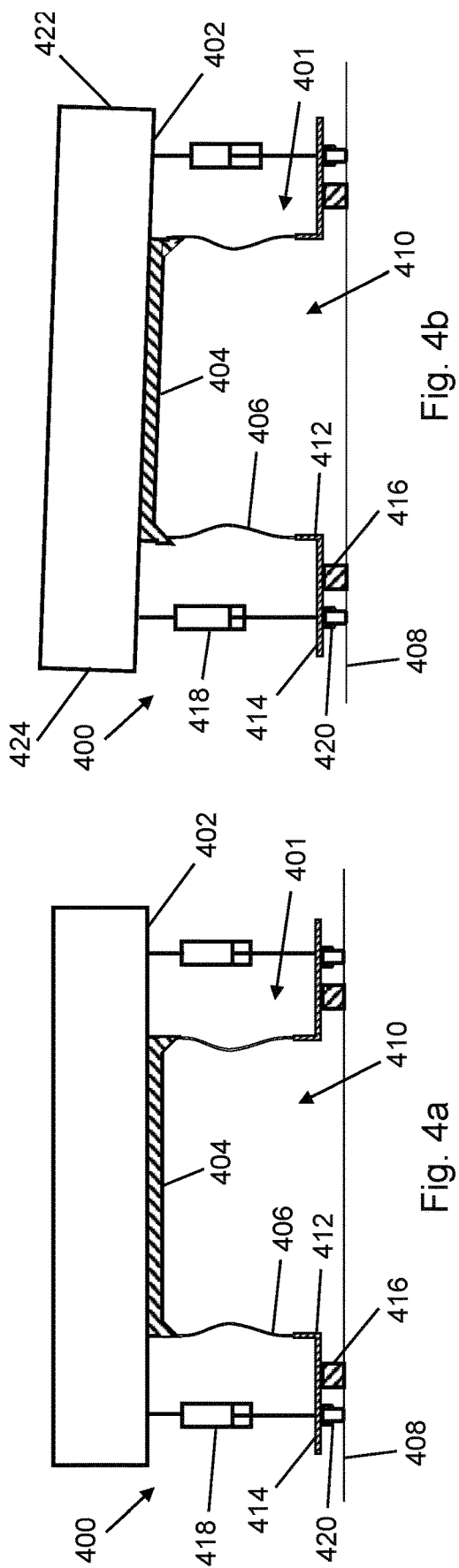
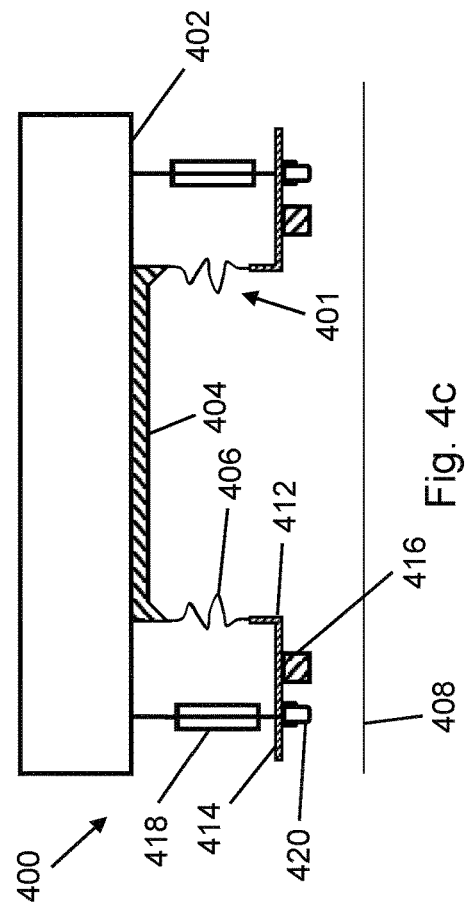

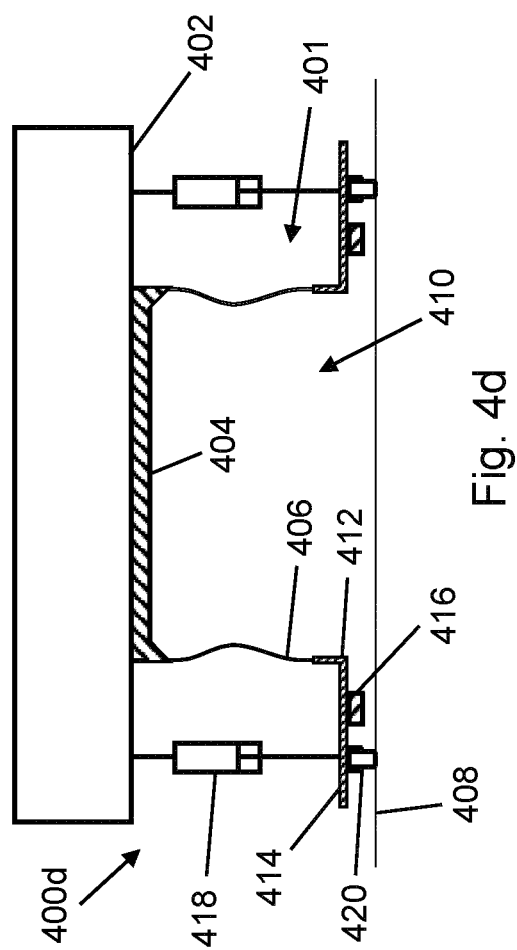

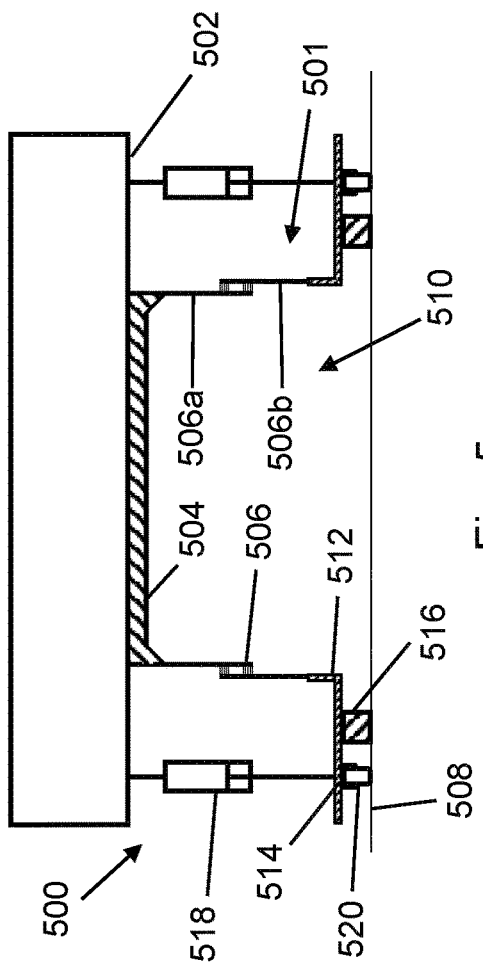
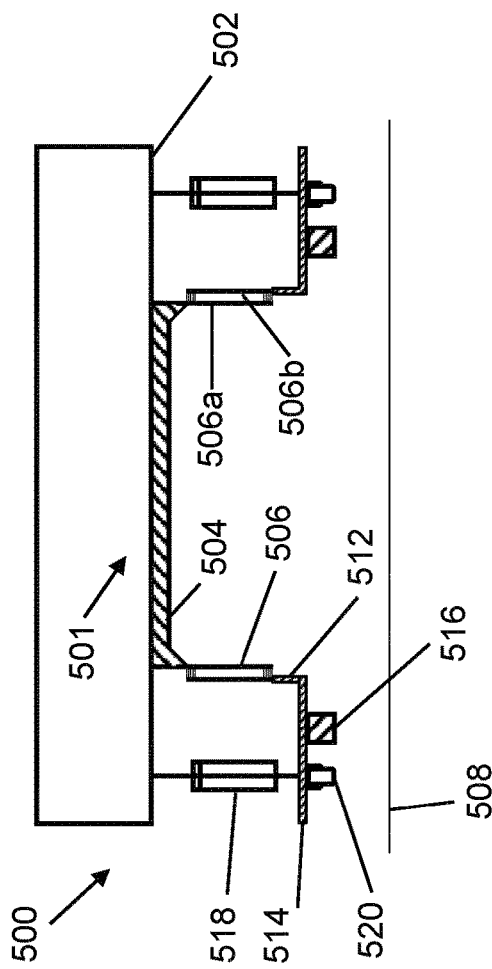

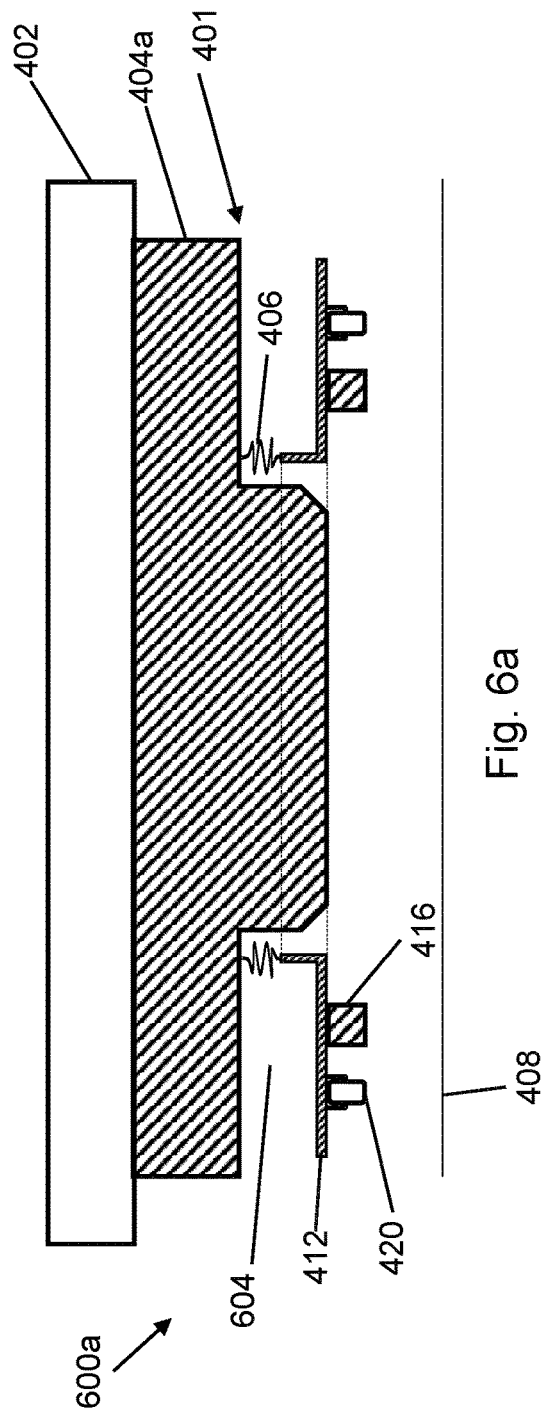
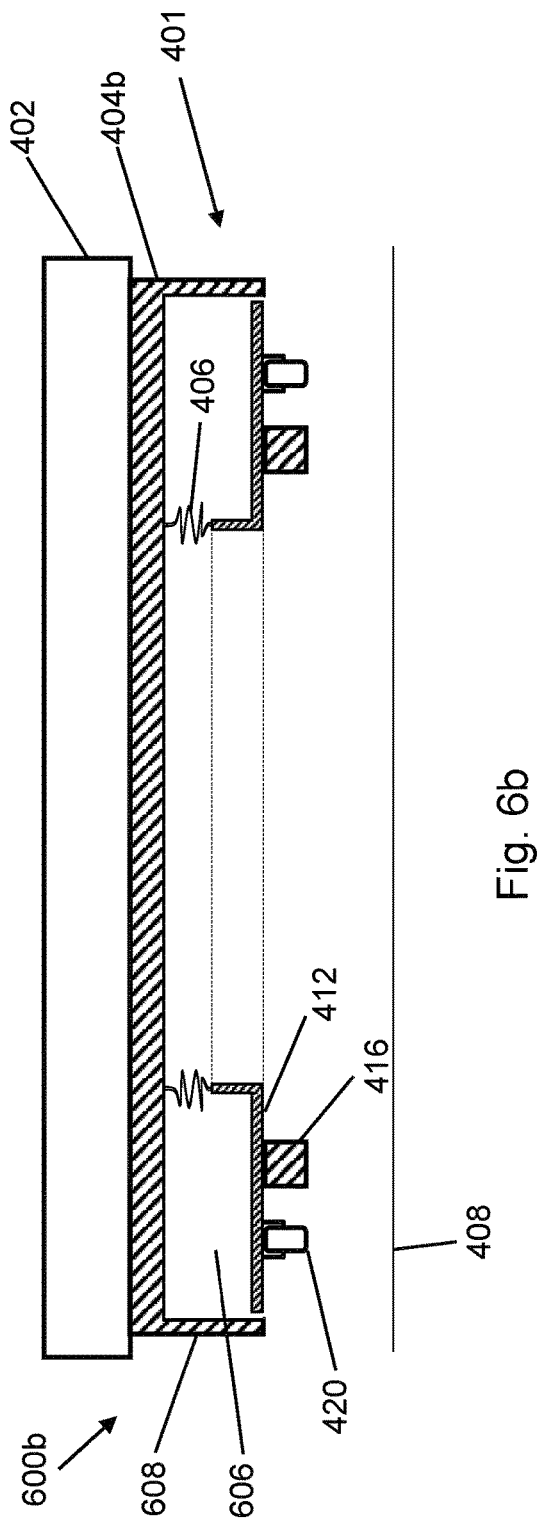

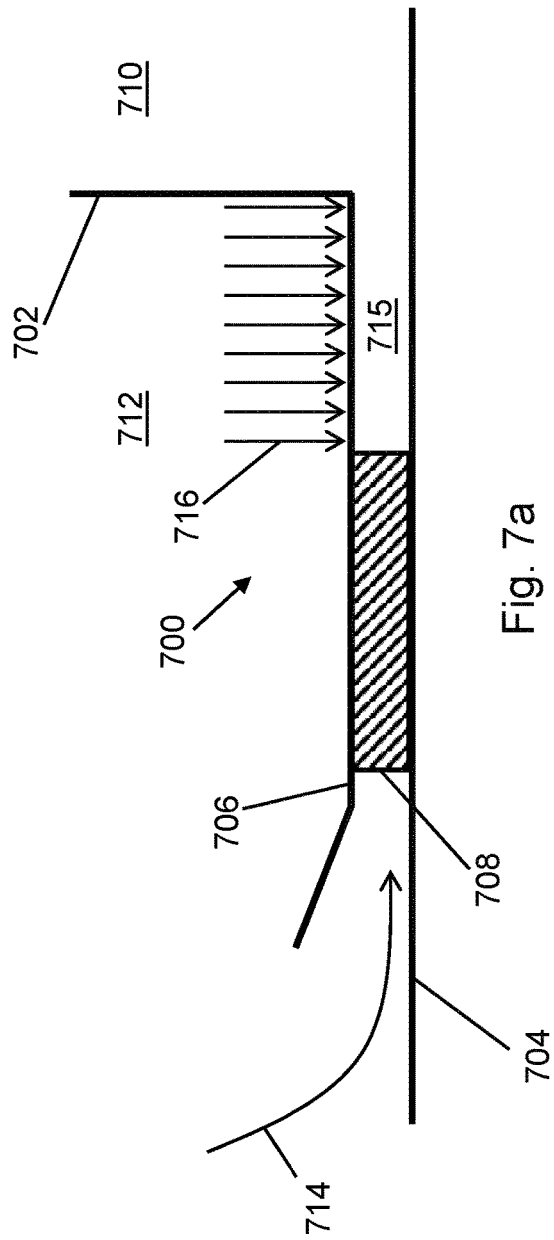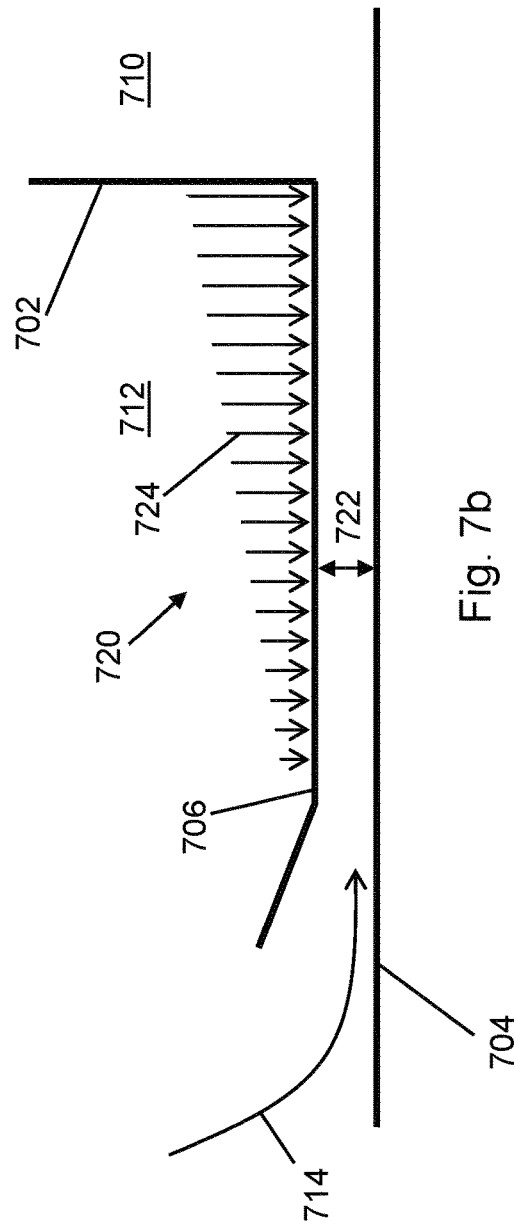

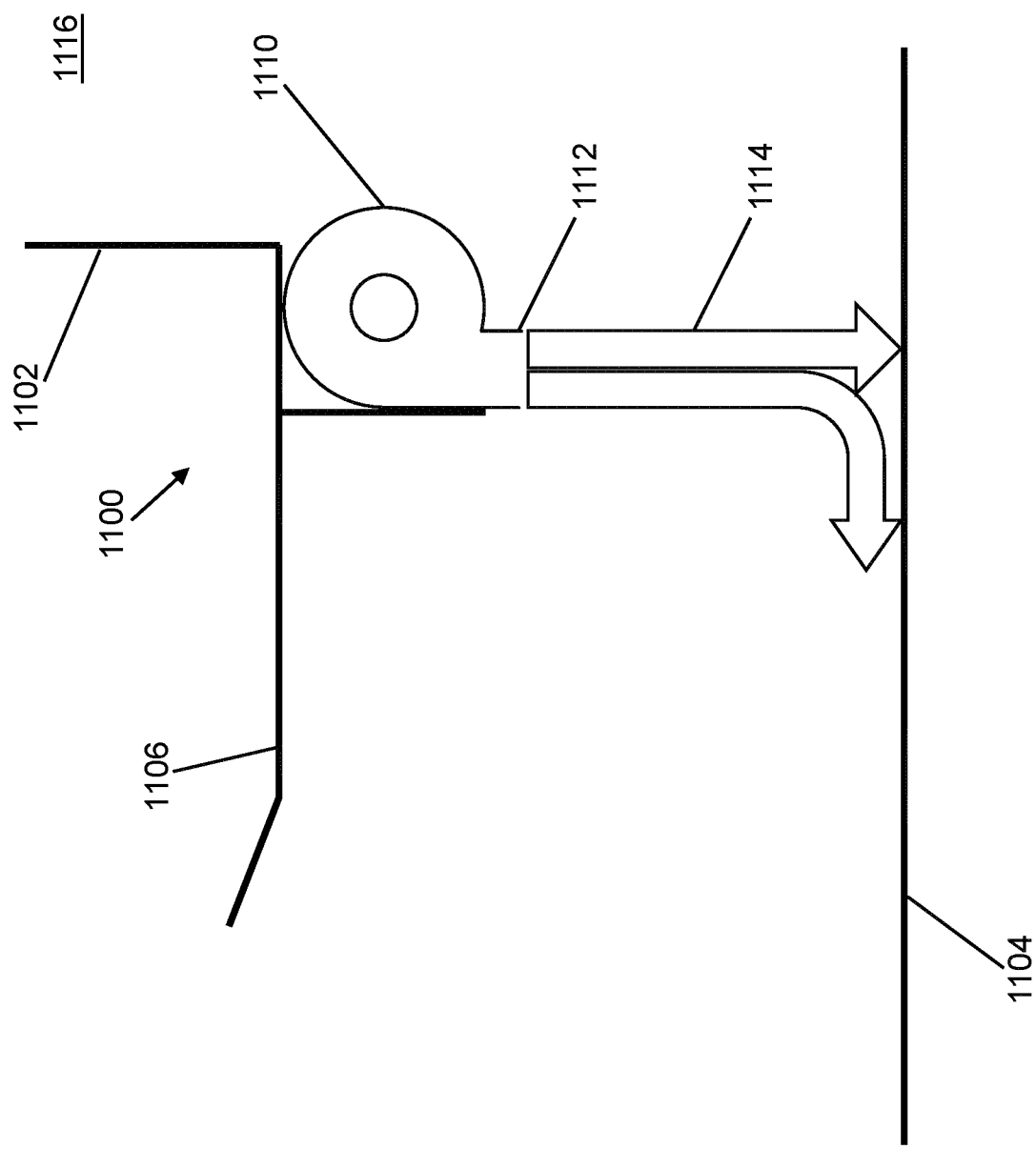

DOWNFORCE SYSTEM FOR A VEHICLE

FIELD OF THE INVENTION

The present invention relates to a downforce system for a vehicle. The downforce system includes a restrictor, and a pressure source configured to generate a pressure differential across the restrictor, in order to generate a downforce.

BACKGROUND

One technique for improving a vehicle's grip (or traction) on a ground surface on which it is driving, such as a road, is to generate a downforce which acts on the vehicle and causes the vehicle to be pressed towards the ground surface. Such a downforce may increase tyre adhesion with the ground surface, which may enable the vehicle to travel around bends at greater speeds without losing grip. This may also enable the tyres to transmit a greater thrust force to the ground, which may improve acceleration and deceleration of the vehicle.

Typically, a downforce may be generated using aerodynamic characteristics of the vehicle. The vehicle may include one or more surfaces which are configured to generate a downforce when air flows over those surfaces as the vehicle moves. As an example, the vehicle may include an aerofoil (or wing) which is configured to generate a downforce that presses the vehicle towards the ground surface as the vehicle drives over the ground surface. The aerofoil may function based on the same principles as an aircraft wing, except that the aerofoil is arranged to generate a negative lift, i.e. a force directed towards the ground surface. The downforce generated in this manner may depend on a size of the aerofoil used. Thus, increasing the size of the aerofoil may increase the magnitude of the downforce generated. However, a drawback is that increasing the size of the aerofoil may also increase aerodynamic drag. Additionally, the magnitude of the downforce generated by the aerofoil depends on a speed of the vehicle, so at low speeds the magnitude of the downforce may be relatively small.

SUMMARY OF THE INVENTION

At its most general, the present invention provides a downforce system for a vehicle comprising a restrictor for restricting a flow of air into a region, and a pressure source that is configured to generate a pressure differential across the restrictor. By generating a pressure differential across the restrictor (e.g. by generating a pressure in the region defined by the restrictor that is lower than an atmospheric pressure outside the region), a downforce which acts on the vehicle may be generated. The downforce may result in an improved grip or traction of the vehicle, which may reduce a risk of the vehicle slipping. This may improve handling and safety of the vehicle. For example, this may improve the vehicle's ability to make turns at high speed, and/or serve to reduce the vehicle's braking distance. Additionally, as the downforce is generated by the pressure differential across the restrictor, a magnitude of the downforce may be substantially independent from a speed of the vehicle. As a result, the downforce system of the invention may enable traction and stability of a vehicle to be improved regardless of vehicle speed (e.g. even at low speeds).

According to a first aspect of the invention, there is provided a downforce system for a vehicle, the downforce system comprising: a restrictor configured to restrict a flow of air into a region that is defined at least in part by the restrictor and a ground surface on which the vehicle is disposed, a rim disposed on the restrictor and configured to form at least a partial seal with the ground surface; a dedicated pressure source disposed outside the restrictor and connected to the restrictor via an air flow path, the pressure source being configured to generate a pressure differential across the restrictor; and a dust and debris removal system configured to prevent dust and debris from exiting the downforce system via the air flow path. Thus, by generating a pressure differential across the restrictor, a downforce which acts on the vehicle may be generated. Moreover, by providing a dust and debris removal system as part of the downforce system, it is possible to prevent dust and debris from being blown out of the downforce system. This improves safety of the downforce system, as blowing dust and debris out of the downforce system could be dangerous (e.g. by reducing visibility for vehicles located behind the downforce system). This may also avoid damage to components of the downforce system which could result from dust and debris being blown out of the downforce system.

The restrictor may be any suitable mechanism or component that serves to define a region and restrict air flow into that region. For example, the restrictor may comprise a barrier, wall or partial enclosure which is shaped to define a portion of the region. The restrictor may be configured to define all or part of a perimeter of the region. For example, the restrictor may be in the form of a continuous barrier that extends around a perimeter of an area. In other cases, the restrictor may only define a portion of the perimeter of the region, e.g. the restrictor may be open at one end.

The restrictor may include a top surface (e.g. formed by a plate) which is configured to be disposed on an underside of the vehicle, and a sidewall disposed around a perimeter of the top surface, the sidewall being configured to extend downward from the top surface towards the ground surface. Thus, the top surface and sidewall of the restrictor may serve to define the region.

In use, the restrictor may be disposed over the ground surface on which the vehicle is disposed, such that together the restrictor and the ground surface define the region. In other words, the restrictor may define a region over the ground surface. Thus, the region may correspond to a volume that is substantially enclosed by the restrictor and the ground surface on which the vehicle is disposed. In some cases, the region may be partially enclosed by the restrictor and the ground surface, e.g. in cases where the restrictor is open at one end. The region may be located on an inside of the restrictor, whilst an outside of the restrictor may face outwards, e.g. the outside of the restrictor may be in contact with the atmosphere outside the vehicle. The ground surface may for example be a road surface (e.g. asphalt) on which the vehicle is disposed.

The restrictor may be configured to be located underneath the vehicle, e.g. it may be mounted on an underside of the vehicle. In some cases, part or all of the restrictor may be formed by a surface of the vehicle.

When the restrictor is disposed over the ground surface to define the region, the restrictor acts to restrict (e.g. block or partially block) air flowing into the region from the outside of the restrictor. For example, the restrictor may restrict air flowing into the region from the atmosphere.

The rim serves to form an at least partial seal with the ground surface. The at least partial seal between the rim and the ground surface may serve to restrict air flow between the region and the outside of the restrictor (e.g. the atmosphere).

This may facilitate generating and maintaining the pressure differential across the restrictor.

The rim is disposed on the restrictor, e.g. the rim may be disposed at or near a lower edge of the restrictor. Thus, in use (i.e. when the restrictor is disposed over the ground surface), the rim may be in close proximity, or in contact with, the ground surface in order to form the at least partial seal with the ground surface.

The rim may be formed as part of the restrictor, e.g. it may be an integral part of the restrictor. Alternatively, the rim may be a separate component from the restrictor, the rim being mounted on the restrictor.

The rim may include a flexible material. This may enable the rim to flex in response to variations (e.g. unevenness) in the ground surface, so that the at least partial seal between the rim and the ground surface may be maintained. For example, the rim may be made of one or more of fibreglass, aluminium, and carbon fibre. A stiffness of the material of the rim may be tailored to facilitate maintaining contact with the ground.

The pressure source is disposed outside the restrictor. The pressure source may also be said to be disposed remotely from the restrictor. In other words, in use, the pressure source may be outside of the region that is defined at least in part by the restrictor and a ground surface. Providing the pressure source outside the restrictor may be beneficial, as this may place fewer size constraints on the pressure source. As the restrictor may typically be placed underneath the vehicle, placing the pressure source inside the restrictor may result in an increased height of the vehicle. So, by providing the pressure source outside the vehicle, a height of the vehicle may be reduced.

The pressure source of the downforce system of the invention is a dedicated pressure source. In other words, the pressure source may be configured to be driven (or controlled) independently from a main engine of the vehicle. For example, the pressure source may be driven by a motor that is independent from a motor of a traction system of the vehicle. In this manner, performance of the pressure source may be independent from a speed at which the vehicle is driving. Providing a dedicated pressure source for the downforce system may enable the pressure source to be controlled independently from other vehicle systems. This may facilitate control of the pressure differential generated by the pressure source, and hence the downforce generated by the downforce system.

The pressure source is connected to the restrictor via an air flow path. In this manner, air may flow along the air flow path from the region defined by the restrictor and the ground surface, to the pressure source. This may enable the pressure source to control a pressure in the region, in order to generate a pressure differential across the restrictor. For example, the pressure source may be configured to remove air from the region inside the restrictor (via the air flow path), such that a pressure in the region is lower than a pressure outside the restrictor (the pressure outside the restrictor may be atmospheric pressure). As a result, a pressure differential may be generated across the restrictor, due to a lower pressure being present in the region inside the restrictor and a higher (e.g. atmospheric) pressure being present outside the restrictor. The pressure differential generated by the pressure source may depend on a rate at which the pressure source removes air from the region, and a rate at which air flows (leaks) into the region via the at least partial seal.

The pressure differential generated by the pressure source may cause a downforce to be generated, which acts downwards on the vehicle. As a result, traction of the vehicle may be improved. The downforce may act on an area that corresponds to an area defined by the restrictor over the ground surface. In use, the restrictor may be mounted on the vehicle (e.g. on an underside of the vehicle). In this manner, the downforce which results from the pressure differential across the restrictor may act on the vehicle.

A downforce may be a force that acts downwards, i.e. towards the ground surface on which the vehicle is disposed.

The downforce system may include a downforce sensor configured to measure a magnitude of the downforce generated by the downforce system. The downforce sensor may be configured to generate an output signal indicative of the magnitude of the downforce. This may enable the downforce to be monitored, to ensure that the downforce system is functioning properly. The output signal from the downforce sensor may also be used in order to control the downforce system, e.g. in order achieve a desired downforce. For example, the downforce sensor may be implemented by a strain gauge that is configured to measure the downforce generated by the downforce system. The strain gauge may be configured to measure a load on vehicle suspension caused by the downforce. Alternatively, the strain gauge may be incorporated into an element (e.g. mounting element) that is used to attach the restrictor to the vehicle.

The pressure source may be a vacuum source, e.g. a vacuum pump. The air flow path may be defined by a conduit which is connected between an outlet of the restrictor and the pressure source. The pressure source may itself include an exhaust outlet for blowing out air removed from the region.

The downforce system may include an energy store for powering the pressure source, and other components of the system. The energy store may be in the form of a battery. In some examples, the energy store may be in the form of a flywheel.

In some embodiments, a heat exchange component may be placed inside the restrictor. The heat exchange component may, for example, be a radiator, heat sink, or part of a heat exchanger. The heat exchange component may be configured to remove heat from another portion of the vehicle. For example, the heat exchange component may be thermally coupled to one or more of the vehicle engine, an energy store of the vehicle (e.g. battery), or other vehicle system that generates heat during use. Due to the lower than atmospheric pressure inside the restrictor during operation of the downforce system, a temperature in the region inside the restrictor may be lower than a temperature outside the restrictor. This may enable the heat exchange component to be cooled during operation of the downforce system, which may enable heat to be efficiently removed from the portion of the vehicle to which the heat exchange component is thermally coupled. Additionally, air flow between the restrictor and the pressure source may act to cool the heat exchange component.

The dust and debris removal system is configured to prevent dust and debris (as well as water) from exiting the downforce system via the air flow path between the restrictor and the pressure source. Typically, dust and debris (e.g. dirt particles, small objects) may be present on a road or other surface on which a vehicle operates. The dust and debris removal system may serve to prevent such dust and debris, as well as water, from being blown out of the downforce system, e.g. via the exhaust outlet of the pressure source, which could be hazardous for other vehicles on the road and may damage components of the downforce system.

Thus, the dust and debris removal system may improve an overall safety of the downforce system.

The dust and debris removal system may prevent dust and debris from exiting the downforce system via the air flow path in any suitable way. For example, the dust and debris removal system may be configured to prevent dust and debris from entering the air flow path, and/or the dust and debris removal system may be configured to remove (or capture) dust and debris from air flowing along the air flow path. The dust and debris removal system may also be configured to remove (or capture) dust and debris from air that is blown out of the exhaust outlet of the pressure source. The dust and debris removal system may include components that are disposed at different locations in the downforce system, in order to improve the efficiency with which dust and debris are prevented from exiting the downforce system via the air flow path.

The dust and debris removal system may include active and/or passive components configured to prevent dust and debris from exiting the downforce system via the air flow path.

The downforce system may include a controller that is configured to control one or more components of the downforce system, e.g. via one or more control signals. For example, the controller may be configured to control operating parameters of one or more of the restrictor, rim, pressure source and dust and debris removal system.

Various methods may be employed for controlling the pressure differential generated across the restrictor, and thus the downforce generated by the downforce system. Generally speaking, these methods involve controlling (adjusting) an air flow into the air flow path.

To this effect, the downforce system may comprise an air flow control system configured to control a flow of air into (or through) the air flow path. The flow of air into the air flow path may be from the region defined at least in part by the restrictor and a ground surface, and/or from an outside of the restrictor (e.g. from the atmosphere). By controlling the flow of air into the air flow path between the restrictor and the pressure source, it may be possible to control the pressure differential generated across the restrictor, and thus the downforce generated by the downforce system. This may enable the downforce generated by the downforce system to be adjusted to a desired level, as well as the downforce to be adjusted based on driving circumstances of the vehicle. The air flow control system may be configured to control the flow of air into the air flow path using any suitable means.

The downforce system may comprise an actuator for controlling a height of the rim above the ground surface. The actuator may be part of the air flow control system mentioned above. By controlling a height (or gap) of the rim above the ground surface, a quality of the at least partial seal between the rim and the ground surface may be adjusted. As a result, it may be possible to control a flow (or leak) of air from an outside of the restrictor (e.g. the atmosphere) into the region, which in turn affects the flow of air along the air flow path. For example, by increasing a height of the rim above the ground surface, more air may leak into the region from the atmosphere, which may result in an increased air flow along the air flow path between the restrictor and the pressure source. As a result, the pressure differential across the restrictor may be reduced. On the other hand, by reducing a height of the rim above the ground surface (e.g. by bringing the rim into direct contact with the ground surface), less air may leak into the region from the atmosphere, which may result in a reduced air flow along the air flow path. As a result, the pressure differential across the restrictor may be increased.

The actuator may include any suitable mechanism for controlling the height of the rim above the ground surface. For example, the actuator may include a piston such as a pneumatic cylinder, a hydraulic cylinder, an electrical actuator, a mechanical actuator (e.g. spring) or a magnetic actuator. The actuator may be controllable by the air flow control system. In some cases, multiple actuators may be provided, to ensure accurate control of height for the entire rim.

The controller of the downforce system may be configured to control the actuator, e.g. via a control signal.

The downforce system may comprise a rim sensor configured to measure a distance (or gap) between the rim and the ground surface. In this manner, it may be possible to accurately monitor a height of the rim above the ground surface. The height of the rim above the ground surface may be indicative of a quality of the seal between the rim and the ground surface. Any suitable sensor for measuring the distance between the rim and the ground surface may be used. For example, the rim sensor may include one or more of an optical sensor, a laser source (e.g. for a lidar detection system) or other source of electromagnetic radiation (e.g. for a radar detection system).

The downforce system may be configured to control, based on an output from the rim sensor, the height of the rim above the ground surface. In this manner, the output signal from the rim sensor may act as a feedback signal for controlling the height of rim above the ground surface. This may enable accurate control of air flow into the region from the outside of the restrictor. For example, the controller of the downforce system may be configured to receive the output signal from the rim sensor and, based on the received output signal, generate a control signal for controlling the actuator to control the height of the rim above the ground surface.

The downforce system may be configured to control, based on an output from the rim sensor, the height of the rim above the ground surface to maintain the rim at a substantially constant height above the ground surface. This may enable the at least partial seal between the rim and the ground surface to be accurately maintained. As a result, air flow (leakage) into the region from the outside of the restrictor may be maintained at a desired level, which may result in a substantially constant pressure differential across the restrictor.

The downforce system may comprise one or more valves, the one or more valves being operable to adjust a flow of air through the downforce system. Adjusting the flow of air through the downforce system may enable the pressure in the region to be controlled, such that the pressure differential generated across the restrictor may be controlled. Thus, the one or more valves may be operated to adjust the downforce generated by the system.

Each of the one or more valves may include an open and a closed state (or position). Each of the one or more valves may be continuously adjustable between the open and closed states, to enable accurate (e.g. fine) control of air flow through the valve. For example, the one or more valves may include a throttle valve. Operating the one or more valves may include adjusting the one or more valves between the open and closed states. The one or more valves may be part of the air flow control system mentioned above.

The controller of the downforce system may be configured to control a state of the one or more valves, e.g. via one or more control signals. The one or more valves may be operable to adjust a flow of air into the air flow path.

This may enable accurate control of air flow along the air flow path between the restrictor and the pressure source. Thus, an amount of air that is extracted from the region by the pressure source may be controlled, in order to adjust the pressure differential across the restrictor.

The one or more valves may comprise a first valve that is operable to adjust a flow of air between the region and an outside of the restrictor. In other words, the first valve may be configured to provide an auxiliary air flow path between the region and an outside of the region when the first valve is opened. In this manner, the first valve may be operated to enable a flow of air between the region and the outside of the restrictor (via the auxiliary air flow path), which in turn affects the air flow into and through the air flow path between the restrictor and the pressure source. For example, by opening the first valve to enable air flow between the region and the outside of the restrictor via the first valve, the pressure differential across the restrictor may be reduced. By closing the first valve to prevent air flow between the region and the outside of the restrictor via the first valve, the pressure differential across the restrictor may be increased.

The downforce system (e.g. the controller of the downforce system) may be configured to operate the first valve to maintain an air flow rate along the air flow path above a threshold air flow rate. This may ensure that there is a minimum air flow rate along the air flow path. For example, where there is a high quality seal between the rim and the ground surface, such that there is minimal air leakage into the region via the seal, the first valve may be opened to increase air flow into the region and maintain the air flow rate along the air flow path above the threshold air flow rate. This may, for example, enable the pressure differential across the restrictor to be maintained within a desired range.

As discussed below, in some embodiments the dust and debris removal system may include a dust and debris removal device (e.g. cyclonic filtration apparatus) disposed in the air flow path. In such an embodiment, maintaining the air flow rate along the air flow path above the threshold air flow rate may ensure that there is sufficient air flow along the air flow path to enable dust and debris to be effectively captured by the dust and debris removal device.

The first valve may be located in parallel with the pressure source. For example, the first valve may be provided in a sidewall of a conduit that serves to define the air flow path between the restrictor and the pressure source. In some cases, the first valve may be disposed across the restrictor, e.g. between the inside and the outside of the restrictor, such that air can flow from the outside of the restrictor to the inside of the restrictor when the first valve is open. In some cases, the first valve may be connected to the conduit forming the air flow path between the restrictor and the pressure source.

The first valve may be operable to adjust a flow of air between the region and the atmosphere outside the restrictor. Alternatively, the first valve may be operable to adjust a flow of air between the region and an air recirculation path.

The one or more valves may comprise a second valve that is disposed in the air flow path between the restrictor and the pressure source. In other words, the second valve may be located in series with the pressure source. In this manner, the second valve may be operated to directly adjust the air flow through the air flow path between the restrictor and the pressure source. For example, by opening the second valve, air flow along the air flow path may be increased, which may result in an increase of the pressure differential across the restrictor. On the other hand, reducing the air flow through the second valve (e.g. by moving it towards the closed position) may result in a decrease of the pressure differential across the restrictor.

The restrictor may include a mounting element for mounting the restrictor on the vehicle, and the rim may be movably connected to the mounting element, to enable the rim to move relative to the mounting element in response to a change in height of an underside of the vehicle above the ground surface. Thus, a change in height of the underside of the vehicle above the ground surface may result in a change in distance between the mounting element and the rim.

During driving, the height of the underside of the vehicle above the ground surface may vary, due to reactions of the vehicle's suspension system to bumps in the ground surface. By enabling the rim to move relative to the mounting element in response to a change in height of an underside of the vehicle above the ground surface, it is possible to ensure that a distance between the rim and the ground surface remains substantially constant. For example, where the rim is configured to be in contact the ground surface, the rim may remain in contact with the ground surface during driving, despite variations in the height of the underside of the vehicle. This may facilitate maintaining the at least partial seal between the rim and the ground surface, such that there are no sudden variations in the pressure differential across the restrictor when the vehicle drives over an uneven ground surface.

In use, the mounting element may be fixed relative to the vehicle, whilst the rim is movable relative to the mounting element (and hence the vehicle). As a result, the rim may be substantially decoupled from vertical movements of the vehicle relative to the ground surface.

The mounting element may be any suitable means for mounting the restrictor on the vehicle. In some cases, the mounting element may be a part of the vehicle body. As an example, the mounting element may be a plate that is mountable on (or integrated with) an underside of the vehicle, where the plate is configured to define a top surface of the region defined by the restrictor and the ground surface.

The rim may be movably connected to the mounting element via an extendable coupling of the restrictor. In this manner, the extendable coupling may accommodate changes in height of the underside of the vehicle above the ground surface, such that the rim may be kept at a substantially constant distance from the ground surface.

The extendable coupling may be configured to define a portion of the region. For example, the extendable coupling may be in the form of an extendable barrier or wall that is configured to define a portion of the region.

The extendable coupling may comprise a flexible material. For example, the flexible material may be in the form of a flexible skirt or bellows which is connected between the mounting element and the rim, to enable the rim to move relative to the mounting element.

The extendable coupling may comprise a telescopic coupling. For example, the extendable coupling may include two or more telescopic sections, e.g. concentric sections, which are movable relative to one another, and which are configured to define a portion of the region.

In some embodiments, the downforce system may further comprise a cavity for receiving a portion of the restrictor when the rim moves relative to the mounting element. This may facilitate relative movement between mounting element and the restrictor. The cavity may be formed, for example, in an underside of the vehicle. In some cases, the cavity may be formed as part of the mounting element.

In some embodiments, the restrictor may be movable between a stowed state and a deployed state. Then, the cavity may be arranged to receive a portion of the restrictor when the restrictor is in the stowed state. This may serve to protect the restrictor when it is in the stowed state.

In some embodiments, the rim may be disposed at or near a lower edge of the restrictor, and the rim may include a portion that extends outwards from the lower edge of the restrictor. The portion of the rim that extends outwards from the lower edge of the restrictor may be arranged such that it extends away from the restrictor, i.e. away from the region inside the restrictor. When a pressure differential is generated across the restrictor, air may flow (leak) into the region defined by the restrictor via the at least partial seal between the rim and the ground surface. Such an air flow may be insufficient to equalise the pressure differential across the restrictor. This may result in a lower pressure occurring below the portion of the rim that extends outwards from the lower edge of the restrictor, compared to a higher (e.g. atmospheric) pressure that exists above that portion of the rim. Therefore, a vertical pressure differential may be generated across that portion of the rim, resulting in a downforce being applied to that portion of the rim which causes the rim to be pressed downwards towards the ground surface. This vertical pressure differential may thus serve to maintain the rim in close proximity (or contact) with the ground surface, which may improve a quality of the at least partial seal between the rim and the ground surface.

The portion of the rim that extends outwards from the lower edge of the restrictor may form a continuous perimeter around the lower edge of the restrictor. In this manner, the downforce generated by the vertical pressure differential may be applied around the entire perimeter of the restrictor, which may result in a substantially uniform seal between the rim and the ground surface around the whole restrictor. Alternatively, the portion of the rim that extends outwards from the lower edge of the restrictor may extend along one or more portions of the lower edge of the restrictor. Then, the downforce generated by the vertical pressure differential may be applied around the one or more portions of the lower edge of the restrictor.

The rim may include a sealing element configured to contact the ground surface to form the at least partial seal with the ground surface. In this manner, the at least partial seal may be formed by direct contact between the sealing element and the ground surface. This may result in a high quality seal between the rim and the ground surface, such that air leakage into the region is minimised.

The sealing element may include a composite construction and/or a polymer construction.

The sealing element may be made of an abrasion-resistant material, in order to minimise wear produced by friction between the sealing element and the ground surface. For example, the sealing element may include materials such as toughened ceramics, ceramic embedded plastic, or composite rope, e.g. including Kevlar.

The sealing element may comprise a labyrinth seal. This may improve a quality of the seal between the rim and the ground surface.

The sealing element may comprise a brush seal. This may minimise friction between the sealing element and the ground surface, which may reduce drag. The brush seal may also serve to prevent dust and debris from entering the restrictor. Bristles of the brush seal may be an acute angle relative to the rim. For example, the bristles may be angled towards a rear of the vehicle. The bristles may also be angled towards a centre of the vehicle, or away from the centre of the vehicle.

In some cases, the brush seal may comprise a rotatable brush that is configured to rotate, which may further prevent dust and debris from entering the restrictor.

In some embodiments, the rim may include multiple different types of sealing element, e.g. a composite sealing element and a brush seal. This may serve to improve a quality of the seal between the rim and the ground surface.

Where the rim includes a portion that extends outwards from the lower edge of the restrictor, the sealing element may be disposed on the portion of the rim that extends outwards from the lower edge of the restrictor, such that the sealing element is configured to contact the ground surface at a position that is spaced outwards from the restrictor. In this manner, the vertical pressure differential generated across that portion of the rim (discussed above) may cause the sealing element to be pressed downwards against the ground surface. This may result in a seal of high quality between the rim and the ground surface, such that air leakage into the region is reduced. Consequently, it may be possible to generate a higher pressure differential across the restrictor.

The sealing element may be removably mounted on the rim. For example, the sealing element may be formed separately from the rest of the rim, and secured to the rim in a manner that facilitates removal of the sealing element. This may facilitate replacement of the sealing element, e.g. when the sealing element becomes worn. The sealing element may be removably mounted on the rim using any suitable securing means. For example, the sealing element may be mounted on the rim via one or more releasable fasteners (e.g. screws, clips or similar). The sealing element may be mounted on the rim via one or more cross dowels. The sealing element may be mounted on the rim via one or more magnets. The sealing element may also be secured to the rim via an adhesive.

The sealing element may include one or more inserts embedded therein, and a material of the one or more inserts may have a greater hardness than a material of the sealing element. The inserts in the sealing element may serve to improve an abrasion resistance of the sealing element, which may result in an improved lifetime of the sealing element. For example, the sealing element may be made of a composite material including a polymer with steel inserts suspended therein.

The downforce system may further comprise a sensor configured to detect a wear level of the sealing element. During use, the sealing element may become worn, due to abrasion of the sealing element by the ground surface. Wear of the sealing element may affect the quality of the seal between the rim and the ground surface. The sensor may thus enable monitoring the wear level of the sealing element, to facilitate determining when the sealing element should be replaced.

The sensor for detecting the wear level of the sealing element may detect the wear level of the seal in various manners. For example, the sensor may include a wire that is embedded in the sealing element, the wire being configured to break when the sealing element reaches a predetermined wear level. The sensor may be configured to determine when the wire breaks (e.g. by measuring a resistance of the wire), and then output a signal indicative of the wear level of the sealing element. Additionally or alternatively, the sensor may be configured to measure one or more of a resistance, capacitance, and inductance of a circuit that is embedded in the sealing element. As another example, the sensor may include a circuit having a component with a resonant frequency that is configured to change based on wear level of the sealing element. The sensor may be configured to measure the resonant frequency of the component to determine the wear level. For example, the component may be a wire or antenna that is embedded in the sealing element, e.g. such that the wire or antenna is worn down at the same rate as the sealing element. As a further example, the sensor may include an optical sensor configured to measure a thickness of the sealing element.

The controller of the downforce system may be configured to receive an output signal from the sensor that is indicative of a wear level of the sealing element. The controller may then display, e.g. on a display of the downforce system, the wear level of the sealing element.

The downforce system may further comprise a cooling system configured to remove heat from the sealing element. During use, the sealing element may heat up due to friction between the sealing element and the ground surface. This may cause the sealing element to wear more quickly, and the quality of the seal between the rim and the ground surface to deteriorate. By removing heat from the sealing element, heating up of the sealing element during use may be reduced, which may improve the quality of the seal between the rim and the ground surface. For example, the cooling system may be configured to bring a coolant fluid (e.g. liquid or gas) into thermal contact with the sealing element in order to remove heat from the sealing element.

The rim may further include one or more spacers configured to contact the ground surface. The one or more spacers may serve to maintain a constant distance between the rim and the ground surface. Where the rim includes a sealing element, the spacers may serve to protect the sealing element from abrasion by the ground surface. For example, the spacer may be made of a material that has a greater hardness than the sealing element.

In some case, the one or more spacers may include one or more castor wheels connected to the rim or the restrictor. This may reduce friction between the rim and the ground surface.

A height of the one or more spacers may be adjusted based on a wear level of the sealing element. In this manner, as the sealing element progressively wears away, the height of the one or more spacers may be adjusted to compensate for the changing wear level of the sealing element. As a result, the sealing element may be kept in contact with the ground surface.

The downforce system may further comprise a preload mechanism configured to apply a preload force to the rim to press the rim towards the ground surface. Pressing the rim towards the ground surface may ensure that the at least partial seal between the rim and the ground surface is formed and maintained during use of the downforce system. The preload mechanism may also increase a damping ratio of the restrictor and rim, without adding any mass to the rim. As a result, when the rim receives an impulse (e.g. from a bump in the ground surface), disturbance of the position of the rim may be reduced compared to when no preload force is applied. This may minimise loss of pressure differential across the restrictor. The preload mechanism may be configured to press the rim against the ground surface. This may facilitate maintaining contact between the rim and the ground surface.

The preload mechanism may include any suitable mechanism for applying a force to the rim. For example, the preload mechanism may include a biasing element (e.g. spring) configured to press the rim against the ground surface.

Where the rim includes one or more spacers, the one or more spacers may be configured to transfer a majority of the preload force applied by the preload mechanism to the ground surface. This may avoid transferring a large portion of the preload force via the sealing element, which might cause the sealing element to wear out quickly. Thus, this configuration may enable a preload force to be applied to the rim, without causing significant extra wear to the sealing element or other parts of the rim. Herein, a majority of the preload force may refer to more than half of the preload force applied by the preload mechanism. In some cases, the one or more spacers may be configured to transfer substantially all of the preload force applied by the preload mechanism to the ground surface. For example, the preload mechanism may be connected to portions of the rim comprising the one or more spacers, such that the preload force is applied to the one or more spacers.

The preload mechanism may include an actuator for varying the preload force applied by the preload mechanism. In this manner, the preload force may be adjusted during use of the downforce system. This may enable a flow (leak) of air into the region via the at least partial seal to be controlled, which in turn affects the pressure differential generated across the restrictor. The actuator may include any suitable mechanism for controlling the preload force applied to the rim. For example, the actuator may include a piston such as a hydraulic cylinder. In some cases, the actuator may be the same actuator discussed above for controlling a height of the rim above the ground surface. However, in other cases, separate sets of actuators may be used for applying a preload force to the rim and controlling the height of the rim above the ground surface. The controller of the downforce system may be configured to control the preload force applied by the preload mechanism, e.g. via a control signal to the actuator.

In some embodiments, the rim may include one or more air outlets, and the downforce system may be configured to blow air through the one or more air outlets to produce a blown air curtain between the rim and the ground surface to form the at least partial seal. The blown air curtain between the rim and the ground surface may serve to restrict air flow into the region via a gap between the rim and the ground surface. The downforce system may include a fan configured to blow air through the one or more air outlets. In such an embodiment, there may be a gap between the rim and the ground surface, such that the at least partial seal is formed by the blown air curtain, rather than by contact between the rim and the ground surface. However, some embodiments may combine a sealing element on the rim with a blow air curtain configuration, in order to improve the quality of the seal between the rim and the ground surface.

The pressure source may be powered by an energy store that is shared with a traction system of the vehicle. Thus, the energy store may power both the pressure source and the traction system of the vehicle. Sharing an energy store between the pressure source and traction system may provide more flexibility to a user in terms of energy management for the vehicle, compared to using separate energy stores for the pressure source and the traction system. This is because energy stored in the energy store may be used by one or both of the pressure source and traction system, depending on how a user wishes to operate the vehicle. For example, when using the downforce system, the energy store may be depleted more rapidly, as both the pressure source and the traction system consume energy from the energy store, which may reduce a range which the vehicle can travel. However, when the downforce system is not in use, the energy store may be depleted more slowly as only the traction system is consuming energy, such that the vehicle may travel a greater range. Thus, this configuration allows a user to use a capacity of the energy store for downforce or range, as they choose. In contrast, using separate energy stores would mean that both a maximum range and maximum pressure source usage time would be reduced for a given total weight of the energy stores, or more energy stores would be needed to give the same performance, leading to a bigger and heavier vehicle.

The downforce system as a whole may be powered by the energy store.

Where the vehicle is an electric vehicle or a hybrid vehicle, the energy store may be a battery which is used to power the traction system of the vehicle.

Herein the traction system of a vehicle refers to a system of the vehicle, including a motor or engine of the vehicle, which is used to drive the vehicle.

The pressure source may comprise one or more fans. The one or more fans may be arranged to extract air from the region defined by the restrictor and the ground surface, via the air flow path. A speed of the one or more fans may be variable, in order to adjust an amount of air extracted from the region, which in turn may affect the pressure differential across the restrictor. Various types of fan may be used. For example, the one or more fans may include one or more of an axial fan, a radial fan, a mixed flow fan and a centrifugal fan.

Thus, in some embodiments, the pressure source may comprise a centrifugal fan. A centrifugal fan may be better suited to low air flow and high pressure applications such as the present invention, compared to other types of fans. Therefore, using a centrifugal fan may enable a greater downforce to be achieved compared to other fans.

The pressure source may comprise at least two fans, each of the at least two fans being independently powered by a respective energy store, and wherein the respective energy stores are isolated from one another. Using at least two fans which are each independently powered may provide redundancy for the pressure source, which may improve safety of the downforce system. For example, in the case of a failure of one of the fans or energy stores, the other fan(s) may continue to operate normally. This may avoid a sudden loss of the downforce generated by the downforce system, which could be highly dangerous for the vehicle and its occupants. The respective energy store for each of the at least two fans may, for example, be a battery.

The two or more fans may be connected to the air flow path in parallel. The respective energy stores may be isolated from one another in that they are not electrically connected to one another. For example, the circuitry for powering one of the two or more fans with its respective energy store may be separate (and therefore electrically isolated) from circuitry for powering another one of the two or more fans with its respective energy store. This may avoid a fault, e.g. an electrical fault, which arises in one of the energy stores or fans from propagating to the other energy stores.

The respective energy stores may be thermally isolated from one another, to minimise transmission of heat between the respective energy stores. This may avoid overheating of one of the respective energy stores from causing overheating in other respective energy stores. For example, dividers made of thermally insulating material may be placed between each of the respective energy stores.

The pressure source may include an exhaust outlet, and an outlet valve that is closable to prevent air flow through the exhaust outlet. The outlet valve may be adjustable between an open and a closed position, to adjust a flow of air through the exhaust outlet. This may facilitate control of air flow through the pressure source.

The outlet valve may be configured to close when there is a failure of the pressure source. In this manner, when there is a failure of the pressure source, the outlet valve may automatically close, which may prevent an immediate loss of the pressure differential across the restrictor. This may avoid an immediate loss of the downforce generated by the downforce system, which could be highly dangerous for the vehicle and its occupants.

The controller of the downforce system may be configured to control the position of the outlet valve, e.g. via a control signal.

The downforce system may further comprise a pressure sensor configured to measure a pressure in the air flow path and/or in the restrictor (i.e. in the region defined at least in part by the restrictor and the ground surface). This may in turn enable the downforce generated by the downforce system to be estimated.

The downforce system may be controlled based on the pressure measured by the pressure sensor. For example, the height of the rim above the ground surface and/or a position of the one or more valves discussed above may be controlled based on the pressure measured by the pressure sensor. This may facilitate obtaining a desired pressure in the air flow path. For example, the pressure sensor may be configured to provide an output that is indicative of the pressure in the air flow path. The controller of the downforce system may then be configured to control the height of the rim above the ground surface and/or a position of the one or more valves based on the output signal from the pressure sensor.

The pressure sensor may be located inside the air flow path, or inside the restrictor. In some cases, multiple pressure sensors may be used, to measure pressures at different locations in the downforce system. For example, a pressure sensor may be located outside the restrictor in order to measure a pressure outside the restrictor. This may facilitate determining the pressure differential across the restrictor.

The pressure sensor may be configured to measure gauge pressure, i.e. a pressure change relative to atmospheric pressure.

In some cases, multiple pressure sensors may be used to measure a pressure change between the restrictor and the pressure source, e.g. a first pressure sensor may be located in the restrictor, and a second pressure sensor may be located at the pressure source. Measuring the pressure drop between the restrictor and the pressure source may enable an air flow rate through the air flow path to be estimated.

The restrictor may comprise a divider, the divider being configured to divide the region into at least two sub-regions. This may facilitate maintaining the pressure differential across the restrictor, as well as provide further flexibility in terms of control of the pressure differential. The at least two sub-regions may be defined within the restrictor, and separated by the divider in the restrictor. The divider may be configured to restrict air flow between the at least two sub-regions in the restrictor.

The pressure source may be configured to generate a pressure differential across the divider. This may provide more flexibility for controlling the downforce generated by the downforce system.

For example, the divider may be arranged within the restrictor to define a first sub-region which is disposed around a second, inner sub-region. The pressure source may be connected to the restrictor such that a pressure differential is generated across the divider between the first and second sub-regions. For example, the pressure source may be connected to an outlet of the restrictor that is disposed in the second, inner, sub-region, such that a lower pressure is generated in the second sub-region compared to the first sub-region. This may facilitate maintaining a low pressure in the inner sub-region, which may enable a larger downforce to be achieved. In some cases, there may be multiple dividers which are arranged to define multiple concentric sub-regions within the restrictor. This may enable a gradient of pressures to be set up from the outer-most sub-region to the inner-most sub-region.

As another example, the divider may be arranged to divide the region into two (or more) sub-regions which are arranged side-by-side. In such a case, the pressure source may be connected to the restrictor to enable a pressure differential to be generated across the divider.

For example, the pressure source may be connected to the restrictor via two or more valves that are operable to selectively couple the pressure source to each of the two sub-regions. By generating a pressure differential across the divider, the downforce generated on one side of the restrictor may be greater than on the other side of the restrictor. Therefore, by controlling the pressure differential across the divider, it may be possible to control a relative magnitude of the downforce generated by different sides of the restrictor, and thus acting on different sides of the vehicle.

The divider may be arranged in a longitudinal direction of the vehicle, such that a first sub-region is located towards a left side of the vehicle and a second sub-region is located towards a right side of the vehicle. This may enable the downforce to be applied preferentially towards one side of the vehicle, which may facilitate going around bends.

The divider may be arranged in a direction that is substantially perpendicular to the longitudinal direction of the vehicle, such that a first sub-region is located towards a front of the vehicle and a second sub-region is located towards a rear of the vehicle. This may enable the downforce to be applied preferentially towards the front or rear of the vehicle, which may facilitate accelerating and/or braking.

In some cases, a valve (e.g. throttle valve) may be disposed across the divider, to enable air flow across the divider, e.g. between sub-regions in the restrictor. This may facilitate controlling the pressure differential across the divider.

The dust and debris removal system may comprise a dust and debris removal device configured to remove dust and debris from air flowing along the air flow path. In this manner, dust and debris that is entrained in an air flow along the air flow path between the restrictor and the pressure source may be captured, such that it does not reach the pressure source. This may serve to protect the pressure source from dust and debris, and prevent the dust and debris from being blown out of the exhaust outlet of the pressure source. For example, the dust and debris removal device may be located in the air flow path, or at an outlet of the restrictor which is connected to the air flow path. The dust and debris removal device may be connected in series with the pressure source.

In some cases, the dust and debris removal system may include a dust and debris removal device disposed after the pressure source, e.g. connected to the exhaust outlet of the pressure source. This may be the case, for example, where the fan is a bladeless fan, as dust and debris carried by the air flow along the air flow path may be transmitted through the bladeless fan and into the dust and debris removal device.

The dust and debris removal system may include a dust and debris collection chamber for collecting dust and debris removed from the air flowing along the air flow path. Thus, dust and debris captured by the dust and debris removal system may be (temporarily) stored in the dust and debris collection chamber. This may avoid releasing captured dust and debris back onto the ground surface or into the atmosphere, which could be hazardous for other vehicles on the road. Additionally, storing the captured dust and debris in the dust and debris collection chamber may prevent the air flow path from becoming obstructed by the captured dust and debris. The dust and debris collection chamber may be any suitable receptacle for receiving dust and debris captured by the dust and debris removal system. Where the dust and debris removal system includes a dust and debris removal device, the dust and debris collection chamber may be included in the dust and debris removal device.

The dust and debris collection chamber may be configured to be self-emptying. This may facilitate emptying of the dust and debris collection chamber, such that a user need not manually empty the dust and debris collection chamber. In particular, this may facilitate emptying of the dust and debris collection chamber on the fly, i.e. during operation of the vehicle and/or downforce system. Any suitable mechanism may be used for emptying the dust and debris collection chamber. For example, the dust and debris collection chamber may include a valve that is configured to open in order to empty the dust and debris collection chamber. The valve may be configured to open when the pressure source is switched off, or when downforce system is not in use. The controller of the downforce system may be configured to control opening and closing of the valve of the dust and debris collection chamber, e.g. via a control signal.

The dust and debris removal system may include any suitable type of device for capturing or removing dust and debris from air flowing along the air flow path. For example, the dust and debris removal device may include a filter (e.g. cone filter), or a plurality of filtering materials arranged in series. Where a filter or filtering materials are used, the downforce system may be configured to empty the filter by operating in reverse.

In some embodiments, the dust and debris removal system may include a cyclonic filtration apparatus (or cyclone separator), e.g. the dust and debris removal device may be a cyclonic filtration apparatus. The cyclonic filtration apparatus may be combined with other types of dust and debris removal device, such as filters, etc. A cyclonic filtration apparatus may be less prone to becoming blocked compared to other types of filters, as well as having a greater dust and debris capturing capacity. Additionally, a pressure drop across a cyclonic filtration apparatus may be lower compared to other types of filters. A further benefit of using a cyclonic filtration apparatus is that it may be emptied on-the-fly.

The cyclonic filtration apparatus may comprise an axial cyclonic apparatus. In other words, an inlet of the cyclonic filtration apparatus may be configured to introduce air into a cyclone chamber of the cyclonic filtration apparatus along an axis of rotation of the air in the cyclone chamber. In such a case, the cyclonic filtration apparatus may be configured such that the axis of rotation of the air in the cyclone chamber is substantially horizontal. An axial cyclonic apparatus may result in a reduced pressure drop across the cyclonic filtration apparatus. This may also facilitate incorporating the cyclonic filtration apparatus into a vehicle.

In some cases, the cyclonic filtration apparatus may comprise a tangential cyclonic filtration apparatus. In other words, an inlet of the cyclonic filtration apparatus may be configured to introduce air into a cyclone chamber of the cyclonic filtration apparatus along a direction that is tangential to an axis of rotation of the air in the cyclone chamber. In such a case, the cyclonic filtration apparatus may be configured such that the axis of rotation of the air in the cyclone chamber is substantially vertical. A tangential cyclonic apparatus may improve the ability of the cyclonic filtration apparatus to separate dust and debris from air flowing along the air flow path.

The cyclonic filtration apparatus may include multiple (e.g. two or more) cyclone chambers connected in parallel. This may enable an air flow through the cyclonic filtration apparatus to be increased, as well as enable a pressure drop across the cyclonic filtration apparatus to be reduced.

The cyclonic filtration apparatus may include multiple (e.g. two or more) cyclone chambers connected in series. This may improve a quality of air filtration provided by the cyclonic filtration apparatus.

The dust and debris removal system may comprise a deflector configured to deflect dust and debris away from an outer surface of the restrictor. The deflector may thus prevent dust and debris on the ground surface from entering the restrictor, so that the dust and debris is not entrained in the air flow along the air flow path. The deflector may include any suitable mechanism for deflecting dust and debris away from the restrictor. For example, the deflector may include one or more air outlets configured to blow jets of air towards the ground surface to deflect dust and debris away from the restrictor. Additionally or alternatively, the deflector may include a brush or similar for deflecting dust and debris present on the ground surface away from the restrictor, when the vehicle moves over the ground surface.

The downforce system may further comprise a safety shutdown system configured to prevent an immediate loss of power to the pressure source in event of a failure of the downforce system and/or the vehicle. Preventing immediate loss of power to the pressure source may avoid a sudden loss of the downforce generated by the downforce system, which could be highly dangerous for the vehicle and its occupants.

In normal use, the pressure source may be powered by a primary energy store (e.g. battery). The safety shutdown system may comprise an auxiliary energy store which is configured to supply power to the pressure source in the event of a failure of the downforce system and/or the vehicle. The auxiliary energy store may comprise a battery. In one example, the auxiliary energy store may comprise a flywheel which is configured to be connected to the pressure source by a linkage system in the event of a failure of the downforce system and/or the vehicle. The linkage system may be configured to engage the pressure source with the flywheel in order to effect a gradual equalisation of the pressure differential. This may provide time for the driver to safely bring the vehicle to a stop.

The restrictor may be movable between a deployed position where the rim is configured to form the at least partial seal with the ground surface, and a stowed position where the rim is spaced apart from the ground surface. Thus, when the downforce system is not in use, the restrictor may be place in the stowed position. This may avoid damage to the restrictor when the downforce system is not in use. When the restrictor is in the stowed position, the rim may be at substantially a same height above the ground surface as the underside of the vehicle. For example, when the restrictor is in the stowed position, part or all of the restrictor may be disposed in a cavity or storage compartment in an underside of the vehicle. The restrictor may be moved between the deployed position and the stowed position by an actuator. For example, the actuator discussed above in relation to controlling the height of the rim above the ground surface may also be used to move the restrictor between the deployed and stowed positions.

The downforce system may further comprise a user interface configured to indicate an operating condition of the downforce system. In this manner, a user may be informed of an operation condition of the downforce system. An operation condition of the downforce system may include, for example, an on/off indicator, readings from one or more pressure sensors of the system, an indication of the height of the rim above the ground surface, an indication of the preload force applied to the rim, an estimate of the downforce generated by the system, and/or a flow rate of air through the system. The user interface may be provided by a display unit (e.g. screen) disposed inside the vehicle.

The user interface may further include one or more inputs for receiving an input from the user. In this manner, the user may control the downforce system via the user interface. For example, the user interface may enable the user to activate or deactivate the downforce system, and/or set an operating parameter of the downforce system (such as the height of the rim above the ground surface, the preload force applied to the rim, the downforce generated by the system, and/or a flow rate of air through the system). The controller may be connected to the user interface and configured to receive an input from the user via the user interface. The controller may then be configured to control the downforce system based on the input from the user.

The downforce system may further comprise a positioning mechanism for controlling (or adjusting) a longitudinal and/or lateral position of the restrictor relative to the vehicle. In this manner, the position of the region defined by the restrictor may be adjusted relative to the vehicle. By adjusting the longitudinal and/or lateral position of the restrictor relative to the vehicle, a position where the downforce generated by the downforce system acts on the vehicle may be adjusted. This may enable changes in weight distribution across the vehicle's tyres to be compensated for by adjusting the position of the restrictor, so that forces acting on the vehicle's tyres may be substantially equalised. This may improve grip across all the vehicle's tyres at higher velocities. Additionally, as a result of adjusting the longitudinal and/or lateral position of the restrictor, pitch and roll motions of the vehicle may be reduced, which may improve vehicle stability and tyre grip.

For example, when the vehicle goes around a bend, the restrictor may be moved to a side of the vehicle that is located on an inside of the bend. This may counteract centrifugal forces that the vehicle experiences when going around the bend, and which cause weight to be transferred to vehicle tyres located on a side of the vehicle that is on an outside of the bend. In other words, moving the restrictor towards the inside of the bend may cause the downforce generated by the downforce system to act preferentially on the side of the vehicle that is on the inside of the bend, which counteracts the centrifugal forces. As another example, when braking (i.e. during deceleration of the vehicle), the restrictor may be moved towards a rear of the vehicle, to counteract a diving motion of the vehicle. When accelerating, the restrictor may be moved towards a front of the vehicle, to counteract a squat motion of the vehicle (i.e.

dropping of the vehicle rear during acceleration). Where the vehicle is a rear-wheel drive vehicle, the restrictor may be moved towards a rear of the vehicle when accelerating, to counteract a diving motion of the vehicle. Thus, more generally, the restrictor may be moved towards a drive axle of the vehicle when accelerating.

Herein, a longitudinal position of the restrictor relative to the vehicle refers to a position of the restrictor along a longitudinal direction of the vehicle. The longitudinal direction of the vehicle may correspond to a direction along a forward direction of travel of the vehicle, e.g. defined by an axis that extends from a rear of the vehicle to a front of the vehicle. So, controlling the longitudinal position of the restrictor relative to the vehicle may involve moving the restrictor towards the front or the rear of the vehicle.

Herein, a lateral position of the restrictor relative to the vehicle refers to a position of the restrictor along a lateral direction of the vehicle. The lateral direction of the vehicle may correspond to a direction that is perpendicular to the longitudinal direction of the vehicle. So, controlling the lateral position of the restrictor relative to the vehicle may involve moving the restrictor towards a right-hand side or a left-hand side of the vehicle.

The positioning mechanism may include any suitable mechanism(s) for moving the restrictor in a longitudinal and/or lateral direction relative to the vehicle. In some cases, the positioning mechanism may also enable rotation, or yaw motion, of the restrictor relative to the vehicle.

The positioning mechanism may include one or more actuators for controlling the longitudinal and/or lateral position of the restrictor relative to the vehicle. The one or more actuators may also serve to control rotation of the restrictor relative to the vehicle. As an example, an actuator may include a piston such as a pneumatic cylinder, a hydraulic cylinder, an electrical actuator, a mechanical actuator (e.g. spring) or a magnetic actuator. The one or more actuators may be controllable by the downforce system, e.g. by the controller of the downforce system, in order to control the longitudinal and/or lateral position of the restrictor relative to the vehicle.

The positioning mechanism may include one or more first actuators configured to control the longitudinal position of the restrictor relative to the vehicle, and one or more second actuators configured to control the lateral position of the restrictor relative to the vehicle. So, by controlling the first and second actuators, the longitudinal and lateral position of the restrictor relative to the vehicle may be adjusted. Additionally, by individually controlling each of the actuators, it may be possible to control rotation of the restrictor relative to the vehicle.

Additionally or alternatively to the one or more actuators, the positioning mechanism may include a guiding element for guiding a longitudinal and/or lateral movement of the restrictor relative to the vehicle. The guiding element may define a path along which the restrictor is movable, in order to adjust the restrictor's longitudinal and/or lateral position relative to the vehicle. For example, the guiding element may include a rail, track, slot or similar, along which the restrictor is movable.

The downforce system may be configured to control the longitudinal and/or lateral position of the restrictor relative to the vehicle based on a motion of the vehicle. In this manner, the downforce system may automatically move the restrictor so that the downforce generated by the downforce system counteracts changes in weight distribution across the vehicle's tyres that are caused by motion of the vehicle. Control of the longitudinal and/or lateral position of the restrictor may be performed by the controller of the downforce system, e.g. via transmission of control signals to the positioning mechanism.

The downforce system may be configured to move the restrictor towards a front of the vehicle when the vehicle is accelerating.

The downforce system may be configured to move the restrictor towards a rear of the vehicle when the vehicle is decelerating (or braking).

The downforce system may be configured to, when the vehicle is going around a bend, move the restrictor towards a side of the vehicle that is located on an inside of the bend.

The downforce system (or vehicle) may include one or more sensors for detecting motion of the vehicle. The downforce system may then be configured to control the longitudinal and/or lateral position of the restrictor relative to the vehicle based on an output of the sensor.

Each of the one or more sensors may be configured to generate an output signal that is indicative of a vehicle motion detected by that sensor. The controller of the downforce system may then be configured to, based on the output signals from the one or more sensors, control the longitudinal and/or lateral position of the restrictor, e.g. by transmitting a control signal to the positioning mechanism.

For example, the one or more sensors may include one or more of an accelerator pedal sensor (e.g. arranged to detect when the driver is pressing on an accelerator pedal of the vehicle), and a brake pedal sensor (e.g. arranged to detect when the driver is pressing on a brake pedal of the vehicle). The one or more sensors may also include an accelerometer arranged to detect longitudinal and/or lateral acceleration of the vehicle.

In some embodiments, the downforce system may comprise a top surface (or top plate) that is mountable on the vehicle, and the restrictor may comprise a sidewall (or barrier) that is movably mounted relative to the top surface and that extends from the top surface towards the ground surface on which the vehicle is disposed, wherein the positioning mechanism is configured to control a longitudinal and/or lateral position of the restrictor relative to the vehicle, and wherein a sliding seal is formed between the top surface and the sidewall. In this manner, the top surface may remain fixed relative to the vehicle, whilst the sidewall may be moved longitudinally and/or laterally relative to the vehicle, in order to move the region relative to the vehicle. Together, the top surface and the sidewall of the restrictor may act to define the region over the ground surface.

The sidewall may extend around all or part of a perimeter of a restrictor area, in order to define at least a portion of the region and restrict air flow into the region. The top surface may have an area that is larger than the restrictor area, so that the sidewall can be moved relative to the top surface to move the position of the region relative to the vehicle. The top surface may be mountable on an underside of the vehicle. In some cases, the top surface may be formed by a portion of the underside of the vehicle.

The rim may be disposed at or near a lower end of the sidewall, so that it may form the at least partial seal with the ground surface when in use. The sidewall may be similar to the extendable coupling discussed above. For example, the sidewall may comprise a flexible material, e.g. the sidewall may be in the form of a flexible skirt or bellows. As another example, the sidewall may comprise a telescopic coupling. In this manner, the height of the rim above the ground surface may be controlled, as described above.

The sliding seal between the sidewall and the top surface may be configured to enable relative movement between the sidewall and the top surface, whilst restricting air leakage into the region between the sidewall and the top surface. The sliding seal may be disposed at an upper end of the sidewall. The sliding seal may, for example, be in the form of a brush seal or a rubber seal. The sliding seal may be lubricated, to facilitate relative movement between the sidewall and the top surface.

The ability to adjust the longitudinal and/or lateral position of the restrictor relative to the vehicle discussed above may constitute an independent aspect of the invention. Thus, according to a second aspect of the invention, there is provided a downforce system for a vehicle, the downforce system comprising: a restrictor configured to restrict a flow of air into a region that is defined at least in part by the restrictor and a ground surface on which the vehicle is disposed, a rim disposed on the restrictor and configured to form at least a partial seal with the ground surface; a pressure source configured to generate a pressure differential across the restrictor; and a positioning mechanism for controlling a longitudinal and/or lateral position of the restrictor relative to the vehicle. The downforce system of the second aspect of the invention may include any of the features discussed above in relation to the first aspect of the invention.

The downforce system of the first aspect or the second aspect of the invention may form part of a vehicle. Thus, according to a third aspect of the invention, there is provided a vehicle comprising a downforce system according to the first aspect or the second aspect of the invention. The vehicle may be any type of vehicle such as a road car or race car. The vehicle may be an electric vehicle, a hybrid vehicle, a vehicle with an internal combustion engine, a fuel-cell-powered vehicle, or any other type of powered vehicle.

The restrictor may be disposed on an underside of the vehicle. In this manner, the region defined at least in part by the restrictor and the ground surface may be located directly underneath the vehicle. For example, the restrictor may be mounted or formed on an underside of the vehicle. The restrictor may be centred relative to the underside of the vehicle, e.g. a centre of the restrictor may be aligned with a centre of the underside of the vehicle. This may serve to ensure that the downforce generated by the system acts evenly on the vehicle.

The restrictor may be connected to the vehicle via the mounting element discussed above. Alternatively, the restrictor may be formed as part of the underside of the vehicle.

A surface of the vehicle may be configured to guide an air flow around the restrictor such that an air pressure in the vicinity of the restrictor is reduced compared to atmospheric pressure when the vehicle is in motion. In this manner, when the vehicle is in motion, a low pressure region may occur directly outside the restrictor. This may facilitate maintaining a low pressure inside the restrictor, such that the pressure differential across the restrictor may be maintained more efficiently. The surface of the vehicle may serve to set up, when the vehicle is in motion, a pressure gradient in the vicinity of the restrictor which goes from atmospheric pressure away from the restrictor, to a lower pressure directly outside the restrictor.

For example, the surface of the vehicle may include a channel having a restriction in the vicinity of the restrictor, such that the air flow around the restrictor passes through the restriction, resulting in a low pressure in the vicinity of the restrictor. The channel may be located on the underside of the vehicle.

The surface of the vehicle configured to guide the air flow around the restrictor may be provided by a diffuser (e.g. underbody diffuser) of the vehicle, an undertray of the vehicle, and/or side strakes of the vehicle.

In some embodiments, the vehicle may be an electric vehicle, and the pressure source may be powered by an energy store that is shared with a traction system of the vehicle. For example, the energy store may be a battery that is used to power the electric vehicle. As discussed above, sharing power between the pressure source and the traction system of the vehicle may provide more flexibility to a user in terms of energy management for the vehicle, compared to using separate energy stores for the pressure source and the traction system.

Tyres of the vehicle may be configured to withstand the downforce generated by the downforce system. For example, a material, construction and/or dimensions of the tyres may be adapted in order to withstand the downforce generated by the downforce system.

The vehicle may comprise a tyre pressure control system, which is configured to adjust a pressure of the tyres of the vehicle based on a magnitude of the downforce generated by the downforce system. In this manner, the tyre pressure control system may compensate for the downforce generated by the downforce system. For example, the downforce system may include a sensor configured to measure the downforce generated by the downforce system and generate an output signal indicative of the magnitude of the downforce. The tyre pressure control system may use the output signal as an input for controlling the tyre pressure. The tyre pressure control system may comprise a pneumatic pump that is configured to adjust (e.g. increase or decrease) a pressure in the tyres. The pneumatic pump may be coupled to the tyres to enable tyre pressure to be adjusted while the wheels rotate.

According to a fourth aspect of the invention, there is provided a method of controlling a downforce system of a vehicle, wherein the downforce system is a downforce system according to the first aspect of the invention, the method comprising: forming the at least partial seal between the rim and the ground surface; generating, with the pressure source, a pressure differential across the restrictor; and preventing, using the dust and debris removal system, dust and debris from exiting the downforce system via the air flow path. The method of the fourth aspect of the invention makes use of the downforce system of the first aspect of the invention. Therefore, any features discussed above in relation to the previous aspects of the invention may be shared with the method of the fourth aspect of the invention. In particular, features relating to control of the downforce system may be applied to a method of controlling the downforce system.

Forming the at least partial seal between the rim and the ground surface may include lowering the rim to bring the rim into close proximity (e.g. contact) with the ground surface. For example, where the restrictor is movable between stowed and deployed positions, the step of forming the at least partial seal may include moving the restrictor from the stowed position to the deployed position.

Generating the pressure differential across the restrictor may include activating the pressure source, e.g. to remove air from the region defined at least in part by the restrictor and the ground surface. The air flow rate along the air flow path between the restrictor and the pressure source may be adjusted in order to control the pressure differential across the restrictor.

The method may further comprise controlling the pressure differential across the restrictor to obtain a desired pressure differential across the restrictor. This may enable accurate control of the downforce generated by the system. The controller of the downforce system may be configured to control the pressure differential across the restrictor.

Controlling the pressure differential across the restrictor may comprise one or more of: adjusting a height of the rim above the ground surface (to control leakage of air into the region), adjusting a preload force applied to the rim (which may affect a quality of the at least partial seal), and adjusting a position of the one or more valves (to adjust the air flow into the air flow path). Controlling the pressure differential across the restrictor may also include controlling the pressure source, e.g. controlling a power level of the pressure source to adjust an amount of air flow through the pressure source.

The method may further comprise controlling the pressure differential across the restrictor based on a ground speed of the vehicle. In this manner, the downforce generated by the downforce system may be adapted to a speed of the vehicle. The controller of the downforce system may be configured to control the pressure differential across the restrictor based on a ground speed of the vehicle.

For example, the downforce system may be activated (i.e. to generate a pressure differential across the restrictor) when a speed of the vehicle exceeds a predetermined threshold, e.g. 60 miles per hour. In some cases, the pressure differential may be gradually increased above the predetermined threshold.

In one example, when the vehicle is travelling along a straight section of road, the downforce generated by the downforce system may be reduced (by reducing the pressure differential across the restrictor), e.g. in order to save energy. This may be based on a detection of one or more of an absence of braking, no steering change, and an acceleration below a predetermined threshold, in order to ensure that the downforce can be safely reduced.

As discussed in relation to the first aspect of the invention, the pressure differential across the restrictor may be controlled in various ways.

The method may further include controlling the pressure differential across the restrictor based on a quality of the ground surface. This may ensure that the pressure differential across the restrictor is adapted to a quality of the ground surface, which may serve to avoid damage to the road surface and/or rim and restrictor. Where the ground surface is suitable (e.g. high quality asphalt), a high quality seal may be formed between the rim and the ground surface, such that a large pressure differential may be generated across the restrictor. In some circumstances, such a large pressure differential may result large suction force applied to the ground surface which may cause the ground surface to deform, and in some cases break. So, in such circumstances, it may be beneficial to reduce the pressure differential across the restrictor, to avoid damaging the ground surface (or components of the downforce system). The pressure differential may be controlled using the techniques mentioned above.

The ground surface may be monitored to detect deformation of the ground surface caused by the downforce system. This may be achieved using one or more distance measuring sensors, e.g. laser distance measuring sensors. In one set-up, a plurality of distance measuring sensors may be mounted at different positions on the restrictor, each sensor being configured to measure a distance to the ground surface. Readings from the distance measuring sensors may then be compared to determine whether the ground surface is deforming, e.g. being lifted. Another set-up may use one or more of ground penetrating radar, lidar or ultrasound in order to image ground below the ground surface. This may enable delamination of asphalt courses to be detected. In other set-ups, a line scanner may be used to detect deformation of the ground surface.

Where the downforce system includes a preload mechanism, the method may further include controlling the preload mechanism to vary the preload force during operation of the vehicle. Thus, the preload force applied to the rim may be varied during operation of the vehicle. This may enable the quality of the at least partial seal formed between the rim and the ground surface to be adjusted depending on driving circumstances of the vehicle. The controller of the preload system may be configured to control the preload mechanism to vary the preload force.

The preload force may be varied between a preset maximum value, and a preset minimum value.

The preload force may be varied based on an acceleration of the vehicle, e.g. based on a longitudinal and/or lateral acceleration of the vehicle. For example, the preload force may be increased with acceleration of the vehicle. This may result in an increased downforce during periods of acceleration. Increasing the preload force may result in an increased drag. Thus, the preload force may be optimised based on acceleration, in order to give an adequate downforce without generating excessive drag.

The preload force may be varied based on a location of the vehicle. For example, the preload force may be varied based on a location of the vehicle on a race track. The vehicle may include a location tracker (e.g. GPS tracker) which is configured to determine the location of the vehicle, so that the preload force may be varied based on the location of the vehicle. So, for example, the preload force may be adjusted (e.g. increased) when the vehicle goes around a bend in a road or a race track, in order to provide an increased downforce as the vehicle goes around the bend.

The method may comprise controlling the downforce system based on a detection of an emergency. For example, in a case of emergency, the downforce system may be activated, e.g. the restrictor may be moved from the stowed to the deployed position, and the pressure source may be activated. In another example, in a case of emergency, the downforce system may be controlled to increase the downforce generated by the downforce system, by increasing the pressure differential across the restrictor. Generating and/or increasing downforce may serve to reduce a braking distance of the vehicle, as well as improve stability and prevent rollover of the vehicle. Thus, by activating or increasing the downforce in a case of emergency, safety may be improved.

An emergency may correspond to a malfunction of one or more systems in the vehicle. In such a case, the controller of the downforce system may be configured to receive a signal indicating a malfunction of one or more systems in the vehicle and, in response, activate the downforce system or increase the downforce.

An emergency may also correspond to a loss of control of the vehicle by the driver. For example, the controller may be configured to detect one or more of sudden braking, a loss of load through the vehicle suspension, large lateral accelerations, and an impact, which may be indicative of a loss of control or unsafe driving of the vehicle. The downforce system may include an accelerometer or other suitable sensor for detecting motion of the vehicle. The controller may then activate the downforce system or increase downforce when an output signal from the accelerometer is indicative of an emergency.

The method may also include detecting an emergency based on one or more vital signs of the driver. A vital sign of the driver may, for example, be a heart rate or eye movement of the driver. In some cases, a vital sign may correspond to a pressure exerted by the driver on the steering wheel and/or pedals. Driver vital signs may be detected using appropriate sensors. For example, the driver may have a wearable sensor for detecting heart rate. The downforce system may include a camera for detecting eye movement, and/or one or more sensors in the steering wheel for detecting a pressure exerted by the user. The one or more vital signs may serve, for example, to detect when the driver loses consciousness, which may result in a determination that there is an emergency.

Where the downforce system comprises a positioning mechanism for controlling a longitudinal and/or lateral position of the restrictor relative to the vehicle, the method may further include controlling the longitudinal and/or lateral position of the restrictor relative to the vehicle based on a motion of the vehicle.

The method may include moving the restrictor towards a front of the vehicle when the vehicle is accelerating.

The method may include moving the restrictor towards a drive axle of the vehicle when accelerating. For example, where the vehicle is a rear-wheel drive vehicle, the restrictor may be moved towards the rear of the vehicle when accelerating; where the vehicle is a front-wheel drive vehicle, the restrictor may be moved towards a front of the vehicle when accelerating.

The method may include moving the restrictor towards a rear of the vehicle when the vehicle is decelerating (or braking).

The method may include, when the vehicle is going around a bend, moving the restrictor towards a side of the vehicle that is located on an inside of the bend.

BRIEF DESCRIPTION OF THE DRAWINGS

Examples of the invention are discussed below with reference to the accompanying drawings, in which:

FIGS. 4a, 4b and 4c are cross-sectional views of a portion of a downforce system that is an embodiment of the invention, where a restrictor of the downforce system is in a deployed position in FIGS. 4a and 4b, and the restrictor of the downforce system is in a stowed position in FIG. 4c;

FIG. 4d is a cross-sectional view of a portion of a downforce system that is an embodiment of the invention;

FIGS. 5a and 5b are cross-sectional views of a portion of a downforce system that is an embodiment of the invention, where a restrictor of the downforce system is in a deployed position in FIG. 5a, and the restrictor of the downforce system is in a stowed position in FIG. 5b;

FIG. 6a is a cross-sectional view of a portion of a downforce system that is an embodiment of the invention;

FIG. 6b is a cross-sectional view of a portion of a downforce system that is an embodiment of the invention;

FIG. 7a is a cross-sectional view of a rim that may be part of a downforce system that is an embodiment of the invention;

FIG. 7b is a cross-sectional view of a rim that may be part of a downforce system that is an embodiment of the invention;

FIG. 11 is a cross-sectional view of a rim that may be part of a downforce system that is an embodiment of the invention;

DETAILED DESCRIPTION; FURTHER OPTIONAL FEATURES

Figure 1:
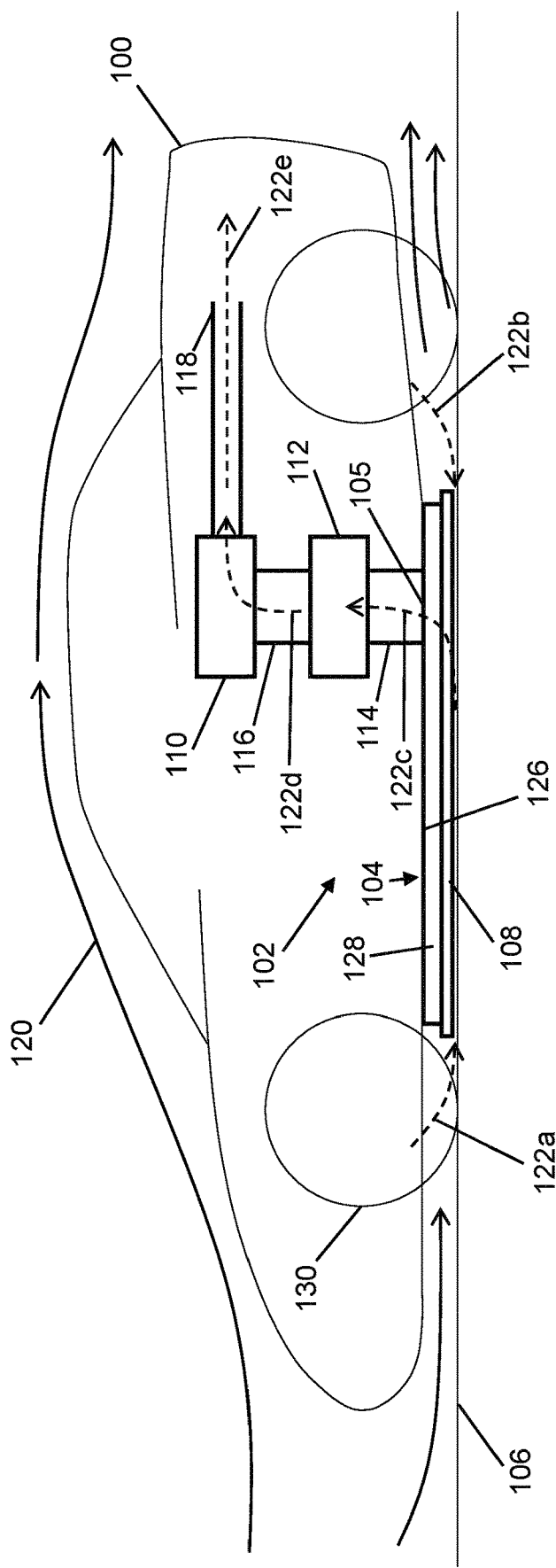
FIG. 1 is a cross-sectional side view of a vehicle comprising a downforce system that is an embodiment of the invention.

FIG. 1 shows a cross-sectional side view of a vehicle 100 comprising a downforce system 102 according to an embodiment of the invention. The downforce system 102 is configured to generate a downforce which acts on the vehicle, in order to improve the vehicle's traction. This may, for example, improve the vehicle's ability to go around bends at speed, and prevent the vehicle from slipping. The vehicle 100 may be any suitable vehicle, such as a road car or similar.

The downforce system 102 includes a restrictor 104 which is disposed on an underside of the vehicle 100. The restrictor 104 is disposed over a ground surface 106 (e.g. road) on which the vehicle 100 is disposed, such that the restrictor 104 defines a region over the ground surface 106 which is substantially enclosed by the restrictor 104 and the ground surface 106. The restrictor 104 is in the form of a continuous barrier or enclosure which serves to define the region inside the restrictor 104 and over the ground surface 106, and restrict air flow from the atmosphere outside the vehicle 100 into the region over the ground surface 106. In particular, the restrictor 104 includes a top surface 126 (e.g. in the form of a plate) which is disposed on the underside of the vehicle 100, and a sidewall 128 disposed around a perimeter of the top surface 126, and which extends from the top surface 126 towards the ground surface 106. A shape and position of the restrictor 104 on the underside of the vehicle 100 are discussed in more detail below, in relation to FIG. 2.

A rim 108 is disposed at a lower edge of the sidewall 128 of the restrictor 104. The rim 108 is configured to be in close proximity with the ground surface 106, in order to form an at least partial seal with the ground surface 106. In some cases, the rim 108 may be in direct contact with the ground surface 106, whilst in other cases there may be a small gap between the rim 108 and the ground surface 106. The at least partial seal between the rim 108 and the ground surface 106 serves to minimise a leakage of air from the atmosphere into the region inside the restrictor 104.

The downforce system 102 further includes a pressure source 110 and dust and debris removal device 112. The pressure source 110 and dust and debris removal device 112 are disposed within the vehicle 100 and connected in series along an air flow path of the downforce system 102. The air flow path is defined by a first conduit 114 which is connected between an outlet 105 of the restrictor 104 and an inlet of the dust and debris removal device 112, and a second conduit 116 which is connected between an outlet of the dust and debris removal device 112 and an inlet of the pressure source 110. The first and second conduits 114, 116 may, for example, be formed by appropriate lengths of connecting pipes or tubes.

The pressure source 110 is configured to cause air to flow along the air flow path between the restrictor 104 and the pressure source 110, in order to extract air from the region defined inside the restrictor 104. In other words, the pressure source 110 is configured to cause air to flow out of the region define inside the restrictor 104, via the first conduit 114, dust and debris removal device 112 and second conduit 116. In this manner, the pressure source 110 may cause a low pressure to develop in the region defined inside the restrictor 104, compared to the atmospheric pressure surrounding the outside of the restrictor 104. Thus, the pressure source 110 may enable a pressure differential to be generated across the restrictor, i.e. a pressure difference between the inside and outside of the restrictor 104. As a result of the pressure differential generated across the restrictor 104, a downforce is generated which acts on the vehicle 100. The pressure source 110 is connected to an exhaust outlet 118, via which the exhaust air (i.e. air extracted from the region inside the restrictor 104) is expelled.

The pressure source 110 may include one or more fans configured to cause air to flow along the air flow path described above. For example, the pressure source 110 may include a centrifugal fan. The pressure source 110 is a dedicated pressure source in that it includes a dedicated motor that is independent from a main motor (or engine) of the vehicle 100 which serves to drive the vehicle 100. However the pressure source 110 may be powered by an energy store which is shared with other vehicle systems. For example, the vehicle 100 may include a battery (not shown), which is used to power both the pressure source 110 and a traction system of the vehicle.

In one example, the pressure source 110 may comprise a first fan and a second fan, which are connected in parallel to the second conduit 116. In other words, both an inlet of the first fan and an inlet of the second fan are connected to the second conduit 116. In this manner, both the first and second fans may cause air to flow along the air flow path between the restrictor 104 and the pressure source 110. Using two separate fans as the pressure source 110 may provide a level of redundancy, such that the pressure source 110 may continue to operate even if one of the fans fails. This may avoid a sudden loss of the downforce generated by the downforce system 102, in case of failure of one of the fans. To provide further redundancy, the first fan and second fan may be powered by separate energy stores (e.g. separate batteries), which are electrically isolated from one another. Thermal insulation may also be provided between the two energy stores. Alternatively, where a first and second fan are used, each fan may have an associated dust and debris removal device, such that the associated dust and debris removal devices are connected in parallel to the first conduit 114.

The dust and debris removal device 112 is configured to capture dust, debris or water that are present in the air flowing along the air flow path between the restrictor 104 and the pressure source 110. In practice, dust, debris and/or water may be present on the ground surface 106. Such dust, debris and/or water may become entrained in the air flow generated by the pressure source 110, which could cause damage to the pressure source 110 and/or present a hazard for other vehicles if expelled through the exhaust outlet 118. Thus, the dust and debris removal device 112 may prevent dust, debris and/or water from reaching the pressure source 110 and being blown out of the system. An example of a dust and debris removal device is described in more detail, in relation to FIGS. 12a, 12b and 12c.

In other embodiments, the dust and debris removal device 112 may be located at a different location compared to that shown in FIG. 1. For example, the dust and debris removal device 112 may be disposed at the outlet 105 of the restrictor 104. In some cases, the dust and debris removal device 112 may be partially or entirely disposed within the restrictor 104. In some cases, the dust and debris removal device 112 may be located after the pressure source 110, e.g. it may be connected to an outlet of the pressure source 110, with the outlet of the dust and debris removal device 112 being connected to the exhaust outlet 118. This may be the case, for example, where the pressure source 110 includes a bladeless fan.

The dust and debris removal device 112 may be part of a dust and debris removal system of the downforce system 102. The dust and debris removal system may include other components (not shown) which are further configured to prevent dust and debris from exiting the downforce system via the exhaust outlet 118. For example, the dust and debris removal system may include one or more deflectors disposed around a perimeter of the rim 108 and arranged to prevent dust and debris on the ground surface 106 from entering the region inside the restrictor 104. A deflector of the dust and debris removal system may be in the form of an air outlet on the rim 108 or restrictor 104 which is directed at the ground surface 106 and arranged to blow a jet of air towards the ground surface 106 in order to deflect dust and debris on the ground surface 106 away from the restrictor 104. Additionally or alternatively, a deflector of the dust and debris removal system may be in the form of a brush or similar on the rim 108 or restrictor 104 and arranged to contact the ground surface 106 to deflect dust and debris on the ground surface 106 away from the restrictor 104.

The solid arrows 120 in FIG. 1 illustrate an air flow around the vehicle 100, when the vehicle 100 drives in a forward direction. The dashed arrows 122 in FIG. 1 illustrate an air flow through the downforce system 102 when the pressure source 110 is activated. When the pressure source 110 is activated (e.g. when the one or more fans are switched on), air is caused to flow along the air flow path from the restrictor 104 to the pressure source 110, which then expels exhaust air through the exhaust outlet 118. As illustrated, air flowing out of the region inside the restrictor 104 along the air flow path passes into the dust and debris removal device (arrow 122c), where dust, debris and/or water present in the air flow are captured. The air flow then passes through the pressure source 110 (arrow 122d), and is finally expelled via the exhaust outlet 118 (arrow 122e). The flow of air out of the region inside the restrictor 104 causes a drop in pressure in the region inside the restrictor 104, which results in a flow (leakage) of air into the region via the at least partial seal between the rim 108 and the ground surface 106, as illustrated by arrows 122a and 122b. The magnitude of leakage into the region inside the restrictor 104 will depend on a quality of the at least partial seal between the rim 108 and the ground surface 106. The pressure differential generated across the restrictor 104 depends on the air flow rate into the region inside the restrictor 104, and the air flow rate along the air flow path to the pressure source 110.

The exhaust outlet 118 may include an outflow conditioning assembly (not shown), which is arranged to direct the air blown out of the exhaust outlet in a particular direction. For example, the outflow conditioning assembly may include a bell mouth, which may serve to improve an efficiency of the air flow out of the exhaust outlet 118. The outflow conditioning assembly may include a noise dampener (e.g. muffler) in order to reduce a noise generated by air flowing out of the exhaust outlet 118. The outflow conditioning assembly may include a safety barrier, e.g. a mesh or grille barrier, for improved safety (e.g. to prevent a user to accessing the pressure source 110 when it is activated).

Figure 2:
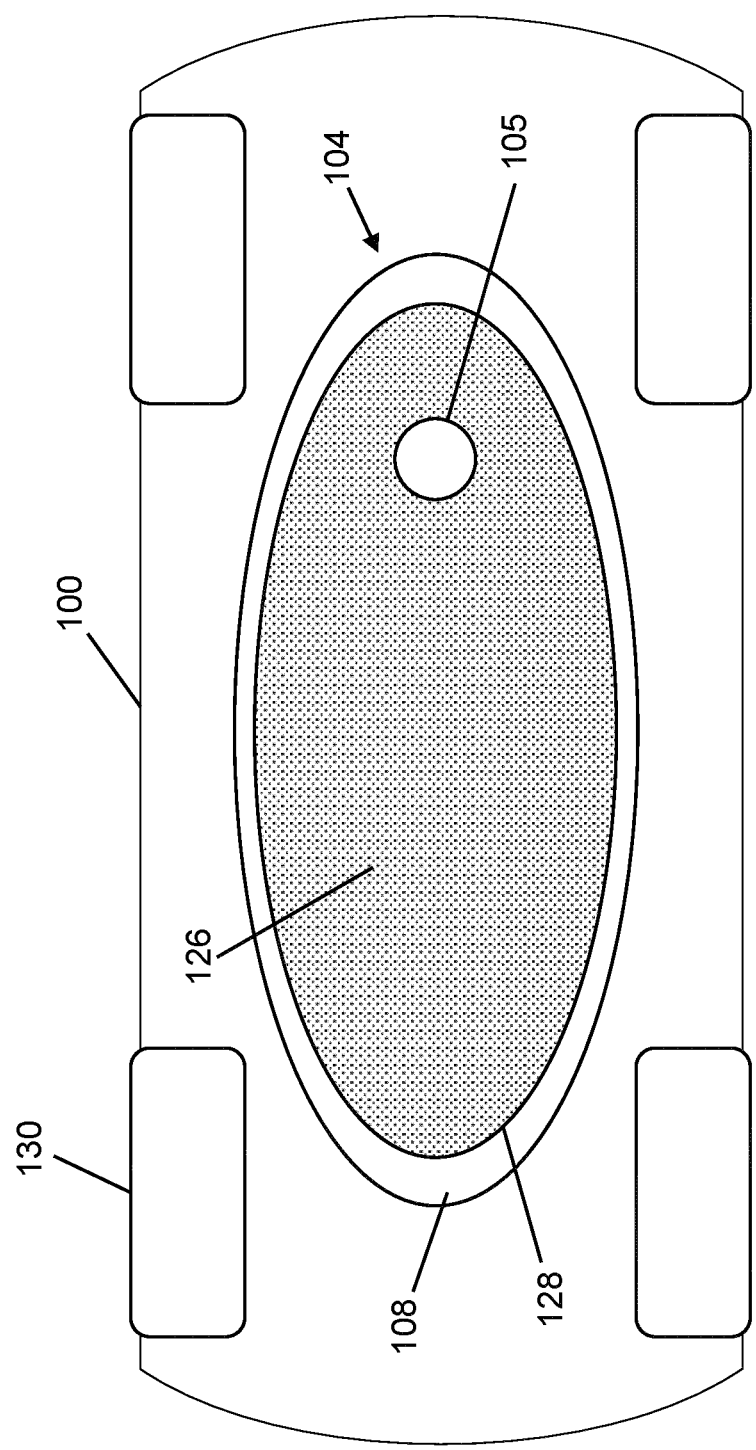
FIG. 2 is a view of an underside of the vehicle of FIG. 1.

FIG. 2 shows a view of the underside of the vehicle 100. The restrictor 104 is disposed on the underside (e.g. undercarriage) of the vehicle 100, and is substantially centred with respect to the underside of the vehicle 100. The top surface 126 (shown as a shaded area in FIG. 2) of the restrictor 104 defines a substantially oval-shaped area, such that the restrictor 104 serves to define an oval-shaped region above the ground surface 106. For example, the restrictor 104 may define a substantially ellipse-shaped area. Although the top surface 126 is shown as oval-shaped in this example, other shapes may also be used. Such an oval-shaped restrictor 104 may reduce a drag produced by the restrictor 104 when the vehicle is moving. This shape may also avoid the restrictor 104 interfering with motion of wheels 130 of the vehicle.

As shown in FIG. 2, the outlet 105 of the restrictor 104 is formed in the top surface of the restrictor 104. In this manner, air disposed in the region defined by the restrictor 104 and the ground surface 106 may be evacuated from the region via the outlet 105, as described above. As also shown in FIG. 2, the rim 108 is disposed on the lower edge of the sidewall 128 of the restrictor 104 (i.e. an edge of the sidewall 128 closest to the ground surface 106), and extends around the entire perimeter of the restrictor 104. In this manner, the rim 108 may serve to form an at least partial seal around the entire perimeter of the restrictor 104.

Although in the example shown the sidewall 128 of the restrictor 104 extends continuously around the perimeter of the top surface 126, in some cases the sidewall 128 may be partially open at one end of the restrictor 104, e.g. an end of the restrictor 104 towards a rear of the vehicle 100.

Figure 3:
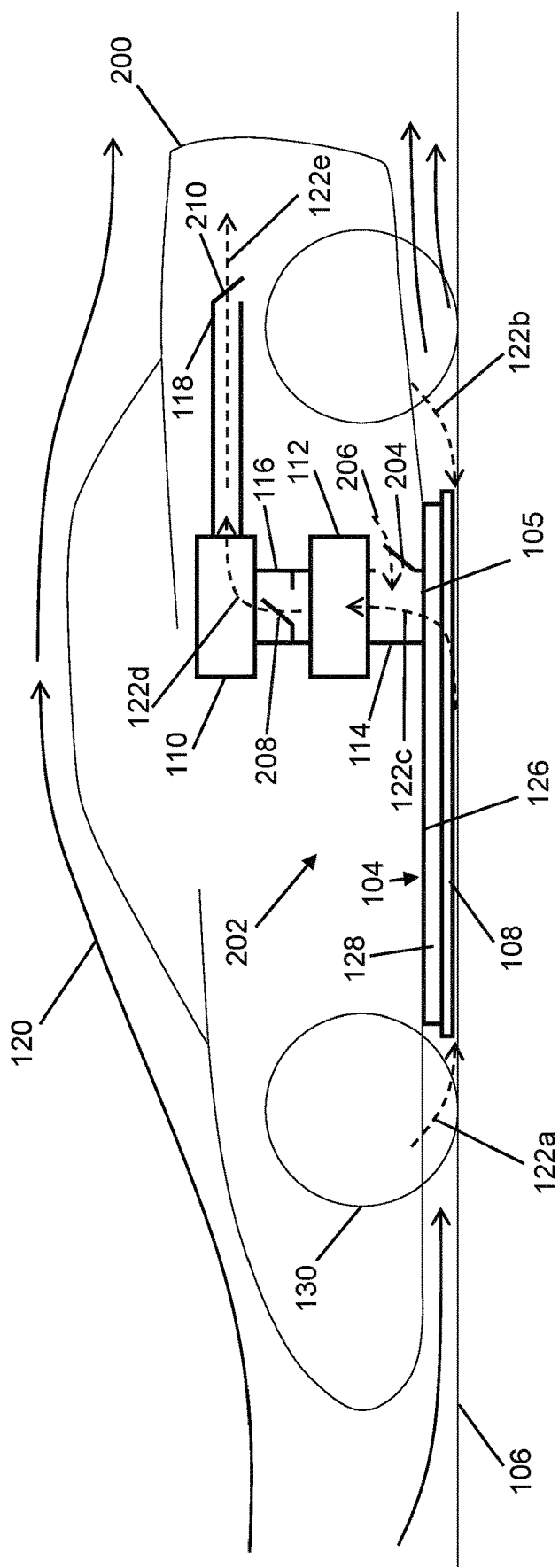
FIG. 3 is a cross-sectional side view of a vehicle comprising a downforce system that is an embodiment of the invention.

FIG. 3 shows a cross sectional view of a vehicle 200 comprising a downforce system 202 that is an embodiment of the invention. The vehicle 200 and downforce system 202 are similar to the vehicle 100 and downforce system 102 described above, respectively. For convenience, features in FIG. 3 which correspond to those described above in relation to FIG. 1 are given the same reference numerals as in FIG. 1, and are not described again. Features described below in relation to FIG. 3 may also be shared with the embodiment of FIG. 1.

The downforce system 202 includes a series of valves which are operable to control the flow of air through the downforce system 202. In particular, the downforce system 202 includes a first valve 204 which is disposed in a sidewall of the first conduit 114, such that it is in parallel with the pressure source 110. The first valve 204 is adjustable between an open state, in which air may flow via the first valve 204 from the atmosphere into the first conduit 114 and the region defined inside the restrictor 104, and a closed state where air flow through the first valve 204 is prevented. Thus, the state of the first valve 204 may be adjusted between the open and closed states to control a flow of air from the atmosphere into the region inside the restrictor 104 and the air flow path from the restrictor 104 to the pressure source 110. By adjusting the first valve 204 towards the open state, air flow into the region and the air flow path may be increased. When the pressure source 110 is activated such that air flows along the air flow path from the restrictor 104 to the pressure source, the first valve 204 may be opened, which may cause air from the atmosphere to be drawn into the air flow path, as illustrated by arrow 206. This may cause the pressure differential generated across the restrictor 104 to be reduced (compared to when the first valve 204 is closed), resulting in a reduction of the generated downforce.

The downforce system 202 also includes a second valve 208, which is disposed in the second conduit 116 and arranged to control the flow of air through the second conduit 116. Thus, the second valve 208 is disposed in series with the pressure source 110. The second valve 208 is adjustable between an open state, in which air is allowed to flow through the second conduit 116 via the second valve 208, and a closed state where the second valve 208 prevents air flow through the second conduit 116. In this manner, the position of the second valve 208 may be adjusted to control air flow through the second conduit 116, and thus air flow along the air flow path between the restrictor 104 and the pressure source 110. By adjusting the second valve 208 towards the open state, air flow along the air flow path may be increased, which may result in an increase of the pressure differential generated across the restrictor 104. By adjusting the second valve 208 towards the closed state, air flow along the air flow path may be reduced, which may result in a reduction of the pressure differential generated across the restrictor 104. So, the state of the second valve 208 may be adjusted to vary the downforce generated by the downforce system 202.

The downforce system 202 includes a third valve 210 which is disposed on the exhaust outlet 118 and arranged to control air flow through the exhaust outlet 118. The third valve is adjustable between an open state in which air can flow through of the exhaust outlet via the third valve 210, and a closed state in which the third valve 210 prevents air from flowing through the exhaust outlet 118. The third valve 210 may be closed when the downforce system 202 is not in use, e.g. to prevent dust and debris from entering the downforce system 202 via the exhaust outlet 118. The third valve 210 may also be configured to close in case of a failure of the pressure source 110. In this manner, if the pressure source 110 fails, air is prevented from flowing through the exhaust outlet 118, which may prevent a sudden loss of the pressure differential across the restrictor 104, so that there is no sudden loss of downforce.

The first valve 204, second valve 208 and third valve 210 may each be continuously adjustable between the open and closed states, which may enable fine control of the air flow through the air flow path. For example, the first valve 204, second valve 208 and third valve 210 may be throttle valves.

The downforce system 202 includes a controller (not shown) which is configured to control the states of the first valve 204, second valve 208 and third valve 210. For example, the controller may be connected to the first valve 204, second valve 208 and third valve 210 (e.g. via a wired or wireless connection), such that the controller may transmit control signals to each of the first valve 204, second valve 208 and third valve 210 in order to control the states of the valves. The controller of the downforce system 202 may, for example, be implemented by an on-board computing system of the vehicle 200.

The downforce system 202 includes a pressure sensor (not shown), which is disposed in the air flow path between the restrictor 104 and the pressure source 110, and arranged to measure a pressure in the air flow path. For example, the pressure sensor may be located in the first conduit 114 or the second conduit 116. In some cases, the pressure sensor may be located inside the restrictor 104, so that it can measure a pressure in the region defined inside the restrictor. The pressure sensor is connected to the controller of the downforce system 202 (e.g. via a wired or wireless connection), and configured to transmit an output signal to the controller which is indicative of the measured pressure. The controller may then be configured to control the states of the first valve 204 and the second 208, based on the output signal received from the pressure sensor. This may enable accurate control of the pressure in the air flow path and the region defined inside the restrictor 104, which may facilitate control of the pressure differential generated across the restrictor 104. The pressure sensor may be configured to measure gauge pressure, i.e. a pressure change relative to atmospheric pressure. In this manner, the pressure sensor may be used to determine the pressure differential across the restrictor 104, and estimate the downforce generated by the downforce system 202.

In some cases, the downforce system 202 may include multiple pressure sensors for measuring pressure at different locations in and around the downforce system 202. For example, a first pressure sensor may be disposed inside the restrictor 104, whilst a second pressure sensor may be disposed outside the restrictor 104. By comparing measurements of the first and second pressure sensors, the controller may calculate the pressure differential across the restrictor 104.

The controller is further configured to control operation of the pressure source 110. For example, the controller may be connected to the pressure source 110 (e.g. via a wired or wireless connection), so that the controller may transmit a control signal to the pressure source 110 to control operation of the pressure source 110. For example, the controller may be configured to control an on/off state of the pressure source 110. The controller may also be configured to control a speed of the one or more fans of the pressure source 110.

The controller may also be configured to monitor an operating state of the pressure source 110, in order to ensure that the pressure source is operating properly. For example, the pressure source 110 may include one or more sensors configured to measure a fan speed and/or a torque required to rotate the fan. The pressure source 110 may also include a sensor configured to detect an obstruction of the fan. The controller may be configured to receive an output signal from the one or more sensors of the pressure source, and to determine, based on the output signal from the one or more sensors, an operating condition of the pressure source 110. If the controller determines that the pressure source 110 is not functioning properly (e.g. because the fan speed is below a predetermined threshold, or there is an obstruction of the fan), the controller may be configured to close third valve 210, in order to prevent a sudden loss of the pressure differential across the restrictor 104. The controller may also be configured to determine whether the pressure source is functioning properly based on the output signal from the pressure sensor (e.g. the controller may determine that there is a failure of the pressure source 110 when there is a sudden change in pressure measured by the pressure sensor).

FIGS. 4*a*, 4*b* and 4*c* show cross-sectional views of a portion of a downforce system 400 which is an embodiment of the invention. The downforce system includes a restrictor 401 which is mounted on an underside 402 of a vehicle. The downforce system 400 may, for example, correspond to downforce system 102 or 202 discussed above. For illustration purposes, a pressure source and dust and debris removal system of the downforce system 400 are not illustrated in FIGS. 4*a*, 4*b* and 4*c*. The pressure source and dust and debris removal system of the downforce system 400 may have a similar configuration to those described above in relation to downforce system 102 or 202. Also for illustration purposes, only the underside 402 of the vehicle is shown in FIGS. 4*a*, 4*b* and 4*c*. The cross-sectional views of FIGS. 4*a*, 4*b* and 4*c* are taken along a plane that is perpendicular to a direction of travel of the vehicle, i.e. perpendicular to a longitudinal direction of the vehicle.

The restrictor 401 includes a top plate 404 which is disposed on the underside 402 of the vehicle. The top plate 404 provides a top surface for the restrictor 401, and may act as a mounting element for mounting the restrictor 401 on the vehicle. For example, top plate 404 may correspond to top surface 126 of restrictor 104 described above, such that the top plate 404 may be substantially oval-shaped. The underside 402 of the vehicle may, for example, correspond to the undercarriage or chassis of the vehicle. An outlet of the restrictor 401 may be defined in the top plate 404, e.g. similarly to outlet 105 for restrictor 104.

The restrictor 401 further includes a sidewall in the form of a flexible skirt 406, which is disposed around a perimeter of the top plate 404, and which extends from the top plate 404 towards a ground surface 408 on which the vehicle is disposed. The flexible skirt 406 acts as a sidewall of the restrictor 401, and may, for example, correspond to sidewall 128 of restrictor 104 described above. The flexible skirt 406 is made of a flexible or supple material, which is substantially impermeable to air flow. In other embodiments, a different type of flexible coupling, other than flexible skirt 406 may be used. For example, the flexible skirt 406 may be replaced by a flexible bellows. The flexible skirt 406 may be formed of a flexible material, such as Nylon, rubber, or thin composite materials.

The restrictor 401 serves to restrict air flow into a region 410 which is defined by the restrictor 401 and the ground surface 408. The region 410 is substantially enclosed by the restrictor 401 and the ground surface 408.

The downforce system 400 includes a rim 412 which is disposed at a lower edge of the flexible skirt 406. For example, the rim 412 may correspond to the rim 108 of downforce system 102 or 202 described above. The rim 412 includes a portion 414 that extends outwards from the lower edge of the flexible skirt 406, i.e. away from the region defined within the restrictor 401. The portion 414 of the rim 412 is arranged such that it is approximately parallel with the ground surface 408. The rim 412 includes a sealing element 416 which is disposed on the portion 414 of the rim, and which is configured to contact the ground surface 408 in order to form an at least partial seal with the ground surface 408. In this manner the sealing element 416 may act to prevent or restrict air flow from the atmosphere around the vehicle into the region 410 defined inside the restrictor 401. The sealing element 416 may mounted on the portion 414 of the rim 412 in a manner which facilitates removal and replacement of the sealing element 416. For example, the sealing element 416 may be secured to the portion 414 of the rim 412 via one or more releasable fasteners, such as screws, clamps, clips, or the like. The sealing element 416 may also be secured to the portion 414 of the rim 412 via one or more magnets, or with an adhesive.

The flexible skirt 406 enables relative movement between the top plate 404 and the rim 412; i.e. the flexible skirt 406 serves to movably connect the top plate 404 and rim 412. Thus, the flexible skirt 406 may deform (e.g. flex or bend) to enable relative movement between the top plate 404 and the rim 412. As a result, when a height of the underside 402 of the vehicle above the ground surface 408 changes, the flexible skirt 406 may flex or bend in response to such change, so that the rim 412 may remain in contact with the ground surface 408. This may, for example, facilitate maintaining the at least partial seal between the rim 412 and the ground surface 408 when the height of the underside 402 of the vehicle above the ground surface 408 changes, e.g. due to the vehicle turning or going over a bump in the ground surface 408. An example of such a situation is illustrated in FIG. 4*b*, where a right side 422 of the vehicle is lower than a left side 424 of the vehicle. This may be caused, for example, by the vehicle going around a bend. As can be seen in FIG. 4*b*, the flexible skirt 406 deforms to compensate to the relative change in height between the right side 422 and left side 424 of the vehicle, such that the rim 412 remains in contact with the ground surface 408.

To allow for the relative movement between the top plate 404 and the rim 412, the flexible skirt 406 may be configured such that there is some slack in the flexible skirt 406 when the rim 412 is in contact with the ground surface 408 (via sealing element 416). In this manner, the flexible skirt 406 may extend or contract to accommodate changes in height of the underside 402 of the vehicle. Thus, the flexible skirt 406 may provide an extendable coupling between the top plate 404 and the rim 412.

The downforce system 400 further includes actuators 418, which are connected between the underside 402 of the vehicle and the portion 414 of the rim 412. The actuators act as a preload mechanism which serves to exert a preload force on the rim 412 in order to press the rim 412 towards the ground surface 408. By pressing the rim 412 towards the ground surface 408, the sealing element 416 may provide an effective seal between the rim 412 and the ground surface 408, which may minimise air leakage into the region 410 inside the restrictor 401.

The actuators 418 may also serve to ensure that the sealing element 416 of the rim 412 remains in contact with the ground surface 408, even when there are changes in the height of the underside 402 of the vehicle above the ground surface 408. For example, the actuators 418 may be configured to apply a substantially constant preload force to the rim 412, in order to maintain the sealing element 416 in contact with the ground surface 408. In one example, the actuators 418 may be in the form of pneumatic cylinders that are part of a pneumatic system. The pneumatic system may include a remote reservoir of pressurised air (not shown) that is used for actuating the pneumatic cylinders. The remote reservoir may contain a relatively large volume of air, which may cause the pneumatic system to act as a low rate air spring. As a result, the preload force applied by the actuators 418 may remain substantially constant, as a change in pressure of the air in the pneumatic system caused by a change in height of the underside 402 of the vehicle above the ground surface 408 (e.g. due to the vehicle going over a bump in the ground surface 408) may be negligible.

The actuators 418 enable the preload force that is applied to the rim 412 to be adjusted. In the example shown, each of the actuators 418 is in the form of a piston, such as a pneumatic cylinder. However other known types of actuator which enable controlled application of a force may be used. For example, a hydraulic cylinder, an electrical actuator, a mechanical actuator (e.g. spring) or a magnetic actuator may also be used for actuators 418.

The rim 412 further includes spacers in the form of castor wheels 420 which are disposed on the portion 414 of the rim 412, and which are arranged to contact the ground surface 408. A height of the castor wheels 420 may be substantially the same as a height of the sealing element 416, such that both the castor wheels 420 and sealing element 416 may be in contact with the ground surface 408. The castor wheels 420 may optionally be made of a material which has a greater hardness than a material of the sealing element. In this manner, the castor wheels 420 may have a greater resistance to abrasion than the sealing element 416.

The castor wheels 420 are configured to transfer a majority of the preload force applied to the rim 412 by the actuators 418 to the ground surface 408. In particular, the actuators 418 are connected to the portion 414 of the rim 412 directly above the castor wheels 420, such that the majority of the preload force applied by the actuators 418 is transferred to the castor wheels. This configuration may avoid applying most of the preload force to the sealing element 416, which may minimise abrasion of the sealing element 416 by the ground surface 408, and improve a lifetime of the sealing element 416.

The actuators 418 may be controlled by a controller of the downforce system 400, e.g. similar to the controller of downforce system 202 discussed above. The controller may be connected to the actuators 418 (via a wired or wireless connection), so that the controller can transmit a control signal to the actuators 418 in order to control the preload force applied by the actuators 418. By controlling the preload force applied by the actuators 418, a quality of the seal formed by the sealing element 416 between the rim 412 and the ground surface 408 may be varied, such that a leakage of air from the atmosphere into the region 410 via the seal may be controlled. This may enable a pressure differential across the restrictor 401 (i.e. pressure differential between pressure in the region 410 and the atmosphere outside the restrictor 401) to be controlled. For example, by increasing the preload force applied to the rim 412, air leakage into the region 410 may be reduced, which may result in a greater pressure differential across the restrictor 401. On the other hand, by reducing the preload force applied to the rim 412, air leakage into the region 410 may be increased, which may result in a lower pressure differential across the restrictor 401.

The actuators 418 are also configured to control a height of the rim 412 above the ground surface 408. In particular, the actuators are configured to enable the rim 412 to be raised or lowered relative to the ground surface 408. In particular, the actuators 418 are configured to move the restrictor 401 from a deployed position (shown in FIG. 4a) to a stowed position (shown in FIG. 4c). In the deployed position, the rim 412 is in contact with the ground surface 408, so as to form an at least partial seal with the ground surface 408. In the stowed position, the rim 412 is spaced apart from the ground surface 408, such that no seal is formed between the rim 412 and the ground surface 408. In the stowed position, a clearance is provided between the rim 412 and the ground surface 408. This may facilitate driving over rough terrain and avoid damaging the restrictor 401 and rim 412. Thus, when the downforce system 400 is not in use, the restrictor 401 may be placed in the stowed position. As can be seen in FIG. 4c, when the restrictor 401 is in the stowed position, the flexible skirt 406 deforms, e.g. bunches up, to enable the rim 412 to be lifted away from the ground surface 408. In other embodiments (not shown) separate sets of actuators may be used for applying a preload force to the rim 412 and controlling the height of the rim 412 above the ground surface 408.

Additionally, the height of the rim 412 above the ground surface 408 may be controlled in order to adjust a flow of air from the atmosphere into the region 410 defined inside the restrictor 401. For example, the height of the rim 412 above the ground surface 408 may be adjusted to provide a small gap between the sealing element 416 and the ground surface, to enable air to leak into the region 410. This may be done, for example, in order to reduce the pressure differential across the restrictor. Thus, the height of the rim 412 above the ground surface 408 may provide a further parameter for controlling the pressure differential across the restrictor 401.

The downforce system 400 may include one or more rim sensors (not shown) which are configured to measure a height of the rim 412 above the ground surface. This may facilitate adjusting the height of the rim 412 to a desired height above the ground surface 408. For example, the rim sensor may include an optical sensor.

The controller of the downforce system 400 may be configured to control the height of the rim 412 above the ground surface, and whether the restrictor 401 is in the stowed or deployed position. The controller may be configured to receive an output signal from the rim sensor that is indicative of the height of the rim 412 above the ground surface 408. The controller may then be configured to control the height of the rim 412 above the ground surface 408 based on the output signal from the rim sensor.

The downforce system 400 may include one or more valves for controlling air flow through the downforce system 400, e.g. similar to first valve 204 and second valve 208 of downforce system 202. Then, the controller of the downforce system 400 may be configured to adjust the states of the valves, together with the preload force applied to the rim 412 and the height of the rim 412 above the ground surface 408. Control of these parameters may enable accurate control of air flow through the downforce system 400, e.g. along the air flow path between the restrictor 401 and the pressure source, such that the pressure differential across the restrictor 401 may be accurately controlled.

FIG. 4d shows a cross-sectional view of a portion of a downforce system 400d which is an embodiment of the invention. Downforce system 400d is a variation of downforce system 400 described above. Features in FIG. 4d which correspond to those of downforce system 400 are labelled with the same reference numerals as for downforce system 400, and are not described again.

Downforce system 400d is similar to downforce system 400, except that the sealing element 416 of downforce system 400d is arranged such that there is a small gap between the sealing element 416 and the ground surface 408. The small gap between the sealing element 416 and the ground surface 408 is maintained by the castor wheels 420, which support the portion 414 of the rim 412 above the ground surface 408. The small gap between the sealing element 416 and the ground surface 408 may act as a constriction which restricts air leakage into the region 410 inside the restrictor 401, such that the sealing element 416 effectively forms a partial seal with the ground surface 408. The restrictor 401 is shown in the deployed position in FIG. 4d.

FIGS. 5a and 5b show cross-sectional views of a portion of a downforce system 500 which is an embodiment of the invention. Downforce system 500 is a variation of downforce system 400 described above, where instead of instead of flexible skirt 406, a telescopic coupling is used.

The downforce system 500 includes a restrictor 501 which includes a top plate 504 that is mounted on an underside 502 of a vehicle. The top plate 504 may be similar to top plate 404 described above. The restrictor 501 further includes a telescopic coupling 506 which is disposed around a perimeter of top plate 504 and which extends from the top plate 504 towards a ground surface 508 on which the vehicle is disposed. The restrictor 501 serves to restrict air flow into a region 510 which is defined by the restrictor 501 and the ground surface 508. The region 510 is substantially enclosed by the restrictor 501 and the ground surface 508.

A rim 512 is disposed on a lower edge of the telescopic coupling 506. The rim may have a similar configuration to the rim 412 discussed above. In particular, the rim 512 has a portion 514 that extends outwards from the telescopic coupling, a sealing element 516 (similar to sealing element 416) and castor wheels 520 (similar to castor wheels 420). The downforce system 500 also includes actuators 518 mounted between the underside 502 of the vehicle and the portion 514 of the rim 512, and which serve similar functions to the actuators 418 described above.

The telescopic coupling 506 includes a first telescopic section 506a which is telescopically coupled with a second telescopic section 506b, such that the second telescopic section 506b is movable relative to the first telescopic section 506a. For example, the first and second telescopic couplings may be slidable relative to one another. Together, the first and second telescopic sections define a barrier which restricts air flow into the region 510 inside the restrictor 501. Relative movement between the first and second telescopic sections results in a change in an effective length of the telescopic coupling 506, so that the telescopic coupling 506 may accommodate changes in height of the underside 502 of the vehicle above the ground surface 508. So similarly to the flexible skirt 406, the telescopic coupling 506 may facilitate maintaining the rim 512 in contact with the ground surface 508, even when there are variations in height between the underside 502 of the vehicle and the ground surface 508.

The telescopic coupling 506 enables the height of the rim 512 above the ground surface 508 to be adjusted by the actuators 518. This enables the restrictor 501 to be moved between a stowed state (shown in FIG. 5b) and a deployed state (shown in FIG. 5a).

Although in the example shown the telescopic coupling 506 includes two telescopic sections, a telescopic coupling having a greater number of telescopic sections may also be used. A greater number of telescopic sections may improve a flexibility of the telescopic coupling 506. The telescopic sections may be made of any suitable rigid or flexible material, such as a plastic or metal. The telescopic coupling may be made of any suitable material, such as carbon fibre or fibreglass.

FIGS. 6a and 6b show cross-sectional views of downforce systems that are variations of downforce system 400. For convenience, features in FIGS. 6a and 6b which correspond to those described above in relation to FIGS. 4a, 4b and 4c are given the same reference numeral as in FIGS. 4a, 4b and 4c, and are not described again. For illustration purposes, actuators 418 are not illustrated in FIGS. 6a and 6b.

FIG. 6a shows a downforce system 600a which is a first variation of downforce system 400. Downforce system 600a includes a modified top plate 404a, which is modified to define a cavity 604 for receiving the flexible skirt 406 and a portion of the rim 412 when the restrictor 401 is in the stowed state. The flexible skirt 406 is connected to the top plate 404a, and defines a perimeter of an area on the top plate 404a. In FIG. 6a, the restrictor 401 is shown in the stowed state, such that the flexible skirt 406 and part of the rim 412 are received in the cavity 604. The cavity 604 is formed around an outer edge of the top plate 404a. In some cases, the top plate 404a may be formed as part of the underside 402 of the vehicle, such that the cavity 604 is formed in the underside 402 of the vehicle. The cavity 604 may serve to protect the restrictor 401 and the rim 412 when the restrictor 401 is in the stowed position, as the restrictor 401 and rim 412 are less exposed (e.g. compared to an embodiment where there is no cavity).

FIG. 6b shows a downforce system 600b which is a variation of downforce system 400. Downforce system 600b includes a modified top plate 404b, which is modified to define a cavity 606 for receiving the flexible skirt 406 and a portion of the rim 412 when the restrictor 401 is in the stowed state. In FIG. 6b, the restrictor 401 is shown in the stowed state, such that the flexible skirt 406 and part of the rim 412 are received in the cavity 606. The top plate 404b includes a sidewall 608 which extends downwards from the underside 402 of the vehicle, in order to define the cavity 606. In some cases, the top plate 404b may be formed as part of the underside 402 of the vehicle, such that the cavity 606 is formed in the underside 402 of the vehicle. For example, the sidewall 608 may be formed as part of the vehicle. The cavity 606 may serve to protect the restrictor 401 and the rim 412 when the restrictor 401 is in the stowed position, as the restrictor 401 and rim 412 are less exposed and protected by the sidewall 608 (e.g. compared to an embodiment where there is no cavity).

The concept of using a cavity for receiving a portion of the restrictor may similarly be applied to the embodiment of FIGS. 5a and 5b with the telescopic coupling 506. In other embodiments, different shapes and configurations of cavity may be used for receiving a portion of the restrictor when the rim moves relative to the top plate.

FIG. 7a shows a cross-sectional view of a rim 700 that may be part of a downforce system that is an embodiment of the invention. For example, rim 700 may correspond to rim 108 of downforce system 100. The rim 700 is disposed at a lower edge of a restrictor 702, e.g. at a lower edge of a sidewall of the restrictor 702, such that it is in close proximity to a ground surface 704 on which the vehicle is disposed. The cross-sectional view of FIG. 7 is taken along a plane that is perpendicular to a direction of travel of a vehicle that includes the downforce system, i.e. perpendicular to a longitudinal direction of the vehicle.

The rim 700 includes a portion 706 that extends outwards, away from the lower edge of the restrictor 702. The portion 706 of the rim extends over a section of the ground surface 704, and may be oriented such that it is approximately parallel with the ground surface 704. A sealing element 708 is disposed on the portion 706 of the rim 700, such that the sealing element 708 contacts the ground surface 704 at a position that is spaced outwards from the restrictor 702. The sealing element 708 is configured to form an at least partial seal with the ground surface 704.

When a pressure source (e.g. pressure source 110) of the downforce system is activated, a pressure differential may be generated across the restrictor 702, such that the region 710 inside the restrictor 702 has a lower pressure that the atmosphere 712 outside the restrictor 702. As a result, air may be drawn into the region 710 via the at least partial seal formed by the sealing element 708, as illustrated by arrow 714. Because the sealing element 708 is at a position that is spaced outwards from the restrictor 702, a low pressure region 715 exists between the portion 706 of the rim 700 and the ground surface 704 (due to the low pressure in region 710). This results in a downforce which acts on the portion 706 of the rim 700, near the restrictor 702, as illustrated by arrows 716. This downforce 716 acts to press the rim towards the ground surface 704, which in turn strengthens the seal formed by the sealing element 708 with the ground surface 704. This may enable a larger pressure differential to be generated across the restrictor 702.

FIG. 7b shows a cross-sectional view of a rim 720 that may be part of a downforce system that is an embodiment of the invention. For example, rim 720 may correspond to rim 108 of downforce system 100. Rim 720 is similar to rim 700, except that it does not include sealing element 708. For convenience, features of the embodiment shown in FIG. 7b that correspond to features of the embodiment shown in FIG. 7a are indicated using the same reference numerals as in FIG. 7a, and are not described again.

The portion 706 of rim 720 is arranged such that there is a narrow gap 722 between the rim 720 and the ground surface 704. Similarly to the scenario described in relation to FIG. 7a, when a pressure source (e.g. pressure source 110) of the downforce system is activated, a pressure differential may be generated across the restrictor 702, such that the region 710 inside the restrictor 702 has a lower pressure that the atmosphere 712 outside the restrictor 702. This causes air to be drawn into the region 710, via the narrow gap between the rim 720 and the ground surface 704, as illustrated by arrow 714. The narrow gap 722 acts as a constriction for the air flow 714 into the region 710, which results in a drop in pressure underneath the portion 706 of the rim 720. As a result, air flow through the gap 722 may be insufficient to equalise the pressure differential across the restrictor 702, and a downforce is generated which acts on the portion 706 of the rim 720, as illustrated by arrows 724. The downforce increases in magnitude towards the restrictor 702, due to the increase in pressure differential towards the restrictor 702. The downforce 724 presses the portion 706 of the rim 720 towards the ground surface 704, causing gap 722 to narrow, such that a seal is effectively formed between the rim 720 and the ground surface 704. This enables a pressure differential to be maintained across the restrictor 702.

FIGS. 8a, 8b, 8c and 8d show variations of rim 700 described above, where one or more inserts are embedded in the sealing element 708, in order to strengthen the sealing element.

Figure 8A:
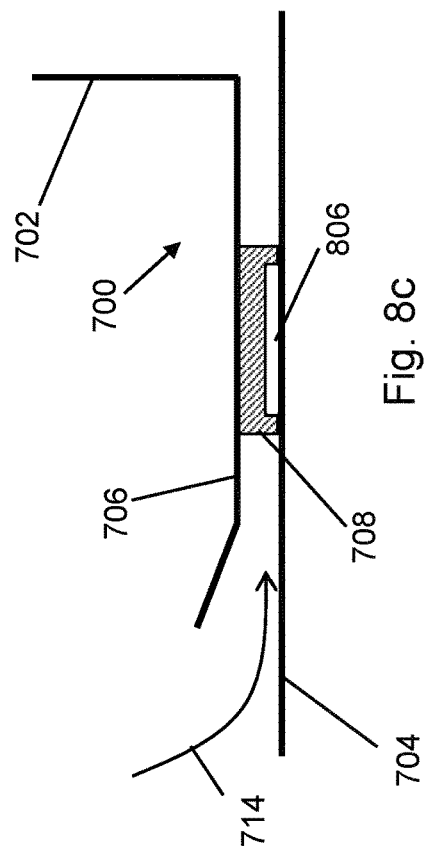
FIGS. 8a, 8b, 8c and 8d are cross-sectional views of rims that may be a part of a downforce system that is an embodiment of the invention.

FIG. 8a shows an example where three inserts 802 are embedded in the sealing element 708. Each of the inserts 802 extends between the portion 706 of the rim and the ground surface 704.

Figure 8B:
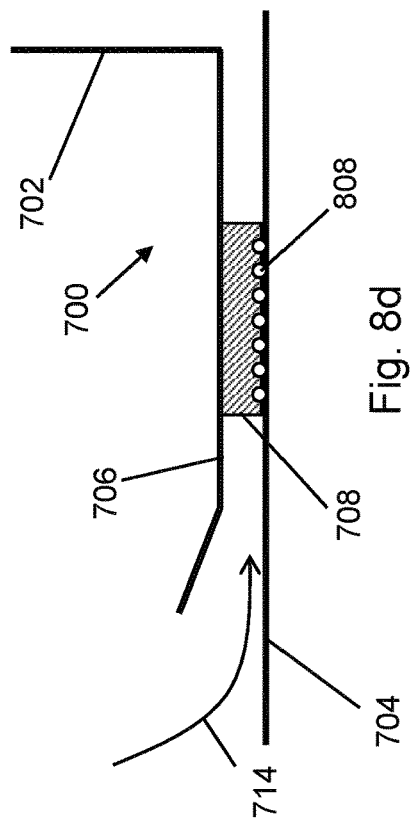

FIG. 8b shows an example where there is a single insert 804 embedded in the sealing element 708. The insert 804 extends between the portion 706 of the rim and the ground surface 704.

Figure 8C:
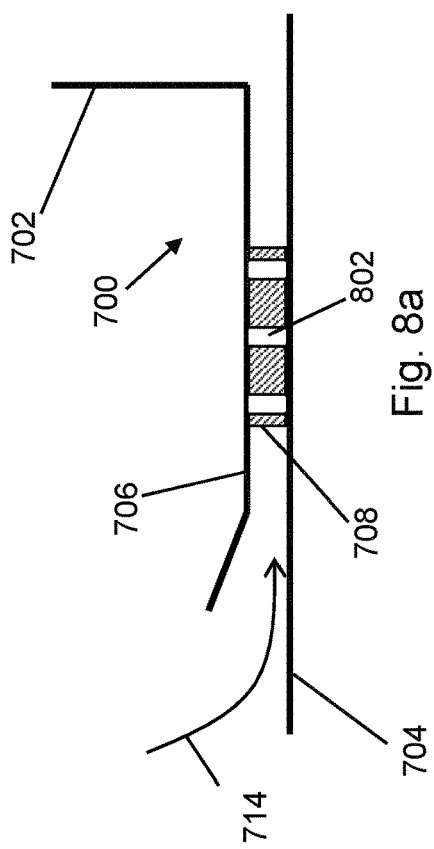

FIG. 8c shows an example where an insert 806 is embedded in the sealing element 708. The insert 806 is disposed at a lower edge of the sealing element 708, and arranged to contact the ground surface 704.

Figure 8D:
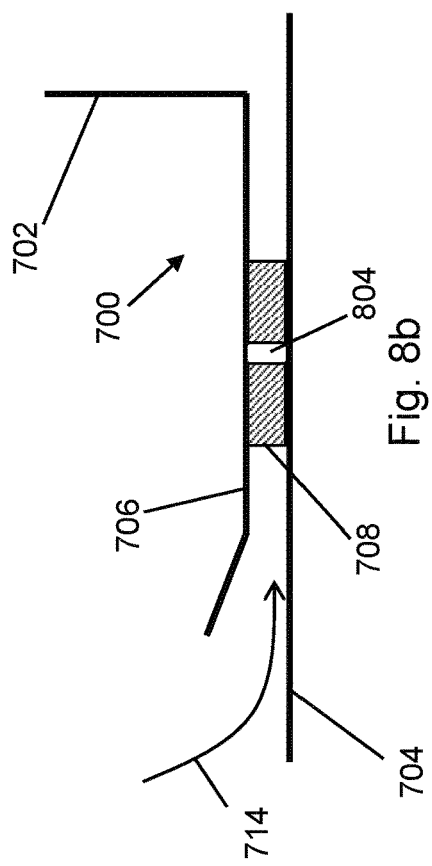

FIG. 8d shows an example where a series of inserts 808 are embedded in the sealing element 708. Each of the inserts 808 is a bead- or rod-shaped element which is disposed at a lower edge of the sealing element 708, and arranged to contact the ground surface.

In each of the examples shown in FIGS. 8a, 8b, 8c and 8d, the inserts are made of a material that has a greater hardness than a material forming the sealing element 708. As a result, the inserts may serve to reduce an abrasion of the sealing element 708 caused by the ground surface 704. In one example, the sealing element 708 may be made of a polymer material, whilst the inserts may be made of steel or some other hard material. As another example, the inserts may be made of ceramic, e.g. toughened ceramic.

In some embodiments, the downforce system may include a sensor (not shown) which is configured to detect a wear level of the sealing element 708. In this manner, a user may monitor the wear level of the sealing element 708, to ensure that the sealing element 708 may form a good seal with the ground surface 704. The sensor may be embedded within the sealing element 708. For example, the sensor may include a wire which is embedded in the sealing element 708, and which is configured to break when the sealing element 708 reaches a predetermined wear level. The sensor may then be configured to determine when the wire breaks, e.g. by performing an electrical measurement on the wire, such as a continuity test or a resistance measurement. The sensor may be configured to generate an output signal which is indicative of the wear level of the sealing element, and which is transmitted to a controller of the downforce system. The controller may be configured to provide an indication of the wear level to a user, e.g. via a user interface of the downforce system.

Figure 9:
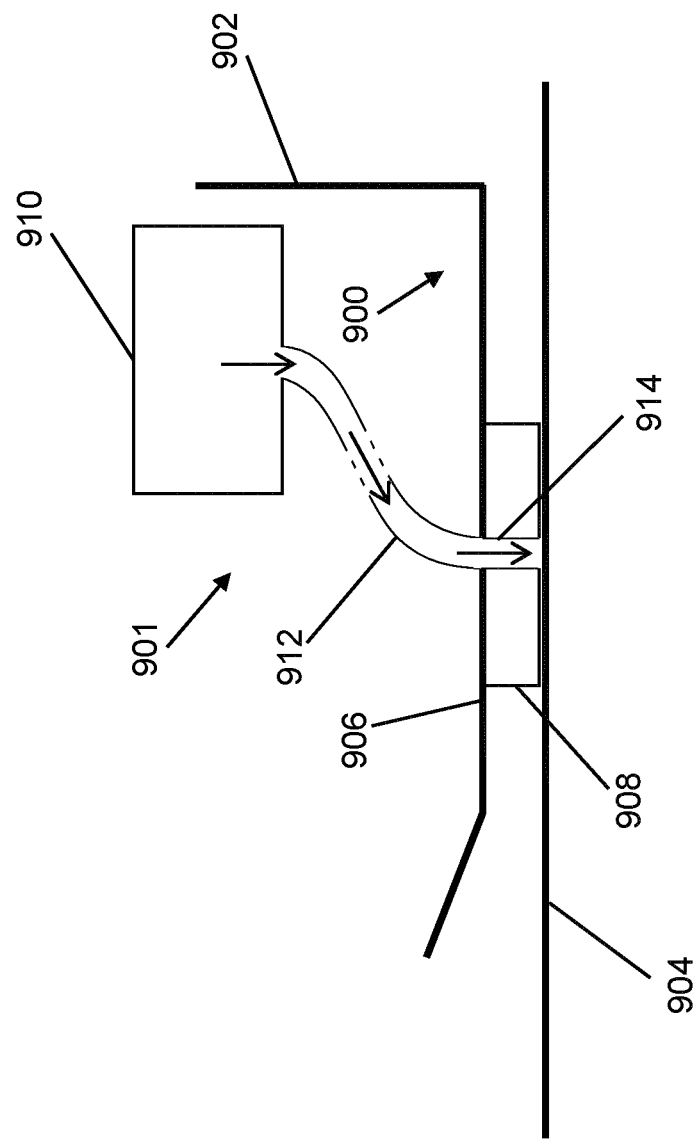
FIG. 9 is a cross-sectional view of a rim including a cooling system that may be part of a downforce system that is an embodiment of the invention.

FIG. 9 shows a cross-sectional view of a rim 900 comprising a cooling system 901 configured to remove heat for a sealing element 908 of the rim 900. The rim 900 may be part of a downforce system that is an embodiment of the invention. For example, rim 900 may correspond to rim 108 of downforce system 100. The rim 900 is similar to rim 700 described above, as it is disposed at a lower edge of a restrictor 902, and includes a portion 906 that extends outwards, away from the lower edge of the restrictor 902. The sealing element 908 of the rim 900 is disposed on the portion 906 of the rim 900, and arranged to form an at least partial seal with a ground surface 904 on which the vehicle is disposed.

The cooling system 901 includes a coolant source 910, which is fluidly connected via a conduit 912 to a channel 914 formed in the sealing element 908. The passageway 914 in the sealing element 908 extends from a top surface of the sealing element 908 which is in contact with the portion 906 of the rim 900, to an aperture in a lower surface of the sealing element 908 which is arranged to be in close proximity (or in contact) with the ground surface 904.

The coolant source 910 is configured to cause a coolant to flow along the conduit 912 to the channel 914 in the sealing element 908, as illustrated by the arrows in FIG. 9. The coolant may then exit the channel 914 via the aperture in the lower surface of the sealing element 908. As the coolant passes through the channel 914 in the sealing element 908, the coolant may absorb heat from the sealing element 908. Thus, the cooling system 901 may serve to remove heat from the sealing element 908, in order to cool the sealing element 908. This may serve to avoid the sealing element 908 from overheating due to friction between the sealing element 908 and the ground surface 904. Overheating of the sealing element 908 may cause the sealing element 908 to wear more rapidly, and weaken the seal between the rim 900 and the ground surface 904 formed by the sealing element 908.

Various types of coolant source 910 and coolant may be used. The coolant may be a liquid or a gas coolant, e.g. air or water. For example, where the coolant is air, the coolant source 910 may include a pressurised air container and/or a fan configured to cause air to flow along the conduit 912 to the channel 914 in the sealing element 908. Where the coolant is a liquid, e.g. water, the coolant source 910 may include a coolant reservoir which is connected to the conduit 912. A valve (not shown), e.g. between the coolant source 910 and the conduit 912, may be used to control flow of coolant along the conduit 912. A controller of the downforce system (e.g. similar to controller of downforce system 202) may be configured to control, e.g. activate, the cooling system 901 in order to cool the sealing element 908.

The sealing element 908 may include a plurality of channels 914 which are formed in the sealing element 908, each of the plurality of channels being fluidly connected to the coolant source 910 (e.g. via a series of conduits), in order to efficiently cool the sealing element 908. For example, the sealing element 908 may include a plurality of regularly spaced channels 914 along a length of the sealing element 908 (e.g. around the entire sealing element 908).

Figure 10:
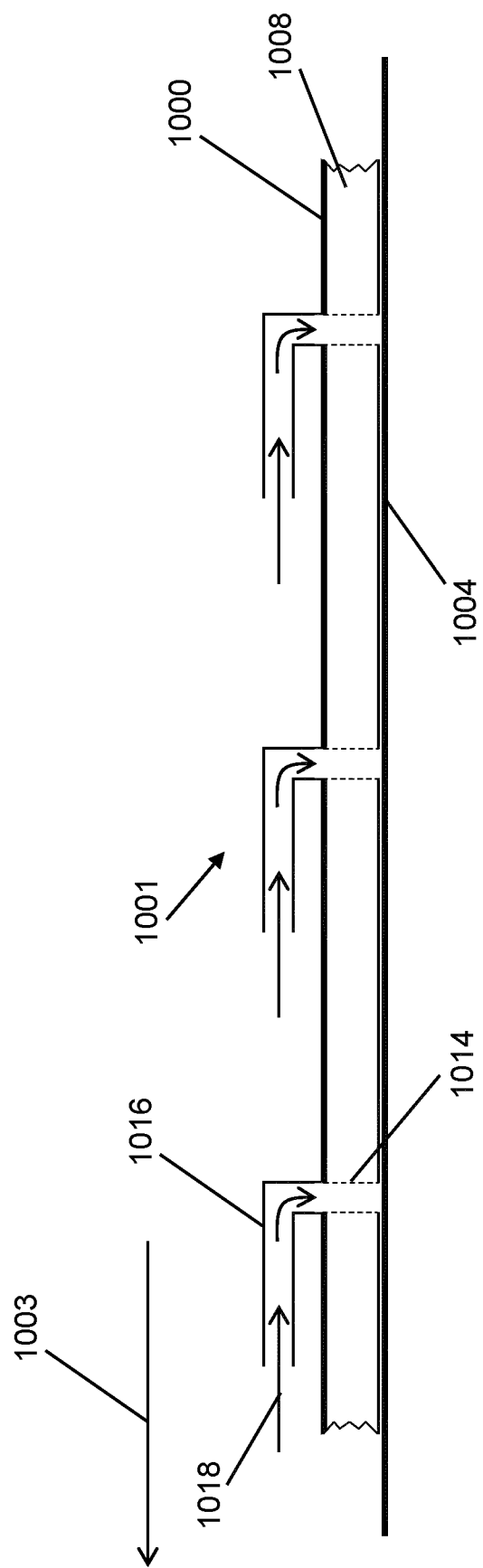
FIG. 10 is a cross-sectional view of a rim including a cooling system that may be part of a downforce system that is an embodiment of the invention.

FIG. 10 shows a cross-sectional view of a rim 1000 comprising a cooling system 1001 configured to remove heat for a sealing element 1008 of the rim 1000. The rim 1000 may be part of a downforce system that is an embodiment of the invention. For example, rim 1000 may correspond to rim 108 of downforce system 100. The cross-sectional view of FIG. 10 is taken along a plane that is parallel to a direction of travel of a vehicle that includes the downforce system, i.e. parallel to a longitudinal direction of the vehicle. Arrow 1003 in FIG. 10 illustrates a direction of travel of the vehicle. For illustration purposes, only a portion of the rim 1000 is illustrated.

The sealing element 1008 of the rim 1000 is configured to contact a ground surface 1004 on which the vehicle is disposed, in order to form an at least partial seal with the ground surface 1004. The cooling system 1001 includes a series of channels 1014 formed through the sealing element 1008. Each of the channels 1014 is connected to a respective air inlet 1016, which is configured to cause air to flow through the channel 1014 when the vehicle moves forward, i.e. when the vehicle moves along direction of travel 1003. In particular, each air inlet 1016 comprises a tube which is oriented towards a front of the vehicle, such that when the vehicle moves along the direction of travel 1003, air is drawn into the inlets 1016 and forced through the channels 1014 in the sealing element 1008, as illustrated by arrows 1018. As air passes through the channels 1014 in the sealing element 1008, the air may absorb heat from the sealing element 1008, such that the sealing element 1008 is cooled. This may prevent overheating of the sealing element 1008, due to friction between the sealing element 1008 and the ground surface 1004.

Other types of cooling system may be used to cool the sealing element. For example, in some embodiments, a cooling system may be configured to spray a gas or liquid coolant onto the sealing element, in order to cool the sealing element. The coolant may be sprayed as a mist onto the sealing element.

FIG. 11 is a cross-sectional view of a rim 1100 that may be part of a downforce system that is an embodiment of the invention. For example, rim 1100 may correspond to rim 108 of downforce system 100. The rim 1100 is disposed at a lower edge of a restrictor 1102, e.g. at a lower edge of a sidewall of the restrictor 1102, such that it is disposed above a ground surface 1104 on which the vehicle is disposed. The rim 1100 includes a portion 1106 that extends outwards, away from the lower edge of the restrictor 1102. The portion 1106 of the rim extends over a section of the ground surface 1104, and may be oriented such that it is approximately parallel with the ground surface 1104.

Rim 1100 includes a fan 1110 mounted on a lower surface of the portion 1106 of the rim 1100. The fan 1110 includes an outlet 1112 which is directed towards the ground surface 1104 such that, when the fan 1110 is activated, air is blown from the outlet 1112 towards the ground surface 1104, as illustrated by arrows 1114. The air blown out from the outlet 1112 forms a blown air curtain which acts to prevent or restrict air flow into a region 1116 defined inside the restrictor 1102 from the atmosphere outside the restrictor. In this manner, the blown air curtain acts as an at least partial seal between the rim 1100 and the ground surface 1104. The rim 1100 may include a plurality of fans 1110 arranged along the rim, such that a substantially continuous blown air curtain may be formed around the entire rim, thus forming an at least partial seal around a perimeter of the region 1116 defined inside the restrictor 1102. Alternatively, the rim may comprise a single fan 1110 which is connected to a plurality of outlets 1112 which are disposed along the rim, such that the fan 1110 may cause air to be blown out of each of the plurality of outlets 1112 towards the ground surface 1104.

In some embodiments (not shown) a blown air configuration as shown in FIG. 11 may be combined with a sealing element on the rim (e.g. as shown in FIG. 7a), in order to improve the quality of the seal between the rim and the ground surface, and minimise air leakage into the region defined inside the restrictor.

Figure 12C:
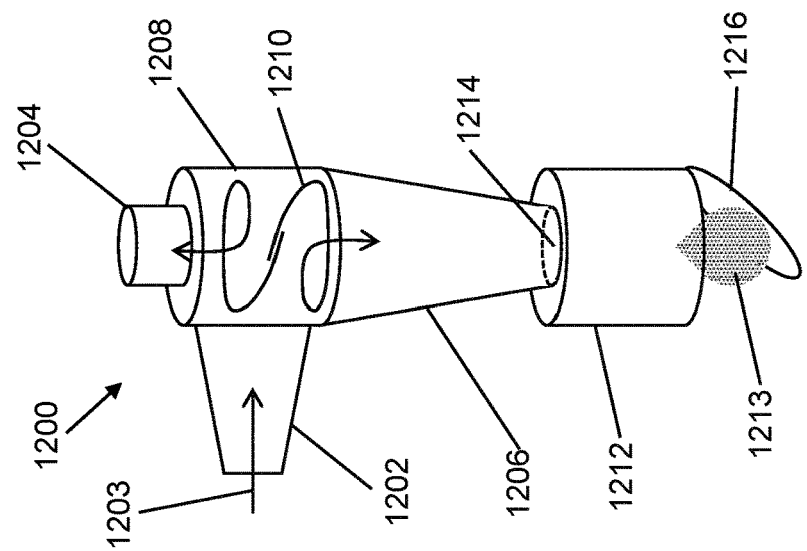
FIGS. 12, 12b and 12c are diagrams of a dust and debris removal device that may be part of a downforce system that is an embodiment of the invention.
Figure 12B:
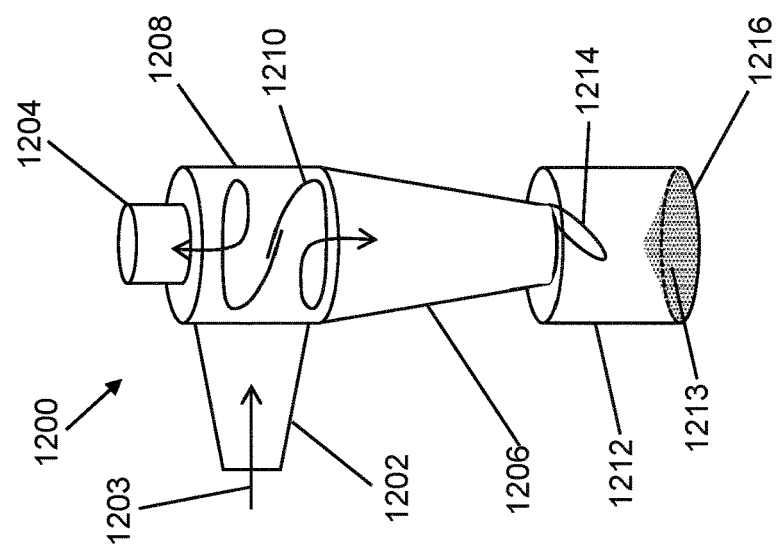
Figure 12A:
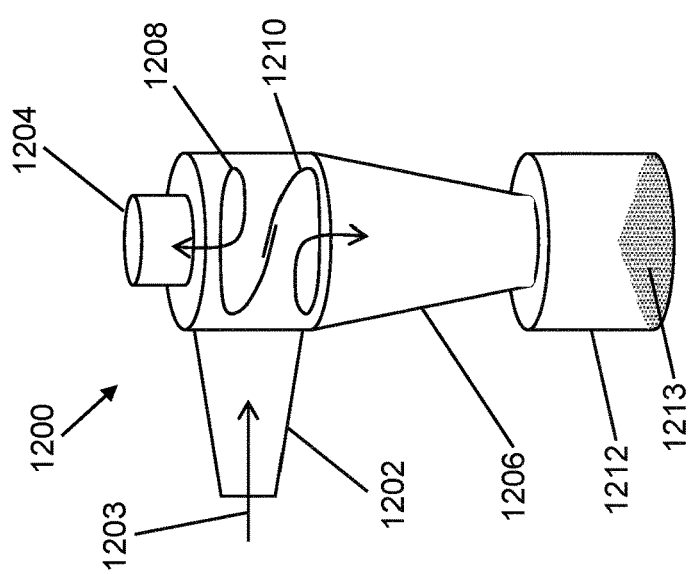

FIGS. 12a, 12b and 12c show a diagram of a dust and debris removal device 1200 that may be included in a downforce system according to an embodiment of the invention. For example, dust and debris removal device 1200 may correspond dust and debris removal device 112 of downforce system 102 or 202. The dust and debris removal device 1200 is a cyclonic filtration apparatus, and is configured to capture dust, debris and water from an air flow. The cyclonic filtration apparatus is based on the principle of cyclonic separation.

The dust and debris removal device 1200 is configured to be connected in series in an air flow path between a restrictor of the downforce system and a pressure source of the downforce system. The dust and debris removal device 1200 includes an inlet 1202, which is connectable to receive an air flow from the restrictor, as illustrated by arrow 1203. For example, the inlet 1202 may be connected to the first conduit 114 of downforce system 102 or 202. The dust and debris removal device 1200 further includes an outlet 1204, which is in fluid communication with the inlet 1202 via a cyclone chamber 1206. Air may flow out of the outlet 1204 towards the pressure source of the downforce system. For example, the outlet 1204 may be connected to the second conduit 116 of the downforce system 102 or 202.

The cyclone chamber 1206 is configured to cause air flowing through the dust and debris removal device 1200 to form a cyclone in the cyclone chamber 1206, as illustrated by arrow 1208. Cyclonic motion of the air flow in the cyclone chamber 1206 causes dust, debris and water carried by the air flow to separate from the air flow. The air flow exits the cyclone chamber 1206 via the outlet 1204, whilst the dust, debris and water drop towards a bottom of the cyclone chamber 1206, as illustrated by arrow 1210.

In the example shown, the inlet 1202 is configured to introduce air into the cyclone chamber 1206 along a direction that is tangential to an axis of rotation of air in the cyclone chamber 1206. Thus, the dust and debris removal device 1200 is configured as a tangential cyclonic filtration apparatus. The axis of rotation of air in the cyclone chamber 1206 is substantially vertical. This may enable more efficient separation of dust, debris and water from the air flow. However, in other embodiments, the dust and debris removal device 1200 may be configured as an axial cyclonic filtration apparatus, where the inlet 1202 is configured to introduce air along the axis of rotation of air in the cyclone chamber 1206. In such an embodiment, the dust and debris removal device 1200 may be oriented such that the axis of rotation of air in the cyclone chamber 1206 is substantially horizontal. This may result in a reduced pressure drop across the dust and debris removal device 1200.

A dust and debris collection chamber 1212 is located at the bottom of the cyclone chamber 1206. The dust and debris collection chamber 1212 is configured to receive dust, debris and water 1213 that have been separated from the air flow. A first valve 1214 is disposed between the cyclone chamber 1206 and the collection chamber 1212, the first valve being openable to enable dust, debris and water to enter the collection chamber 1212 from the cyclone chamber 1206. The first valve 1214 is open in the configuration shown in FIG. 12b, whilst the first valve 1214 is closed in the configuration shown in FIG. 12c. In the example shown, the first valve 1214 is implemented by an openable doorway between the cyclone chamber 1206 and the collection chamber 1212; however, other types of valve may also be used.

The collection chamber 1212 is configured to be self-emptying. To this effect, the collection chamber 1212 includes a second valve 1216 disposed at a bottom of the collection chamber 1212. The second valve 1216 is openable to enable dust, debris and water contained in the collection chamber 1212 to exit, e.g. fall out, of the collection chamber 1212. In the configuration shown in FIG. 12b, the second valve 1216 is closed, whilst in the configuration shown in FIG. 12c, the second valve 1216 is open, enabling dust, debris and water 1213 collected in the collection chamber 1212 to exit the collection chamber 1212. In the example shown, the second valve 1216 is implemented by a bottom surface of the collection chamber 1212 which forms an openable doorway; however, other types of valve may also be used.

The second valve 1216 may be configured to open only when the first valve 1214 is closed. This may prevent air from flowing into the downforce system via the collection chamber 1212. During operation of the dust and debris removal device 1200, the first valve 1214 may be opened, whilst keeping the second valve 1216 closed, to enable dust, debris and water to collect in the collection chamber 1216. Then, to empty the collection chamber 1212, the dust and debris removal device 1200 may be configured to close the first valve 1214, and open the second valve 1216. The dust and debris removal device 1200 may be configured to empty the collection chamber when the collection chamber 1212 becomes full (e.g. the dust and debris removal device 1200 may include a sensor for detecting when the collection chamber 1212 becomes full). The dust and debris removal device 1200 may be configured to empty the collection chamber only when the downforce system is not in use, or when the vehicle is stopped.

A controller of the downforce system (e.g. controller of downforce system 202 discussed above) may be configured to control opening and closing of the first valve 1214 and second valve 1216. In this manner, emptying of the collection chamber may be controlled by the controller of the downforce system.

Figure 13:
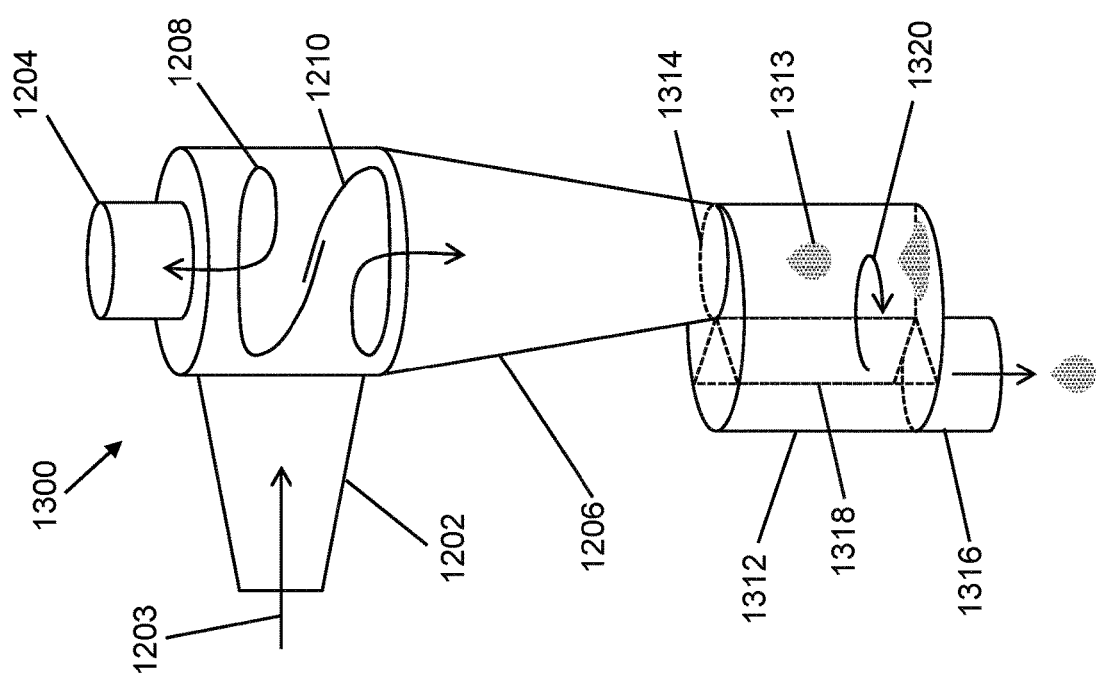
FIG. 13 is a diagram of a dust and debris removal device that may be part of a downforce system that is an embodiment of the invention.

FIG. 13 shows a diagram of a dust and debris removal device 1300 that may be included in a downforce system according to an embodiment of the invention. For example, dust and debris removal device 1300 may correspond dust and debris removal device 112 of downforce system 102 or 202. The dust and debris removal device 1300 is similar to the dust and debris removal device 1200 described above, except that the collection chamber includes a different mechanism for emptying the collection chamber. For convenience, features in FIG. 13 which correspond to those described above in relation to FIGS. 12*a*, 12*b* and 12*c* are given the same reference numeral as in FIGS. 12*a*, 12*b* and 12*c*, and are not described again.

The dust and debris removal device 1300 includes a dust and debris collection chamber 1312 disposed at a bottom of the cyclone chamber 1206. The collection chamber 1312 includes an inlet 1314 in a top surface of the collection chamber 1312 that is connected to the cyclone chamber 1206, in order to receive dust, debris and water 1313 from the cyclone chamber 1206. The collection chamber 1312 includes an outlet 1316 disposed at a bottom end of the collection chamber 1312, for evacuating dust, debris and water contained in the collection chamber 1312. The collection chamber 1312 has a cylindrical shape, and includes a set of revolving doors 1318 (or vanes) rotatably mounted therein. The revolving doors 1318 are rotatable about an axis that is aligned with a longitudinal axis of the cylindrical collection chamber 1312, as illustrated by arrow 1320. The revolving doors 1318 are configured such that, as the revolving doors rotate, the inlet 1314 and outlet 1316 are never in fluid communication with one another. In other words, the revolving doors 1318 are arranged to block fluid communication between the inlet 1314 and outlet 1316. This may avoid air entering into the cyclone chamber 1206 via the outlet 1316 of the collection chamber 1312. As the revolving doors 1318 rotate, they are configured to push dust, debris and water 1313 in the collection chamber 1312 towards to outlet 1316, so that the dust, debris and water 1313 may be evacuated from the collection chamber 1312. In this manner, the collection chamber 1312 may be emptied by rotating the revolving doors 1318, whilst ensuring that air does not leak into the downforce system via the outlet 1316.

The revolving doors 1318 may be configured to rotate continuously, in order to continuously empty the collection chamber 1312. Alternatively, the dust and debris removal device 1300 may be configured such that the revolving doors 1318 rotate when the collection chamber 1312 becomes full. The dust and debris removal device 1300 may be configured such that the revolving doors 1318 only rotate when the downforce system is not in use, or when the vehicle is stopped. A controller of the downforce system (e.g. controller of downforce system 202 discussed above) may be configured to control rotation of the revolving doors 1318. In this manner, emptying of the collection chamber 1312 may be controlled by the controller of the downforce system.

Figure 14:
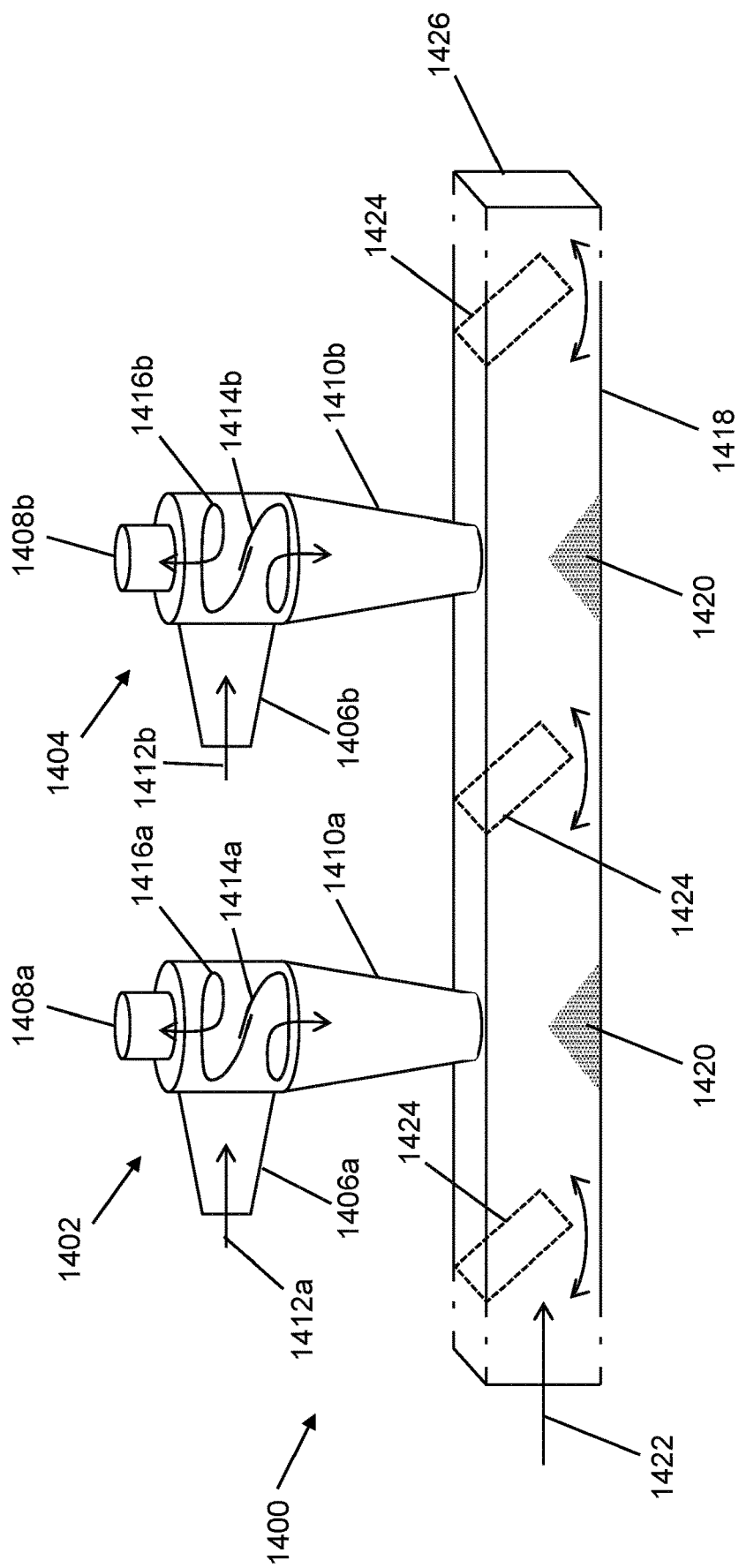
FIG. 14 is a diagram of a dust and debris removal system that may be part of a downforce system that is an embodiment of the invention.

FIG. 14 is a schematic diagram of a dust and debris removal system 1400 that may be part of a downforce system that is an embodiment of the invention. The dust and debris removal system 1400 includes a first dust and debris removal device 1402 and a second dust and debris removal device 1404. The first and second dust and debris removal devices 1402, 1404 are cyclonic filtration apparatuses, and each function similarly to dust and debris removal device 1200 described above. In particular the first and second dust and debris removal devices 1402, 1404 each include an inlet 1406*a*, 1406*b* which is connected to an outlet 1408*a*, 1408*b* via a cyclone chamber 1410*a*, 1410*b*. The inlet 1406*a*, 1406*b* of each device is configured to receive an air flow, as indicated by arrows 1412*a*, 1412*b*. When the air flow enters the cyclone chamber 1410*a*, 1410*b*, the air flow forms a cyclone which causes dust, debris and water carried by the air flow to separate from the air flow and fall towards the bottom of the cyclone chamber 1410*a*, 1410*b*, as illustrated by arrows 1414*a*, 1414*b*. The air flow the exits the cyclone chamber 1410*a*, 1410*b* via the outlet 1408*a*, 1408*b*, as illustrated by arrows 1416*a*, 1416*b*.

The dust and debris removal devices 1402, 1404 may be connected in series between a restrictor and pressure source of the downforce system, so that the dust and debris removal devices may capture dust and debris from an air flow between the restrictor and pressure source. For example, the inlet 1406*a* of dust and debris removal device 1402 may be connected to receive an air flow from a restrictor of the downforce system. The outlet 1408*a* of device 1402 may then be connected to the inlet 1406*b* of device 1404, e.g. via a conduit (not shown). The outlet 1408*b* of the device 1404 may then be connected to a pressure source of the downforce system. Alternatively, the dust and debris removal devices 1402, 1404 may be connected in parallel between the restrictor and pressure source of the downforce system. For example, both inlets 1406*a* and 1406*b* may be connected to receive an air flow from the restrictor of the downforce system, and both outlets 1408*a*, 1408*b* may be connected to the pressure source.

Each of the dust and debris removal devices 1402, 1404 is connected to an air duct 1418 at a bottom end of its cyclone chamber 1410*a*, 1410*b*. In this manner, dust, debris and water that is separated from the air flow in the cyclone chambers 1410*a*, 1410*b* may fall towards the bottom of the cyclone chambers 1410*a*, 1410*b* into the air duct 1418. The air duct 1418 may be formed by a length of pipe or tubing. Thus, dust, debris and water 1420 may collect below the cyclone chambers 1410*a*, 1410*b* in the air duct 1418. An air flow is caused to flow along the air duct 1418, as illustrated by arrow 1422. The air flow 1422 may be generated, for example, by a fan (not shown) disposed at one end of the air duct 1418. A series of valves 1424 are disposed within the air duct 1418, the valves 1424 each being movable between a closed position and an open position. In the closed position, the valves 1424 act to block the air flow 1422 through the air duct 1418. In the open position, the valves 1424 allow the air flow 1422 to pass through the air duct 1418, such that any dust, debris and water 1420 collected in the air duct 1418 is blown out of an outlet end 1426 of the air duct 1418. Therefore, emptying of dust, debris and water from the air duct 1418 may be controlled by opening and closing the valves 1424.

A controller of the downforce system (e.g. similar to controller of downforce system 202 discussed above) may be configured to control opening and closing of valves 1424. In this manner, emptying of the air duct 1418 may be controlled by the controller of the downforce system.

Although two dust and debris removal devices 1402, 1404 are shown in the example of FIG. 14, the dust and debris removal system 1400 may include different numbers of dust and debris removal devices. For example, in some cases there may be a single dust and debris removal device, or there may be more than two dust and debris removal devices.

Figure 15:
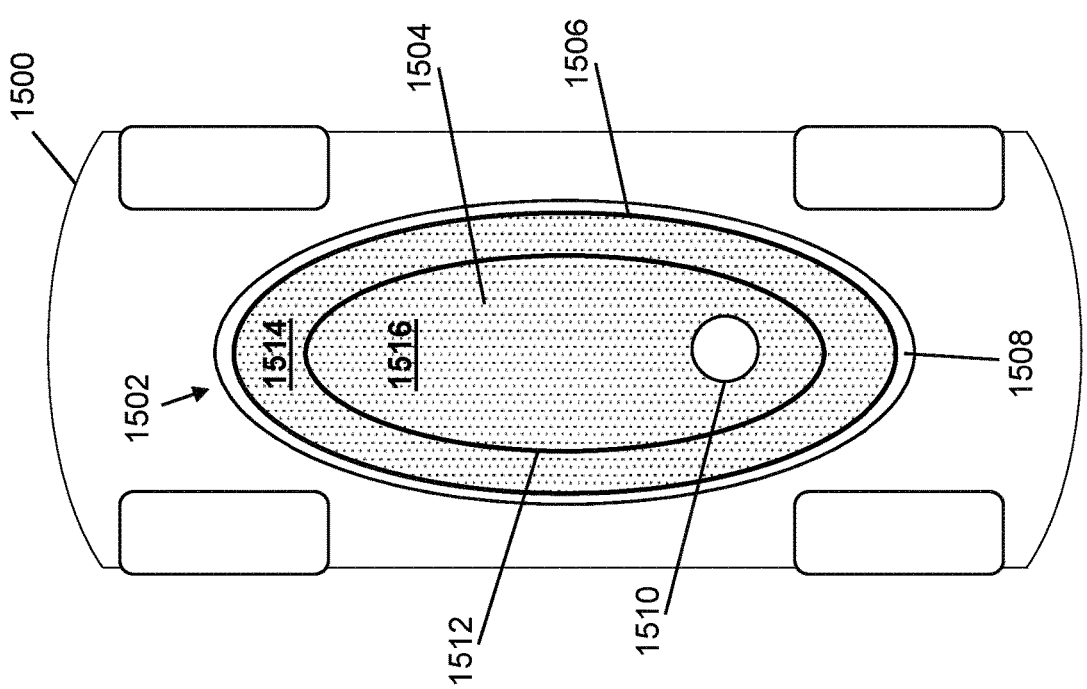
FIG. 15. is a diagram of an underside of a vehicle comprising a downforce system according to an embodiment of the invention.

FIG. 15 shows a view of an underside of a vehicle 1500 which includes a downforce system according to an embodiment of the invention. The downforce system of the vehicle 1500 includes a restrictor 1502 disposed on the underside of the vehicle 1500, which is arranged to define a region over a ground surface on which the vehicle 1500 is disposed. The restrictor 1502 is similar to restrictor 104 described above, and includes an oval-shaped top surface 1504 (shown as a shaded area in FIG. 15) mounted on the underside of the vehicle 1500, and a sidewall 1506 disposed around a perimeter of the top surface 1504. The sidewall 1506 extends from the top surface 1504 towards the ground surface underneath the vehicle 1500. A rim 1508 is disposed on a lower edge of the sidewall 1506, and arranged to form an at least partial seal with the ground surface. An outlet 1510 is formed in the top surface 1504 of the restrictor 1502, for connecting the restrictor 1502 to a pressure source of the downforce system. The downforce system of the vehicle 1500 may include a dust and debris removal device and pressure source which are configured similarly to those described in relation to downforce system 102 or 202.

The restrictor 1502 further includes a divider 1512. The divider 1512 is in the form of an oval-shaped barrier which divides the region defined inside the restrictor 1502 into a first, outer sub-region 1514 and a second, inner sub-region 1516. The divider 1512 is arranged such that the first sub-region 1514 forms a loop that surrounds the second sub-region 1516. The divider 1512 is arranged such that the first and second sub-regions are substantially concentric with one another. The divider 1512 is connected to the top surface 1504 of the restrictor 1502, and extends towards the ground surface on which the vehicle 1500 is disposed, such that a lower edge of the divider 1512 may be in close proximity with the ground surface. In this manner, the divider 1512 may act to restrict air flow between the first and second sub-regions. The divider 1512 may be arranged to form an at least partial seal with the ground surface. The outlet 1510 of the restrictor 1502 is disposed within the second sub-region 1516, i.e. it is disposed within an area defined by the divider 1512.

During operation of the downforce system of vehicle 1500, air may be evacuated from inside the restrictor 1502 via the outlet 1510. This causes pressure in the second sub-region 1516 to drop, which may in turn cause pressure in the first sub-region 1514 to drop relative to atmospheric pressure around the vehicle 1500. However, because the divider 1512 acts to restrict air flow between the first and second sub regions 1514, 1516, the pressure in the second sub-region 1516 may be lower than in the first sub-region 1514. Thus, a pressure differential may arise across the divider 1512, between the first and second sub-regions 1514, 1516. As the second sub-region 1516 is surrounded by the first sub-region 1514 which is at a low pressure relative to atmospheric pressure, it may be possible to maintain an even lower pressure inside the second sub-region. So, the configuration of restrictor 1502 may enable lower pressures to be maintained within the second sub-region 1516 in the restrictor 1502. This may enable the downforce system of vehicle 1500 to generate a greater downforce, e.g. compared to a case where there is no divider 1512.

Although only a single divider 1512 is shown in FIG. 15, in some cases the restrictor 1502 may include multiple dividers which are arranged to define a series of concentric sub-regions inside the restrictor 1502. In this manner, a gradient of pressures may be set up from the outer sub-regions which are at higher pressure to the inner sub-regions which are at lower pressure.

Figure 16:
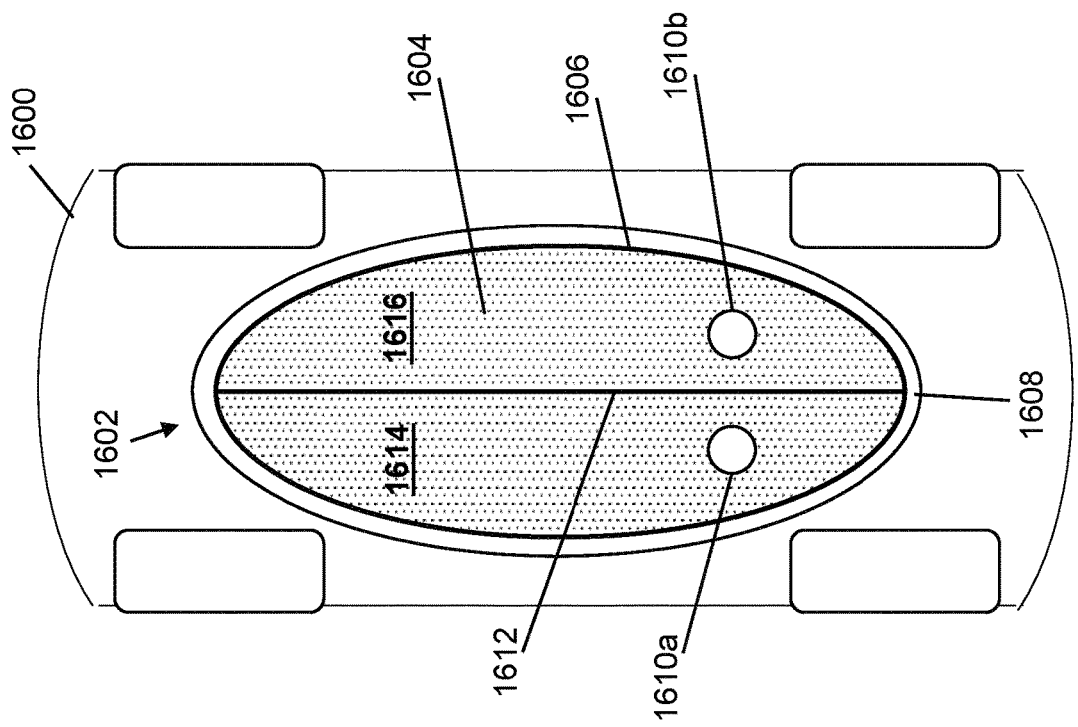
FIG. 16. is a diagram of an underside of a vehicle comprising a downforce system according to an embodiment of the invention.

FIG. 16 shows a view of an underside of a vehicle 1600 which includes a downforce system according to an embodiment of the invention. The downforce system of the vehicle 1600 includes a restrictor 1602 disposed on the underside of the vehicle 1600, which is arranged to define a region over a ground surface on which the vehicle 1600 is disposed. The restrictor 1602 is similar to restrictor 104 described above, and includes an oval-shaped top surface 1604 (shown as a shaded area in FIG. 16) mounted on the underside of the vehicle 1600, and a sidewall 1606 disposed around a perimeter of the top surface 1604. The sidewall 1606 extends from the top surface 1604 towards the ground surface underneath the vehicle 1600. A rim 1608 is disposed on a lower edge of the sidewall 1606, and arranged to form an at least partial seal with the ground surface.

The restrictor 1602 further includes a divider 1612. The divider 1612 is in the form of a barrier that extends in a longitudinal direction of the vehicle 1600, and which divides the region inside the restrictor 1602 into a first sub-region 1614 towards a left side of the vehicle 1600, and a second sub-region 1616 towards a right side of the vehicle 1600. The divider 1612 is connected to the top surface 1604 of the restrictor 1602, and extends towards the ground surface on which the vehicle 1600 is disposed, such that a lower edge of the divider 1612 may be in close proximity with the ground surface. In this manner, the divider 1612 may act to restrict air flow between the first and second sub-regions. The divider 1612 may be arranged to form an at least partial seal with the ground surface.

A first outlet 1610*a* is formed in the top surface 1604 of the restrictor 1602, such that the first outlet 1610*a* is disposed within the first sub-region 1614; and a second outlet 1610*b* is formed in the top surface 1604 of the restrictor 1602, such that the second outlet 1610*b* is disposed within the second sub-region 1616. Each of the first outlet 1610*a* and second outlet 1610*b* is connected to a pressure source (not shown) of the downforce system, so that air may be evacuated from the first and second sub-regions via outlets 1610*a*, 1610*b* by the pressure source. The pressure source may, for example, be similar to the pressure source of the downforce system 102 or 202 described above. A dust and debris removal device (not shown) may be connected between the outlets 1610*a*, 1610*b*, in order to capture dust and debris from an air flow between the restrictor 1602 and the pressure source.

The downforce system of vehicle 1600 may include a valve system (not shown) for selectively coupling the pressure source to one or both of outlets 1610*a*, 1610*b*. For example, the valve system may include a first valve disposed on a first air flow path between the first outlet 1610*a* and the pressure source, and a second valve disposed on a second air flow path between the second outlet 1610*b* and the pressure source. The first and second valves may be throttle valves, such that they may be continuously adjusted between an open and closed position (or state). In this manner, it may be possible to control whether the pressure source is fluidly connected to one or both of outlets 1610*a*, 1610*b*, so that the pressure source may selectively evacuate air from one or both of sub-regions 1614, 1616.

For example, by operating the valve system to selectively couple the pressure source to the first outlet 1610*a*, the pressure source may preferentially evacuate air from the first sub-region 1614, such that a pressure in the first sub-region 1614 drops relative to a pressure in the second sub-region 1616. As a result, a pressure differential is generated across the divider 1612, and a greater downforce may be generated on the left side of the vehicle 1600 relative to the right side of the vehicle 1600. Similarly, by operating the valve system to selectively couple the pressure source to the second outlet 1610*b*, a greater downforce may be generated on the right side of the vehicle 1600 relative to the left side of the vehicle 1600.

In some cases, the divider 1612 may include a valve (not shown), such as a throttle valve, which is disposed across the divider. The valve may be opened, to provide fluid communication via the valve between the first sub-region 1614 and the second sub-region 1616. In this manner, a position of the valve (e.g. between an open and closed position of the valve) may be controlled in order to adjust the pressure differential across the divider 1612.

Generating a pressure differential across the divider 1612 may serve to improve traction of the vehicle 1600 when the vehicle goes around bends, as it may compensate for tilting of the vehicle as it goes through a bend. The pressure differential across the divider 1612 may be adjusted depending on a direction in which the vehicle 1600 is turning. For example, downforce system of vehicle 1600 may be configured to operate the valve system based on a direction in which the vehicle is turning. Compensating for tilting of the vehicle in this manner may reduce a transfer of weight to tyres of the vehicle 1600 which are located on an outside of the bend, such that forces may be distributed more evenly across all four tyres when the vehicle goes around a bend. Due to tyre load sensitivity, such an improved distribution of weight across the tyres may enable the vehicle to go around the bend at greater speeds as the tyres are under more favourable conditions for the generation of lateral force.

In other examples, a second divider may be provided in the restrictor 1602 which extends in a direction perpendicular to the longitudinal direction of the vehicle 1600. In this manner, the second divider may divide the region inside the restrictor into sub-regions which are disposed towards the front of the vehicle 1600, and sub-regions which are disposed towards the rear of the vehicle. Then similarly to the discussion above for divider 1612, a pressure differential may be generated across the second divider, in order to generate a downforce which acts on vehicle 1600 preferentially towards the front or rear of the vehicle 1600. This may, for example, facilitate acceleration or braking of the vehicle 1600.

Figure 17:
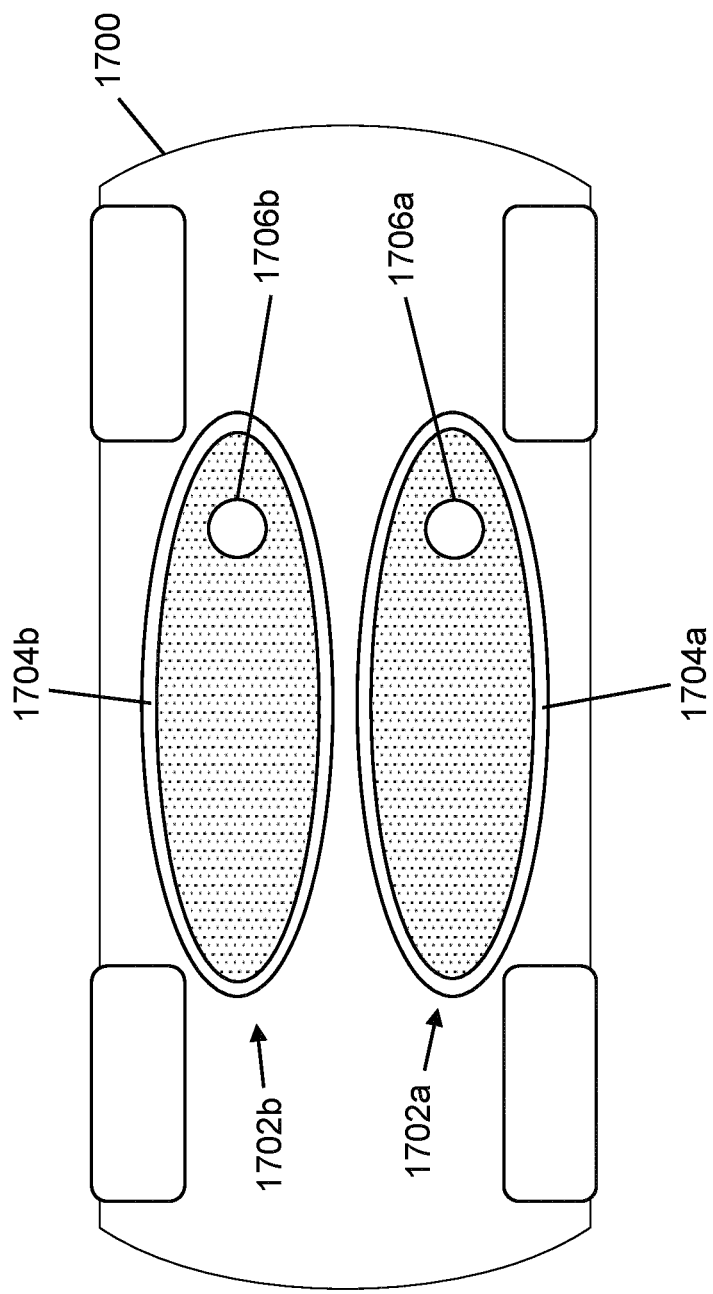
FIG. 17. is a diagram of an underside of a vehicle comprising a downforce system according to an embodiment of the invention.

FIG. 17 shows an alternative embodiment to that of FIG. 16 where, instead of defining multiple sub-regions within a single restrictor, separate restrictors are used. FIG. 17 shows a view of an underside of a vehicle 1700 which includes a downforce system according to an embodiment of the invention. The downforce system of vehicle 1700 includes a first restrictor 1702*a* and a second restrictor 1702*b* disposed on an underside of the vehicle 1700. Each of restrictors 1702*a* and 1702*b* is configured to define a respective region over a ground surface on which the vehicle 1700 is disposed. Each of restrictors 1702*a* and 1702*b* is similar in configuration to restrictor 104 discussed above. A rim 1704*a*, 1704*b* is disposed at a lower edge of each restrictor 1702*a*, 1702*b*, and arranged to form an at least partial seal with the ground surface. The first restrictor 1702*a* is disposed towards a left side of the vehicle 1700, whilst the second restrictor 1702*b* is disposed towards a right side of the vehicle 1700.

Each of the first restrictor 1702*a* and second restrictor 1702*b* includes an outlet 1706*a*, 1706*b* formed in a top surface of the restrictor. Each of outlets 1706*a*, 1706*b* is connected to a pressure source (not shown) of the downforce system, so that air may be evacuated from the region inside each restrictor 1702*a*, 1702*b* by the pressure source. In this manner, a pressure differential may be generated across each of the restrictors 1702*a*, 1702*b*, between an inside of the restrictor 1702*a*, 1702*b* and the atmosphere surrounding the vehicle.

In some cases, a respective pressure source may be connected to each of the first restrictor 1702*a* and second restrictor 1702*b*. Then, each of the respective pressure sources may be controlled in order to control the pressure differential generated across each of the first and second restrictors 1702*a*, 1702*b*. By varying the relative magnitude of the pressure differentials across each of the first and second restrictors 1702*a*, 1702*b*, a downforce generated by the downforce system may act preferentially towards the right side or the left side of the vehicle 1700. As discussed in relation to FIG. 16, this may serve to improve traction of the vehicle 1700 when the vehicle goes around bends.

Alternatively, a single pressure source may be used, and the downforce system of vehicle 1700 may include a valve system for selectively coupling the pressure source to one or both of outlets 1706*a*, 1706*b*. For example, the valve system may include a first valve disposed on a first air flow path between the first outlet 1706*a* and the pressure source, and a second valve disposed on a second air flow path between the second outlet 1706*b* and the pressure source. Then, the valve system may be operated, in order to vary the relative magnitude of the pressure differentials across each of the first and second restrictors 1702*a*, 1702*b*.

The downforce system of vehicle 1700 may be configured to adjust the relative magnitude of the pressure differentials across each of the first and second restrictors 1702*a*, 1702*b*, based on a direction in which the vehicle 1700 is turning.

In other embodiments, different numbers and arrangement of restrictors may be used, in order to enable generation of downforce at different locations in the vehicle 1700.

Figure 18:
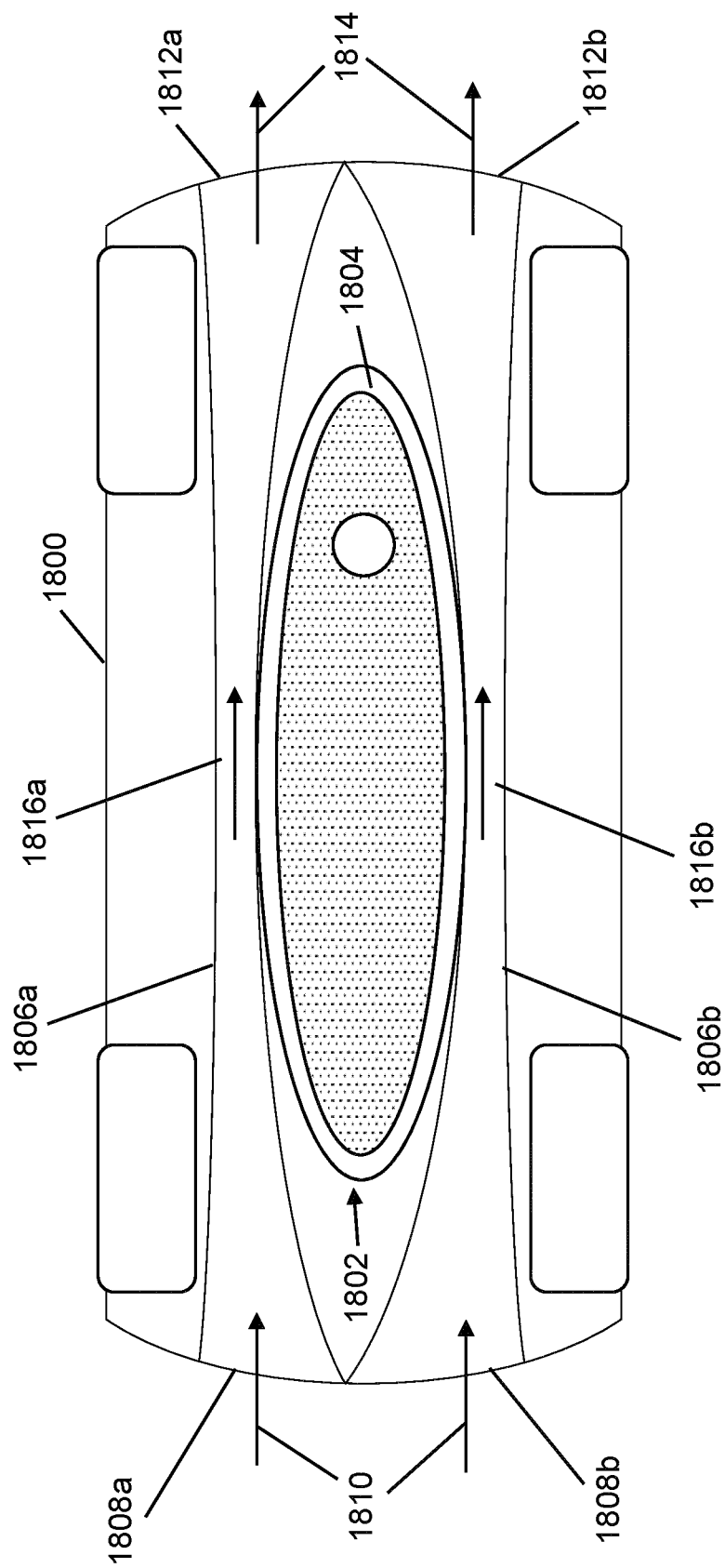
FIG. 18 is a diagram of an underside of a vehicle comprising a downforce system according to an embodiment of the invention.

FIG. 18 shows a view of an underside of a vehicle 1800 according to an embodiment of the invention. The vehicle 1800 includes a downforce system according to an embodiment of the invention. The downforce system includes a restrictor 1802 disposed on an underside of the vehicle 1800, and a rim 1804 disposed on a lower edge of the restrictor 1802. The restrictor 1802 and rim 1804 may be configured in a similar manner to restrictor 104 and rim 108 described above in relation to downforce system 102 or 202, and so details of restrictor 1802 and rim 1804 are not described again.

A first channel 1806*a* and second channel 1806*b* are defined in the underside of the vehicle 1800. The channels 1806*a*, 1806*b* extend in a longitudinal direction of the vehicle 1800, and are configured to guide an air flow around an outside of the restrictor 1802 when the vehicle 1800 moves. Each channel 1806a, 1806b includes an inlet 1808a, 1808b located at a front end of the vehicle 1800, which is configured to draw air into the channel 1806a, 1806b as the vehicle moves forward, as illustrated by arrows 1810. Each channel 1806a, 1806b also includes an outlet 1812a, 1812b located at a rear end of the vehicle 1800, through which air may exit from the channel 1806a, 1806b when the vehicle moves forward, as illustrated by arrows 1814. The first channel 1806a and second channel 1806b may, for example, be formed by diffusers which are disposed adjacent to the restrictor 1802, on an underside of the vehicle 1800.

Each of the first channel 1806a and second channel 1806b includes a constriction 1816a, 1816b disposed next to the restrictor 1802, the constriction being formed by a narrowing of the channel 1806a, 1806b in the vicinity of the restrictor 1802. Away from the restrictor 1802, each of the channels 1806a, 1806b flares outwards towards the inlet 1808a, 1808b and the outlet 1812a, 1812b. When the vehicle 1800 moves forward, air is caused to flow through the channels 1806a, 1806b (see arrows 1810, 1814). As the air passes through the constrictions 1816a, 1816b in the channels 1806a, 1806b, the air flow is accelerated, which results in a drop in air pressure around the constrictions 1816a, 1816b. Thus, when the vehicle 1800 moves, there is a drop in pressure relative to atmospheric pressure immediately outside the restrictor 1802, caused by the air flow through the channels 1806a, 1806b. As a result of the lower pressure immediately outside the restrictor 1802, leakage of air into the region inside the restrictor 1802 may be reduced. This may facilitate maintaining a pressure differential across the restrictor 1802, between the region inside the restrictor 1802 and the outside of the restrictor 1802.

Figure 19:
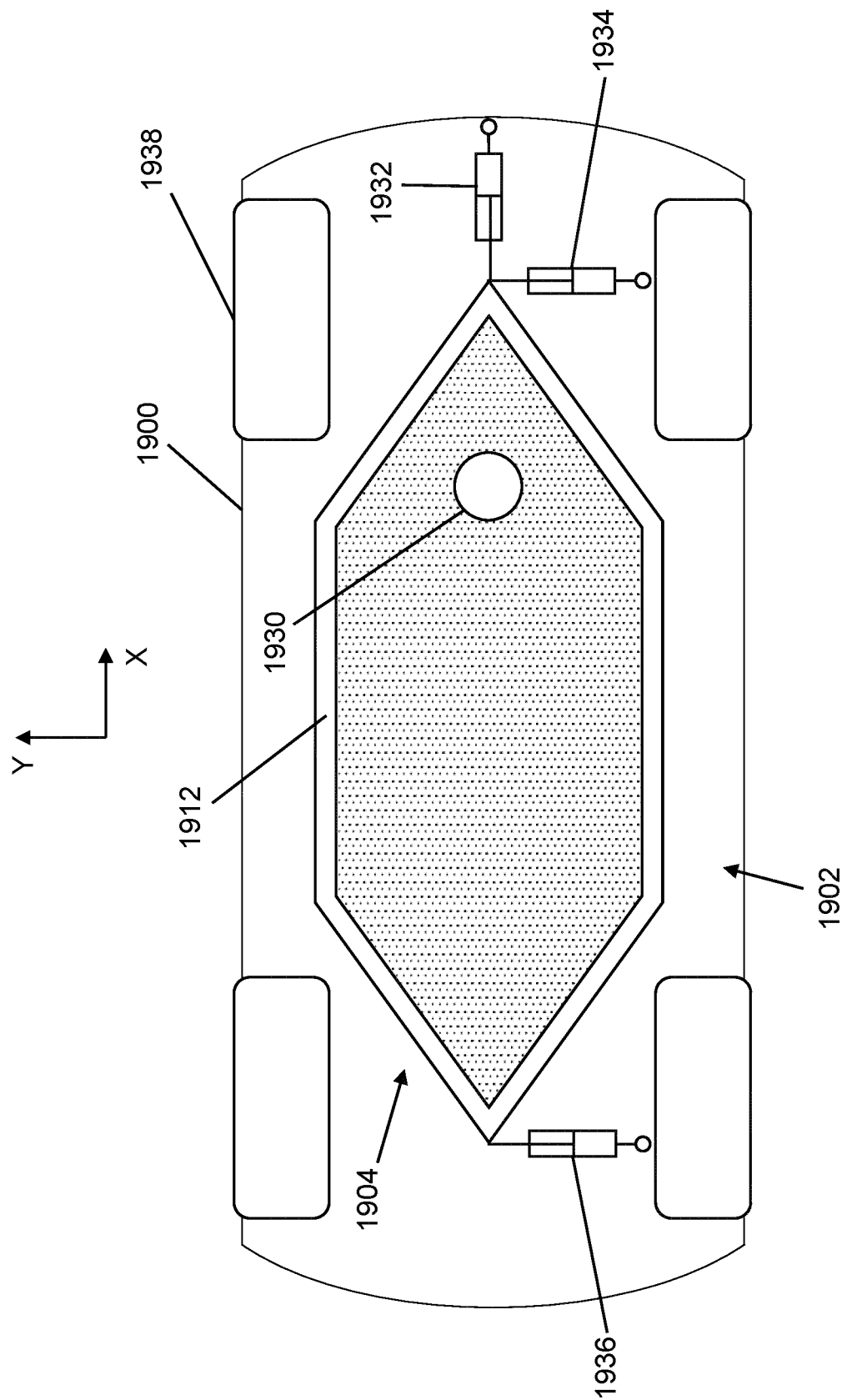
FIG. 19 is a view of an underside of a vehicle comprising a downforce system according to an embodiment of the invention.
Figure 20:
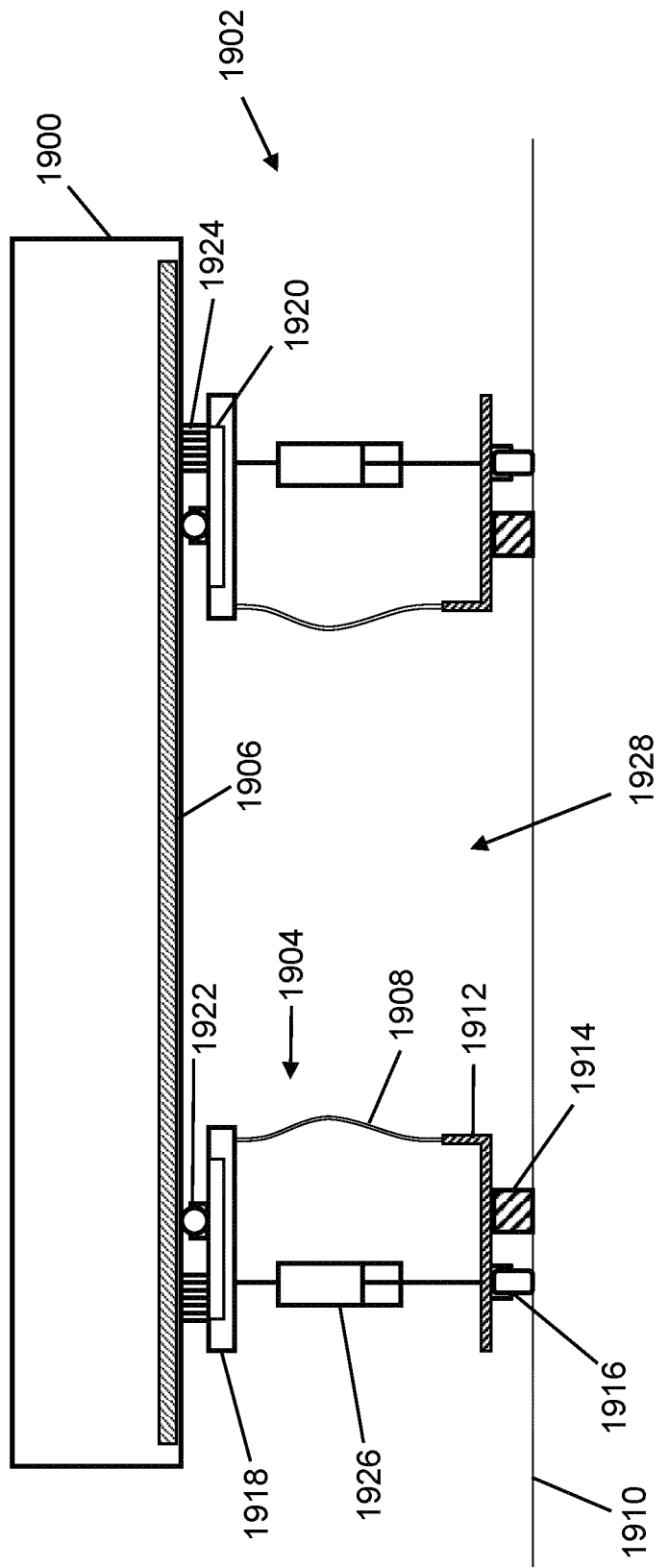
FIG. 20 is a cross-sectional view of a portion of the downforce system of FIG. 19.

FIG. 19 shows a view of an underside of a vehicle 1900 that comprises a downforce system 1902 according to an embodiment of the invention. A cross-sectional view of a portion of the vehicle 1900 and downforce system 1902 is shown in FIG. 20. The downforce system 1902 is similar to downforce system 102 described above, except that the downforce system 1902 includes a restrictor 1904 that is movable longitudinally and laterally relative to the vehicle 1900. The restrictor 1904 is also rotatable relative to the vehicle 1900.

The downforce system 1902 comprises a top surface 1906, which is disposed on the underside of the vehicle 1900. For illustration purposes, the top surface 1906 is not shown in FIG. 19, however it is shown in FIG. 20. The top surface 1906 may be in the form of a plate disposed on the underside of the vehicle 1900. In some cases, the top surface 1906 may be formed by a portion of the underside of the vehicle 1900. In this example, the top surface 1906 is formed by a magnetic material, e.g. stainless steel.

The restrictor 1904 includes a sidewall in the form of a flexible skirt 1908, which extends from a position near the top surface 1906 towards a ground surface 1910 on which the vehicle 1900 is disposed. The flexible skirt 1908 forms a closed loop such that it defines a perimeter of an area. The flexible skirt 1908 is made of a flexible or supple material which is substantially impermeable to air flow. The flexible skirt 1908 may be similar to flexible skirt 406 described above.

A rim 1912 is disposed at a lower edge of the flexible skirt 1908, the rim 1912 being similar in configuration to rim 412 described above. In particular, the rim 1912 includes a sealing element 1914 for forming an at least partial seal with the ground surface 1910, and castor wheels 1916 for supporting the rim 1912 on the ground surface 1910.

The restrictor 1904 further includes a mounting element 1918 which is attached to an upper end of the flexible skirt 1908, the mounting element 1918 being for connecting the restrictor 1904 to the top surface 1906 on the underside of the vehicle 1900. The mounting element 1918 includes a magnet 1920, which is configured to experience an attractive force towards the magnetic material of the top surface 1906. The mounting element 1918 further includes roller ball bearings 1922 which are arranged to contact the top surface 1906 and enable relative movement between the restrictor 1904 and the top surface 1906. Thus, the magnet 1920 acts to hold the roller ball bearings 1922 against the top surface 1906, whilst the roller ball bearings enable relative movement between the restrictor 1904 and the top surface 1906. Additionally, the mounting element 1918 includes a sliding seal in the form of a brush seal 1924, which is arranged to form an at least partial seal between the mounting element 1918 and the top surface 1906. The brush seal 1924 forms a continuous perimeter around the restrictor 1904. In other examples, different types of sealing element may be used instead of the brush seal 1924, e.g. a rubber seal may be used instead.

The downforce system 1902 further includes actuators 1926 connected between the mounting element 1918 and the rim 1912. The actuators 1926 may serve to apply a preload force to the rim 1912 to press the rim 1912 towards the ground surface 1910, as well as control a height of the rim 1912 above the ground surface 1910. The actuators 1926 may be similar to actuators 418 discussed above.

Together, the restrictor 1904 and the top surface 1906 define a region 1928 over the ground surface 1910, with the restrictor 1904 acting to restrict air flow into the region 1928. The brush seal 1924 serves to minimise air leakage into the region 1928 via the connection between the mounting element 1918 of the restrictor 1904 and the top surface 1906. An outlet 1930 is formed in the top surface 1906. The outlet 1930 is connected to a dust and debris removal device and pressure source of the downforce system 1902. The dust and debris removal device and pressure source of the downforce system 1902 are not illustrated, however they may be configured in a similar manner to the dust and debris removal device 112 and pressure source 110 of downforce system 102 or 202 described above. Thus, a pressure differential may be generated across the restrictor 1904 by the pressure source of the downforce system 1902, in order to generate a downforce.

The downforce system 1902 further includes a positioning mechanism for controlling a longitudinal and lateral position of the restrictor 1904 relative to the top surface 1906 (and therefore relative to the vehicle 1900). The positioning mechanism includes a first actuator 1932, a second actuator 1934, and a third actuator 1936. Each of the actuators 1932, 1934, 1936 is connected between the vehicle 1900 and a connection point on the restrictor 1904 (e.g. on the mounting element 1918 of the restrictor 1904), to enable the restrictor 1904 to be moved longitudinally and/or laterally, as well as rotated, relative to the vehicle 1900. Each of the actuators 1932, 1934, 1936 may, for example, be in the form of a piston such as a pneumatic cylinder, a hydraulic cylinder, an electrical actuator, a mechanical actuator (e.g. spring) or a magnetic actuator.

The first actuator 1932 is connected between the underside of the vehicle 1900 and a connection point on the restrictor 1904 located near a rear of the vehicle 1900. The first actuator 1932 is configured to control longitudinal movement of the restrictor 1904 relative to the vehicle 1900, i.e. movement along the 'X' axis illustrated in FIG. 19. The second actuator 1934 is connected between the underside of the vehicle 1900 and a connection point on the restrictor 1904 located near the rear of the vehicle 1900. In the example shown, the second actuator 1934 is connected to the same connection point on the restrictor 1904 as the first actuator 1932; however, in other examples, different connection points on the restrictor 1904 may be used. The second actuator 1934 is configured to control lateral movement of a rear end of the restrictor 1904 relative to the vehicle 1900, i.e. movement along the 'Y' axis illustrated in FIG. 19. The third actuator 1936 is connected between the underside of the vehicle 1900 and a connection point on the restrictor 1904 located near a front of the vehicle 1900. The third actuator 1936 is configured to control lateral movement of a front end of the restrictor 1904 relative to the vehicle 1900. Additionally, each of the actuators 1932, 1934, 1936 is pivotably mounted relative to the vehicle 1900, to enable the actuators 1932, 1934, 1936 to pivot relative to the vehicle 1900 when the restrictor 1904 is moved relative to the vehicle 1900.

Each of the actuators 1932, 1934, 1936 is movable between an extended position and a retracted position. Thus, by controlling the position of each of the actuators 1932, 1934, 1936, it is possible to move the restrictor 1904 longitudinally and laterally relative to the vehicle 1900, as well as rotate the restrictor 1904 relative to the vehicle 1904. The position of each of the actuators 1932, 1934, 1936 may be controlled by a controller of the downforce system 1902, e.g. similar to the controller of the downforce system 202 discussed above. When the restrictor 1904 is moved relative to the vehicle 1900 by means of the actuators 1932, 1934, 1936, the roller bearings 1922 roll over the top surface, whilst the brush seal 1924 ensures that air leakage into the region 1928 is minimised.

In the configuration illustrated in FIG. 19, the restrictor 1904 is in a central position relative to the vehicle 1900. As a result, the downforce generated by the downforce system 1902 when the restrictor 1904 is in the central position is distributed substantially evenly across the vehicle's tyres 1938.

In the example shown, the restrictor 1904 is connected to the top surface 1906 on the vehicle 1900 by means of the magnet 1920 in the mounting element 1918. However, in other examples, different mechanisms may be used for connecting the restrictor 1904 to the top surface 1906. For example, the downforce system 1902 may include one or more linkages which are connected between the vehicle and the restrictor 1904 in order to support the restrictor 1904. In some cases, the actuators which serve to move the restrictor longitudinally and/or laterally relative to the vehicle (e.g. actuators 1932, 1934, 1936) may also serve to connect the restrictor 1904 to the top surface 1906, see e.g. the example shown in FIG. 22.

Figure 21:
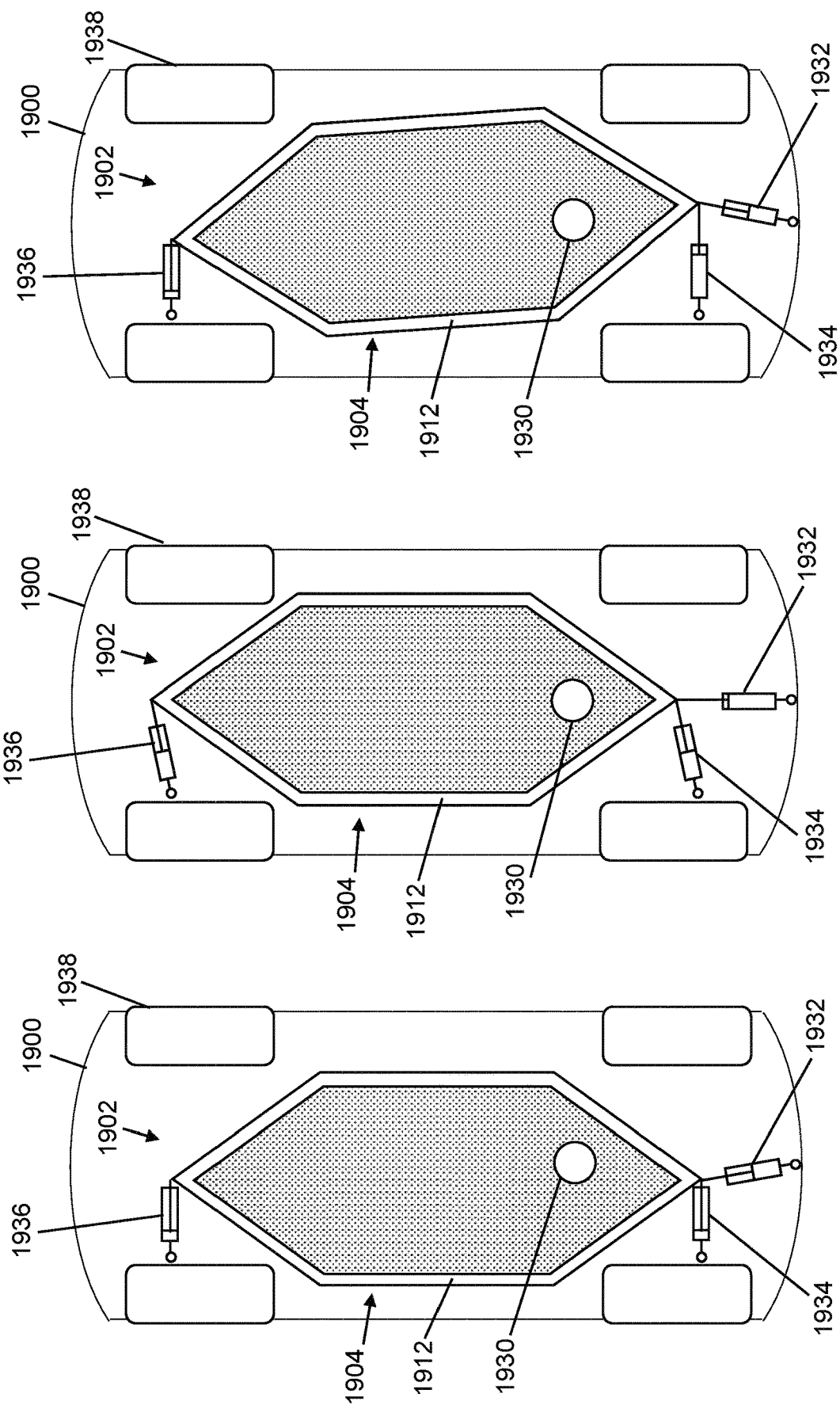
FIGS. 21a, 21b, 21c are view of the underside of the vehicle of FIG. 19, illustrating configurations where a restrictor of the downforce system is in different positions relative to the vehicle.

FIGS. 21*a*, 21*b* and 21*c* show examples of moving the restrictor 1904 relative to the vehicle 1900 by means of the actuators 1932, 1934, 1936. In FIG. 21*a*, the restrictor 1904 is moved laterally towards a left-hand side of the vehicle 1900. This is achieved by placing both the second actuator 1934 and the third actuator 1936 in the retracted position, which causes the restrictor 1904 to be pulled towards the left-hand side of the vehicle 1900. This also causes the first actuator 1932 to pivot relative to the vehicle 1900 and to extend by a small amount, as shown in FIG. 21*a*. In the configuration shown in FIG. 21*a*, the downforce generated by the downforce system 1902 may act preferentially on the left-hand side of the vehicle 1900. Similarly, the restrictor 1904 may be moved towards a right-hand side of the vehicle 1900 by placing both the second actuator 1934 and the third actuator 1936 in the extended position, which causes the restrictor 1904 to be pushed towards the right-hand side of the vehicle 1900. This also causes the first actuator 1932 to pivot relative to the vehicle 1900 and to extend by a small amount. In such a configuration, the downforce generated by the downforce system 1902 may act preferentially on the right-hand side of the vehicle 1900.

In FIG. 21*b*, the restrictor 1904 is moved longitudinally towards the front of the vehicle 1900. This is achieved by placing the first actuator 1932 in an extended position, which causes the restrictor 1904 to be pushed towards the front of the vehicle 1900. This also causes the second actuator 1934 and third actuator 1936 to pivot relative to the vehicle 1900 and to extend by a small amount, as shown in FIG. 21*b*. In the configuration shown in FIG. 21*b*, the downforce generated by the downforce system may act preferentially towards the front of the vehicle 1900. Similarly, the restrictor 1904 may be moved towards the rear of the vehicle 1900 by placing the first actuator 1932 in the retracted position, which causes the restrictor 1904 to be pulled towards the rear of the vehicle 1900. This also causes the second actuator 1934 and third actuator 1936 to pivot relative to the vehicle 1900 and to extend by a small amount. In such a configuration, the downforce generated by the downforce system 1902 may act preferentially towards the rear of the vehicle 1900.

In FIG. 21*c*, the restrictor 1904 is rotated relative to the vehicle 1900 in a counter-clockwise direction. This is achieved by placing the second actuator 1934 in the extended position which pushes the rear end of the restrictor 1904 towards the right-hand side of the vehicle 1900, and placing the third actuator 1936 in the retracted position which pulls the front end of the restrictor towards the left-hand side of the vehicle 1900. This also causes the first actuator 1932 to pivot relative to the vehicle 1900 and to extend by a small amount, as shown in FIG. 21*c*. Similarly, the restrictor 1904 may be rotated in a clockwise direction relative to the vehicle, by placing the second actuator 1934 in the retracted position and the third actuator 1936 in the extended position. This also causes the first actuator 1932 to pivot relative to the vehicle 1900 and to extend by a small amount.

The position of the restrictor 1904 relative to the vehicle 1900 may be controlled in order to control weight distribution across the four tyres 1938 of the vehicle 1900, by varying where the downforce preferentially acts on the vehicle. In this manner, it may be possible to compensate for variations in weight distribution across the vehicle's tyres 1938 as the vehicle 1900 is driving.

FIGS. 19 and 21*a*, 21*b*, 21*c* illustrate a specific configuration of actuators 1932, 1934, 1936 that may be used to control the longitudinal, lateral and rotational position of the restrictor 1904 relative to the vehicle. However, in other examples, different numbers and arrangements of actuators may be used.

Figure 22:
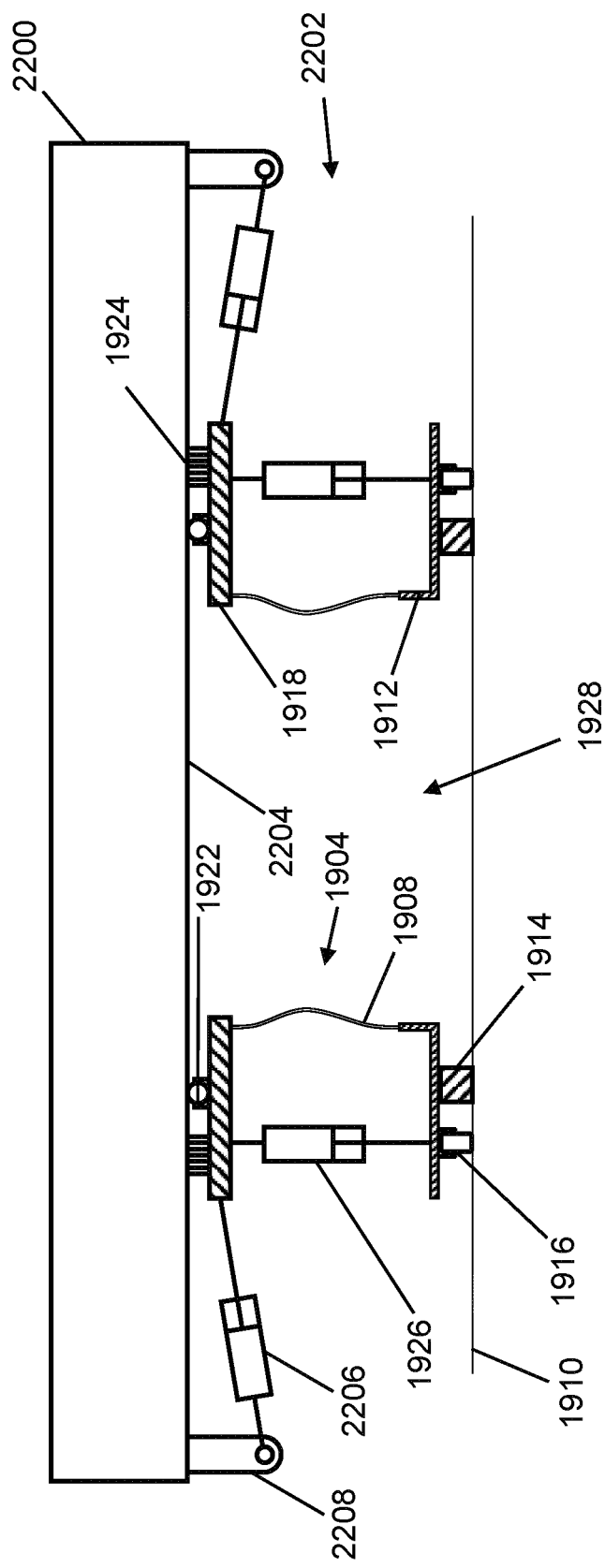
FIG. 22 is a cross-sectional view of a portion of a downforce system that is an embodiment of the invention.

FIG. 22 shows a cross-sectional view of a portion of a downforce system 2202 on a vehicle 2200, the downforce system 2202 being an embodiment of the invention. The downforce system 2202 is similar to downforce system 1902 described above. For convenience, features in FIG. 22 which correspond to those described above in relation to FIGS. 19, 20, 21*a*, 21*b* and 21*c* are given the same reference numerals as in those figures, and are not described again.

The downforce system 2202 includes a restrictor 1904 which is disposed on an underside 2204 of the vehicle 2200. The underside 2204 of the vehicle 2200 includes a smooth surface, and together with the restrictor 1904 serves to define a region 1928 over the ground surface 1910 on which the vehicle is disposed. The roller ball bearings 1922 on the mounting element 1918 are engaged with the underside 2204 of the vehicle 2200, to enable relative movement between the restrictor 1904 and the vehicle 2200. Additionally, the brush seal 1924 forms a sliding seal between the mounting element 1918 and the underside of the vehicle 2200, to minimise air leakage into the region 1928 via the connection between the mounting element 1918 and the underside 2204 of the vehicle 2200. Unlike downforce system 1902, the mounting element 1918 of the downforce system 2202 does not include a magnet. Instead, the mounting element 1918 of the downforce system 2202 is connected to the underside 2204 of the vehicle by actuators 2206.

The actuators 2206 are connected between mounting points 2208 on the underside 2204 of the vehicle 2200 and the mounting element 1918. The actuators 2206 serve to move the restrictor 1904 longitudinally and/or laterally, as well as rotate the restrictor 1904, relative to the vehicle 2200. The actuators 2206 may function in a substantially similar manner to actuators 1932, 1934, 1936 described above. Thus, in downforce system 2202, the actuators 2206 serve to both maintain the mounting element 1918 in contact with the underside 2204 of the vehicle 2200 (via roller ball bearings 1922), as well as move the restrictor 1904 relative to the vehicle 2200.

Figure 23:
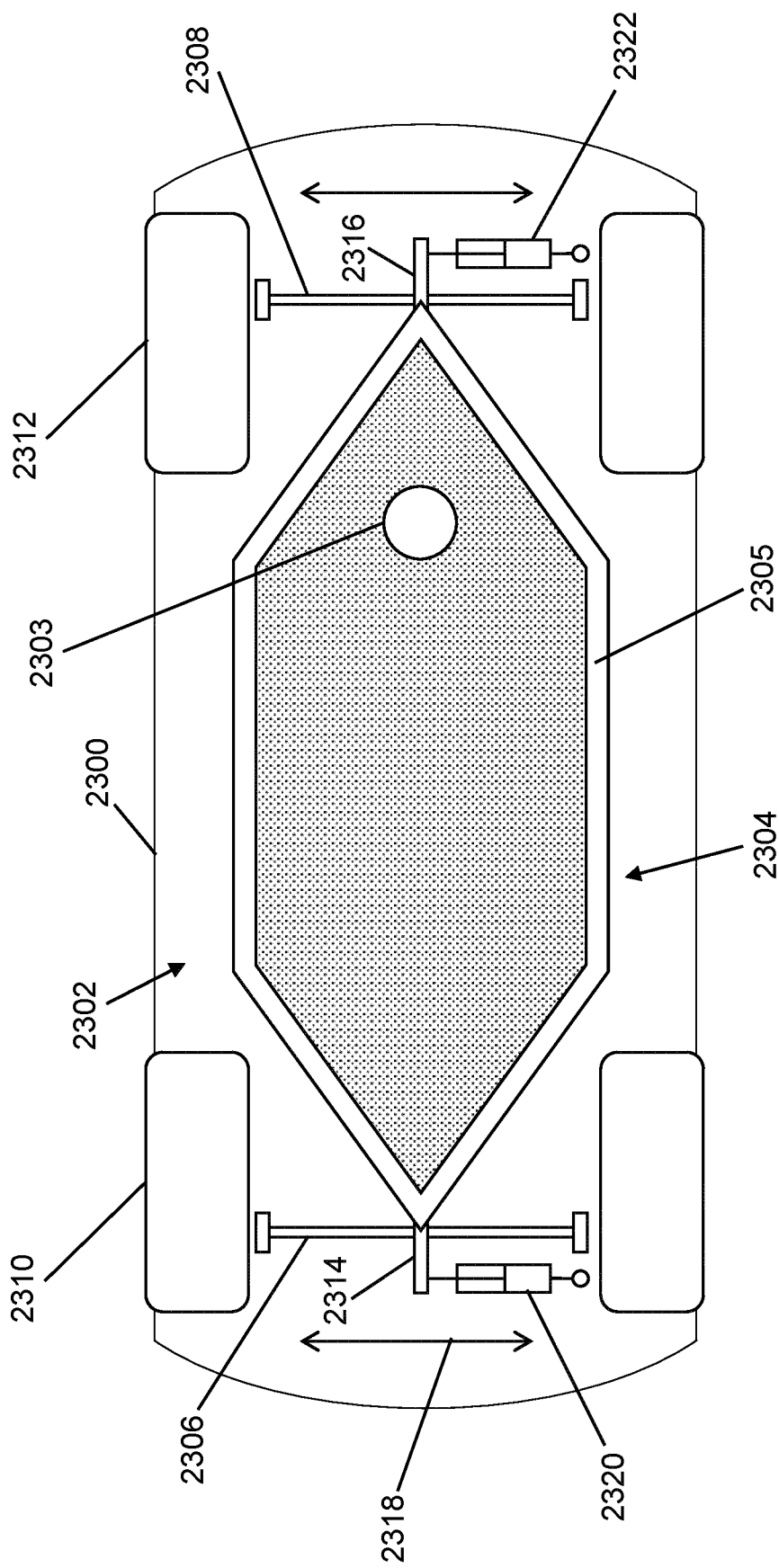
FIG. 23 is a view of an underside of a vehicle comprising a downforce system according to an embodiment of the invention.

FIG. 23 shows a view of an underside of a vehicle 2300 that includes a downforce system 2302 that is an embodiment of the invention. The downforce system 2302 is similar to downforce system 1902 described above, and provides another example of a downforce system where the restrictor is movable relative to the vehicle.

The downforce system 2302 includes a restrictor 2304 which is disposed on the underside of the vehicle 2300. The restrictor 2304 may be similar in configuration to the restrictor 1904 described above, e.g. it may be in the form of a flexible skirt, and include a mounting element with roller ball bearings and a sliding seal to enable the restrictor to move relative to the underside of the vehicle 2300. A rim 2305 is disposed at a lower edge of the restrictor 2304 and arranged to form an at least partial seal with a ground surface on which the vehicle 2300 is disposed. An outlet 2303 is formed in the underside of the vehicle 2300. The outlet 2303 is connected to a dust and debris removal device and pressure source of the downforce system 2302. The dust and debris removal device and pressure source of the downforce system 2302 are not illustrated, however they may be configured in a similar manner to the dust and debris removal device 112 and pressure source 110 of downforce system 102 or 202 described above.

The downforce system 2302 includes guiding elements in the form of a first rail 2306 and a second rail 2308 that are disposed on the underside of the vehicle 2300. The rails 2306, 2308 are parallel and aligned along a lateral direction of the vehicle 2300. The first rail 2306 is located towards the front of the vehicle 2300, between the front two tyres 2310 of the vehicle 2300, whilst the second rail 2308 is located towards the rear of the vehicle 2300, between the rear two tyres 2312 of the vehicle 2300. A first connector 2314 connected to a front end of the restrictor 2304 is engaged with the first rail 2306, and a second connector 2316 connected to a rear end of the restrictor 2304 is engaged with the second rail 2308. Thus, the restrictor 2304 may be moved back and forth along the rails 2306, 2308, as illustrated by arrows 2318, in order to move the restrictor 2304 towards a left-hand side or a right-hand side of the vehicle 2300. The rails 2306, 2308 act to guide movement of the restrictor 2304 along the lateral direction of vehicle 2300, which may facilitate control of the position of the restrictor 2304 relative to the vehicle 2300.

The downforce system 2302 further includes a first actuator 2320 and a second actuator 2322. The first actuator 2320 is connected between the underside of the vehicle 2300 and the first connector 2314, whilst the second actuator 2322 is connected between the underside of the vehicle 2300 and the second connector 2316. The actuators 2320, 2322 may be similar to actuators 1932, 1934, 1936 discussed above. In particular, the actuators 2320 and 2322 are movable between an extended position and a retracted position, to enable movement of the restrictor 2304 along the rails 2306, 2308. Thus, by controlling the actuators 2320, 2322, it is possible to control movement of the restrictor 2304 along the rails 2306, 2308, and hence the position of the restrictor 2304 relative to the vehicle 2300.

In the example of FIG. 23, the rails 2306, 2308 only enable motion of the restrictor 2304 along the lateral direction of the vehicle 2300. However, in other examples (not shown) a rail system may be used which enables movement of the restrictor 2304 in multiple directions (e.g. lateral and longitudinal) relative to the vehicle 2300.

The invention claimed is:

1. A downforce system for a vehicle, the downforce system comprising:
   a restrictor configured to restrict a flow of air into a region that is defined at least in part by said restrictor and a ground surface on which the vehicle is disposed;
   a rim disposed on said restrictor and configured to form at least a partial seal with the ground surface, wherein said rim is disposed at or near a lower edge of said restrictor;
   a dedicated pressure source disposed outside said restrictor and connected to said restrictor via an airflow path, said dedicated pressure source being configured to generate a pressure differential across said restrictor;
   a dust and debris removal system configured to prevent dust and debris from exiting the downforce system via the air flow path; and
   a safety shutdown system configured to prevent an immediate loss of downforce in event of a failure of the downforce system of the vehicle.

2. The downforce system of claim 1, further comprising:
   an actuator for controlling a height of said rim above the ground surface.

3. The downforce system of claim 2, further comprising:
   a rim sensor configured to measure a distance between said rim and the ground surface.

4. The downforce system of claim 1, further comprising:
   one or more valves being operable to adjust a flow of air through the downforce system.

5. The downforce system of claim 4, wherein said one or more valves comprise a valve that is operable to adjust a flow of air between the region and an exterior of said restrictor.

6. The downforce system claim 4, wherein said one or more valves comprise a valve that is disposed in the air flow path between said restrictor and said dedicated pressure source.

7. The downforce system of claim 1, wherein said restrictor has a mounting element for mounting said restrictor on the vehicle, and wherein said rim is movably connected to the mounting element so as to enable said rim to move relative to the mounting element in response to a change in height of an underside of the vehicle above the ground surface.

8. The downforce system of claim 7, wherein said rim is movably connected to the mounting element via an extendable coupling of said restrictor, the extendable coupling being configured to define a portion of the region.

9. The downforce system of claim 8, wherein the extendable coupling comprises a flexible material.

10. The downforce system of claim 8, wherein the extendable coupling is a telescopic coupling.

11. The downforce system of claim 7, further comprising:
a cavity for receiving a portion of said restrictor when said rim moves relative to the mounting element.

12. The downforce system of claim 1, wherein said rim has a sealing element configured to contact the ground surface to form the at least partial seal with the ground surface wherein the sealing element is disposed on the portion of the rim that extends outwards from the lower edge of the restrictor, such that the sealing element is configured to contact the ground surface at a position that is spaced outwards from the restrictor.

13. The downforce system of claim 12, wherein the sealing element has one or more inserts embedded therein, and wherein a material of the one or more inserts has a greater hardness than a hardness of a material of the sealing element.

14. The downforce system of claim 12, further comprising:
a sensor configured to detect a wear level of the sealing element.

15. The downforce system of claim 12, further comprising:
a cooling system configured to remove heat from the sealing element.

16. The downforce system of claim 1, wherein said rim has one or more spacers configured to contact the ground surface.

17. The downforce system of claim 1, further comprising:
a preload mechanism configured to apply a preload force to said rim to press said rim towards the ground surface.

18. The downforce system of claim 17, wherein said preload mechanism has an actuator for varying said preload force applied by the preload mechanism.

19. The downforce system of claim 1, wherein said rim has one or more air outlets, and wherein the downforce system is configured to blow air through the one or more air outlets to produce a blown air curtain between said rim and the ground surface to form the at least partial seal.

20. The downforce system of claim 1, wherein said dedicated pressure source comprises a centrifugal fan.

21. The downforce system of claim 1, wherein said dedicated pressure source comprises at least two fans, each of the at least two fans being independently powered by respective energy stores, and wherein the respective energy stores are isolated from one another.

22. The downforce system of claim 1, wherein said dedicated pressure source has an exhaust outlet, and an outlet valve that is closable to prevent air flow through the exhaust outlet.

23. The downforce system of claim 1, further comprising:
a pressure sensor configured to measure a pressure in the air flow path.

24. The downforce system of claim 1, wherein said restrictor comprises:
a divider configured to divide the region into at least two sub-regions.

25. The downforce system of claim 24, wherein said dedicated pressure source is further configured to generate a pressure differential across the divider.

26. The downforce system of claim 1, wherein said dust and debris removal system has a dust and debris collection chamber for collecting dust and debris removed from the air flowing along the air flow path.

27. The downforce system of claim 26, wherein said dust and debris collection chamber is configured to be self-emptying.

28. The downforce system of claim 1, wherein said dust and debris removal system has a cyclonic filtration apparatus.

29. The downforce system of claim 1, wherein said dust and debris removal system comprises:
a deflector configured to deflect dust and debris away from an outer surface of said restrictor.

30. The downforce system of claim 1, wherein said restrictor is movable between a deployed position where said rim is configured to form the at least partial seal with the ground surface, and a stowed position where said rim is spaced apart from the ground surface.

31. The downforce system of claim 1, further comprising:
a user interface configured to indicate an operating condition of the downforce system.

32. The downforce system of claim 1, further comprising:
a positioning mechanism for controlling a longitudinal or lateral position of said restrictor relative to the vehicle.

33. The downforce system of claim 32, wherein the downforce system is configured to control the longitudinal or lateral position of said restrictor relative to the vehicle based on a motion of the vehicle.

34. A vehicle comprising a downforce system according to claim 1.

35. The vehicle of claim 34, wherein a surface of the vehicle is configured to guide an air flow around said restrictor such that an air pressure adjacent the restrictor is reduced relative to atmospheric pressure when the vehicle is in motion.

36. The vehicle of claim 34, wherein the vehicle is an electric vehicle, and wherein said dedicated pressure source is powered by an energy store that is shared with a motor for driving the vehicle.

37. A method of controlling a downforce system for a vehicle, the downforce system having a restrictor configured to restrict a flow of air into a region that is defined at least in part by the restrictor and a ground surface on which the vehicle is disposed, the downforce system having a rim disposed on the restrictor and configured to form at least a partial seal with the ground surface, the rim being disposed at or near a lower edge of the restrictor, the rim having a portion that extends outwards from the lower edge of the restrictor, the downforce system having a dedicated pressure source disposed outside the restrictor and connected to the restrictor via an air flow path, the dedicated pressure source being configured to generate a pressure differential across the restrictor, the downforce system having a dust and debris removal system configured to prevent dust and debris from exiting the downforce system via the air flow path, the method comprising:
forming the at least partial seal between the rim and the ground surface;
generating a pressure differential across the restrictor with the dedicated pressure source;

preventing dust and debris from exiting the downforce system via the air flow path by using the dust and debris removal system; and controlling the pressure differential across the restrictor based on a quality of the ground surface.

38. The method of claim 37, the method further comprising:

controlling the pressure differential across the restrictor based on a ground speed of the vehicle.

39. The method of claim 37, wherein the downforce system has a preload mechanism configured to apply a preload force to the rim to press the rim towards the ground surface and wherein the preload mechanism includes an actuator for varying the preload force applied by the preload mechanism, the method further comprising:

controlling the preload mechanism to vary said preload force during operation of the vehicle.

* * * * *